US012506990B2

(12) United States Patent
Naganuma et al.

(10) Patent No.: US 12,506,990 B2
(45) Date of Patent: Dec. 23, 2025

(54) SOLID-STATE IMAGING ELEMENT

(71) Applicant: SONY SEMICONDUCTOR SOLUTIONS CORPORATION, Kanagawa (JP)

(72) Inventors: Hideki Naganuma, Kanagawa (JP); Takuya Toyofuku, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 26 days.

(21) Appl. No.: 18/292,726

(22) PCT Filed: Jan. 31, 2022

(86) PCT No.: PCT/JP2022/003527
§ 371 (c)(1),
(2) Date: Jan. 26, 2024

(87) PCT Pub. No.: WO2023/032252
PCT Pub. Date: Mar. 9, 2023

(65) Prior Publication Data
US 2024/0284075 A1    Aug. 22, 2024

(30) Foreign Application Priority Data

Aug. 30, 2021 (JP) ................................ 2021-139567

(51) Int. Cl.
*H04N 25/78* (2023.01)
*H04N 25/616* (2023.01)
(Continued)

(52) U.S. Cl.
CPC .......... *H04N 25/78* (2023.01); *H04N 25/616* (2023.01); *H04N 25/673* (2023.01); *H04N 25/771* (2023.01)

(58) Field of Classification Search
CPC .... H04N 25/78; H04N 25/616; H04N 25/673; H04N 25/771; H04N 25/70; H04N 25/75
See application file for complete search history.

(56) References Cited

U.S. PATENT DOCUMENTS

2018/0146154 A1* 5/2018 Sato ..................... H04N 25/671
2018/0184023 A1* 6/2018 Sato ........................ H10F 39/18
(Continued)

FOREIGN PATENT DOCUMENTS

| JP | 2018-182496 A | 11/2018 | |
|---|---|---|---|
| JP | 2020156070 A | * 9/2020 | ............. H04N 5/355 |
| WO | 2017/179319 A1 | 10/2017 | |

OTHER PUBLICATIONS

International Search Report and Written Opinion of PCT Application No. PCT/JP2022/003527, issued on Apr. 5, 2022, 08 pages of ISRWO.

*Primary Examiner* — Nhan T Tran
(74) *Attorney, Agent, or Firm* — CHIP LAW GROUP

(57) ABSTRACT

To improve the image quality in a solid-state imaging element that performs differential amplification. Each of a plurality of reference pixels is provided with a reference-side amplifier transistor that supplies a reference current according to a predetermined reference potential. Each of a plurality of readout pixel circuits is provided with a readout-side amplifier transistor that supplies from a drain to a source a signal current according to a difference between a potential of a gate and the reference potential. Further, in a potential difference generation unit, a plurality of source follower transistors are arranged for each of columns of the readout pixel circuits, each source follower transistor controlling a potential difference between the gate and the drain to a predetermined value when the potential of the gate and the reference potential are initialized.

20 Claims, 53 Drawing Sheets

(51) Int. Cl.
*H04N 25/673* (2023.01)
*H04N 25/771* (2023.01)

(56) References Cited

U.S. PATENT DOCUMENTS

| | | | |
|---|---|---|---|
| 2019/0289240 A1* | 9/2019 | Zhu | H04N 25/616 |
| 2020/0106975 A1* | 4/2020 | Oike | H04N 25/77 |
| 2021/0092317 A1* | 3/2021 | Zhu | H04N 25/78 |

* cited by examiner

SOLID-STATE IMAGING ELEMENT

CROSS REFERENCE TO RELATED APPLICATIONS

This application is a U.S. National Phase of International Patent Application No. PCT/JP2022/003527 filed on Jan. 31, 2022, which claims priority benefit of Japanese Patent Application No. JP 2021-139567 filed in the Japan Patent Office on Aug. 30, 2021. Each of the above-referenced applications is hereby incorporated herein by reference in its entirety.

TECHNICAL FIELD

The present technology relates to a solid-state imaging element. Specifically, the present technology relates to a solid-state imaging element provided with a differential amplifier circuit.

BACKGROUND ART

Conventionally, solid-state imaging devices of differential amplification type that perform differential amplification have been used as imaging devices. For example, a solid-state imaging device has been proposed in which one of a pair of pixels is used as a reference pixel, the other pixel is used as a readout pixel, and a current mirror circuit and a current source are connected to these pixels to form a differential amplifier circuit (e.g., see PTL 1). In this differential amplifier circuit, for initialization, a reset transistor in the readout pixel short-circuits the gate of an amplifier transistor in the readout pixel (an input of the differential amplifier circuit) and a vertical signal line (an output of the differential amplifier circuit).

CITATION LIST

Patent Literature

[PTL 1]
JP 2018-182496 A

SUMMARY

Technical Problem

In the above-described conventional technology, the floating diffusion layers of both the readout pixel and the reference pixel are initialized by short-circuiting the input and output of the differential amplifier circuit. However, in the solid-state imaging element described above, the vertical signal line is connected to the drain of the amplifier transistor, so that the potentials of the drain and gate of the amplifier transistor is initialized to approximately the same value by short-circuiting the input and output of the differential amplifier circuit. Accordingly, due to the drain and gate of the amplifier transistor being made the same potential, variations in the gain of the amplifier transistor become large, so that the image quality of image data may be reduced.

The present technology has been conceived in view of such circumstances, and an object thereof is to improve the image quality in a solid-state imaging element that performs differential amplification.

Solution to Problem

The present technology has been made to solve the above-described problem, and a first aspect thereof is a solid-state imaging element including: a plurality of reference pixels each provided with a reference-side amplifier transistor that supplies a reference current according to a predetermined reference potential; a plurality of readout pixel circuits each provided with a readout-side amplifier transistor that supplies from a drain to a source a signal current according to a difference between a potential of a gate and the reference potential; and a potential difference generation unit in which a plurality of source follower transistors are arranged for each of columns of the readout pixel circuits, each source follower transistor controlling a potential difference between the gate and the drain to a predetermined value when the potential of the gate and the reference potential are initialized. This provides an effect of preventing gain-based vertical streaks.

In this first aspect, the readout pixel circuit and the source follower transistor may be provided in each of the plurality of readout pixels, and the plurality of readout pixel circuits, the plurality of reference pixels, and the potential difference generation unit may be arranged on a same semiconductor chip. This provides an effect of preventing gain-based vertical streaks for no laminated structure.

In this first aspect, each of the plurality of readout pixels may further include a load MOS transistor that is connected in series with and between the source follower transistor and a predetermined ground potential. This provides an effect that power consumption is reduced by controlling the gate voltage of the load MOS transistor.

In this first aspect, each of the plurality of readout pixels may further include a load MOS transistor and a current cutoff transistor that opens and closes a path between the source follower transistor and the load MOS transistor. This provides an effect of cutting off the current.

In this first aspect, a vertical drive unit that changes a control voltage when the readout pixel circuit is initialized may be further included, and each of the plurality of readout pixels may further include a load MOS transistor that is connected in series with and between the source follower transistor and the control voltage. This provides an effect of reducing the number of reset transistors.

In this first aspect, the readout pixel circuit may further include a selection transistor that outputs the signal current according to a predetermined selection signal, and a gate of the source follower transistor may be connected to a connection node between the readout-side amplifier transistor and the selection transistor. This provides an effect of suppressing the deterioration of settling.

In this first aspect, the plurality of readout pixels may include a first readout pixel and a second readout pixel, the first readout pixel may include a first source follower transistor, a first load MOS transistor, and a first switch, the second readout pixel may include a second source follower transistor, a second load MOS transistor, and a second switch, the first load MOS transistor and the second load MOS transistor may be connected in parallel between a predetermined node and a predetermined ground potential, the first switch may open and close a path between the first source follower transistor and the predetermined node, and the second switch may open and close a path between the second source follower transistor and the predetermined node. This provides an effect of suppressing variations in conversion efficiency.

In this first aspect, the potential difference generation unit may further include for each column a load MOS transistor that is connected to a reset input line, and each of the plurality of readout pixels may further include the source follower transistor and a switch that opens and closes a path between the source follower transistor and the reset input line. This provides an effect of suppressing variations in conversion efficiency.

In this first aspect, a column switch that opens and closes a path between the reset input line and a predetermined power supply line may be further included for each column. This provides an effect of reducing the number of reset transistors.

In this first aspect, the potential difference generation unit may further include a plurality of load MOS transistors, the plurality of readout pixel circuits and the plurality of reference pixels may be arranged on a predetermined pixel chip, and the potential difference generation unit may be arranged on a predetermined circuit chip. This provides an effect of reducing the number of elements per chip.

In this first aspect, the source follower transistor and the load MOS transistor may be arranged for each readout pixel circuit, and a gate of the source follower transistor may be connected to a vertical signal line. This provides an effect of reducing the pixel size.

In this first aspect, the source follower transistor and the load MOS transistor may be arranged for each readout pixel circuit, and the readout pixel circuit may further include a first switch that opens and closes a path between a vertical signal line and a gate of the source follower transistor. This provides an effect of suppressing the deterioration of settling.

In this first aspect, the source follower transistor and the load MOS transistor may be arranged for each readout pixel circuit, the readout pixel circuit may further include a selection transistor that outputs the signal current according to a predetermined selection signal, and a gate of the source follower transistor may be connected to a connection node between the readout-side amplifier transistor and the selection transistor. This provides an effect of suppressing the deterioration of settling and reducing the number of switches.

In this first aspect, the source follower transistor and the load MOS transistor may be arranged for each readout pixel circuit, the readout pixel circuit may further include a first switch that opens and closes a path between a vertical signal line and a gate of the source follower transistor, and a reset transistor that initializes a floating diffusion layer, and the potential difference generation unit may further include a second switch that opens and closes a path between the reset transistor and a predetermined power supply voltage, a third switch that opens and closes a path between the reset transistor and a connection node between the source follower transistor and the load MOS transistor, and a fourth switch that opens and closes a path between the gate of the source follower transistor and a predetermined ground potential. This provides an effect of reducing the number of reset transistors.

In this first aspect, the source follower transistor and the load MOS transistor may be arranged for each readout pixel circuit, and on the circuit chip, a demultiplexer that connects one of gates of a predetermined number of source follower transistors corresponding to the column to a vertical signal line, and a multiplexer that connects a source of the source follower transistor whose gate is connected to the demultiplexer to one of the plurality of readout pixel circuits may be further arranged. This provides an effect of suppressing variations in conversion efficiency.

In this first aspect, the source follower transistor and the load MOS transistor may be arranged for each readout pixel circuit, and on the circuit chip, a first selector that connects a predetermined number of vertical signal lines to respective gates of a predetermined number of the source follower transistors arranged in a horizontal direction, and a second selector that connects respective sources of the predetermined number of source follower transistors arranged in the horizontal direction to a predetermined number of the readout pixel circuits arranged in the horizontal direction may be further arranged. This provides an effect of suppressing variations in conversion efficiency.

In this first aspect, each of the columns may be divided into a plurality of common areas, the source follower transistor and the load MOS transistor may be arranged in each common area, and the source follower transistor may be commonly connected to a predetermined number of the readout pixel circuits within the common area. This provides an effect of reducing the number of Cu—Cu connections.

In this first aspect, each of the columns may be divided into a plurality of common areas, the source follower transistor and the load MOS transistor may be arranged within each common area, and on the circuit chip, a predetermined number of switches that connect a source of the source follower transistor and at least one or some of a predetermined number of the readout pixel circuits within the common area may be further arranged. This provides an effect of suppressing the deterioration of settling.

In this first aspect, each of the columns may be divided into a plurality of common areas, the plurality of source follower transistors may include a first source follower transistor and a second source follower transistor in each common area, the readout pixel circuits in odd-numbered rows within the common area may share the first source follower transistor, and the readout pixel circuits in even-numbered rows within the common area may share the second source follower transistor. This provides an effect of suppressing variations in conversion efficiency.

In this first aspect, a column readout unit that generates a pixel signal according to the signal current may be further included, the potential difference generation unit may further include a plurality of load MOS transistors, the plurality of readout pixel circuits and the plurality of reference pixels may be arranged on a first pixel chip, the potential difference generation unit may be arranged on a second chip, and the column readout unit may be arranged on a predetermined circuit chip. This provides an effect of reducing the number of elements per chip.

DESCRIPTION OF EMBODIMENTS

Modes for carrying out the present technology (hereinafter also referred to as "embodiments") will be described below. The description will be given in the following order.
 1. First Embodiment (an example in which a source follower transistor is arranged for each pixel)
 2. Second Embodiment (example in which a source follower transistor and a current cutoff transistor are an arranged for each pixel)
 3. Third Embodiment (an example in which a source follower transistor is arranged for each pixel and the source voltage of a load MOS transistor is controlled)
 4. Fourth Embodiment (an example in which a source follower transistor is arranged for each pixel and the connection destination of the gate is changed)
 5. Fifth Embodiment (an example in which a source follower transistor is arranged for each pixel and a switch is inserted)
 6. Sixth Embodiment (an example in which a source follower transistor is arranged for each pixel and a load MOS transistor is arranged for each column)
 7. Seventh Embodiment (an example in which a source follower transistor is arranged for each pixel and a column switch is added)
 8. Eighth Embodiment (an example in which a source follower transistor is arranged in each FD common block)
 9. Ninth Embodiment (an example in which a source follower transistor is arranged for each pixel in a laminated structure)
 10. Tenth Embodiment (an example in which a source follower transistor is arranged for each pixel in a laminated structure and a switch is added)
 11. Eleventh Embodiment (an example in which a source follower transistor is arranged for each pixel in a laminated structure and the connection destination of the gate is changed)
 12. Twelfth Embodiment (an example in which a source follower transistor is arranged for each pixel in a laminated structure and the number of reset transistors is reduced)
 13. Thirteenth Embodiment (an example in which a source follower transistor is arranged for each pixel in a laminated structure and the connection destination is switched in the vertical direction)
 14. Fourteenth Embodiment (an example in which a source follower transistor is arranged for each pixel in a laminated structure and the connection destination is switched in the horizontal direction)
 15. Fifteenth Embodiment (an example in which a source follower transistor is arranged for every plurality of pixels in a laminated structure)
 16. Sixteenth Embodiment (an example in which a source follower transistor is arranged for every plurality of pixels in a laminated structure and a switch is added)
 17. Seventeenth Embodiment (an example in which source follower transistors are arranged, respectively, for odd-numbered rows and for even-numbered rows in a laminated structure)
 18. Eighteenth Embodiment (an example in which a source follower transistor is arranged for each pixel in a three-layer laminated structure)
 19. Example of Application to Moving Body 1. First Embodiment

Figure 1:
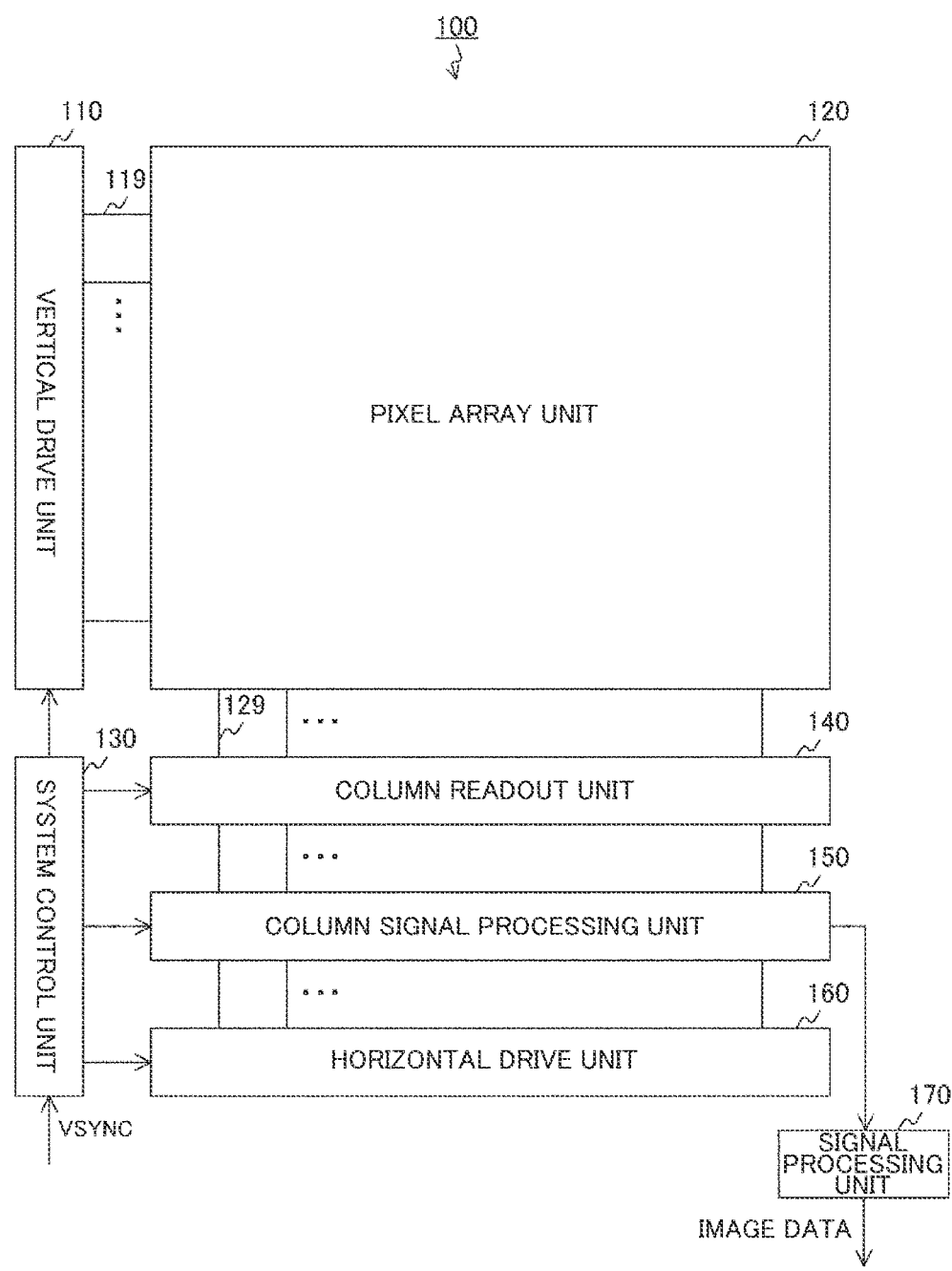
FIG. 1 is a block diagram illustrating a configuration example of a complementary metal oxide semiconductor (CMOS) image sensor according to a first embodiment of the present technology.

[Configuration Example of Solid-State Imaging Element]
FIG. 1 is a block diagram illustrating a configuration example of a CMOS image sensor 100 according to a first embodiment of the present technology. This CMOS image sensor 100 includes a vertical drive unit 110, a pixel array unit 120, a system control unit 130, a column readout unit 140, a column signal processing unit 150, a horizontal drive unit 160, and a signal processing unit 170. These circuits are formed on a same semiconductor chip. The CMOS image sensor 100 is an example of a solid-state imaging element described in the claims.

In the pixel array unit 120, unit pixels (pixels) that each include a photoelectric conversion unit (e.g., a photodiode) capable of photoelectrically converting and accumulating an amount of charge corresponding to an amount of incident light and outputting the amount of charge as a signal are arrayed two-dimensionally in a matrix.

In addition to pixels that are effective (effective pixels), the pixel array unit 120 may have a region in which dummy pixels and light-shielding pixels are arrayed two-dimensionally in a matrix. Here, the dummy pixel is a pixel having a structure without a photodiode for performing photoelectric conversion, and the light-shielding pixel is a pixel that shields a light-receiving surface from light to block the light entering from the outside, which is otherwise equivalent to the effective pixel.

In the following description, the photocharge of an amount of charge corresponding to an amount of incident light may be simply referred to as a "charge" and the unit pixel may be simply referred to as a "pixel".

Further in the pixel array unit 120, a pixel drive line 119 is formed for each row in the horizontal direction in the drawing (an arrangement direction of pixels in a pixel row) in a pixel arrangement in a matrix, and a vertical pixel wire 129 is formed for each column in the vertical direction in the drawing (an arrangement direction of pixels in a pixel column). One end of the pixel drive line 119 is connected to an output terminal for a corresponding row of the vertical drive unit 110.

The column readout unit 140 includes at least a circuit that supplies for each column a constant current to the pixels in a selected row in the pixel array unit 120, a current mirror circuit that forms a high-gain amplifier, and a mode change switch. The column readout unit 140 constitutes an amplifier along with a transistor in a selected pixel in the pixel array unit 120, converts a photocharge signal into a voltage signal, and outputs the voltage signal to the vertical pixel wire 129.

The vertical drive unit 110 is a pixel drive unit that includes a shift register, an address decoder, and the like and drives all the pixels of the pixel array unit 120 simultaneously or row by row. Although not specifically illustrated in the drawings, the vertical drive unit 110 includes a readout scanning system and a sweep scanning system, or a batch sweep and batch transfer.

The readout scanning system selectively scans the pixels of the pixel array unit 120 row by row to read out signals from the pixels in order. In the case of row driving (a rolling shutter operation), for sweeping, sweep scanning is performed prior to readout scanning by a shutter speed time for a readout row for which the readout scanning is performed by the readout scanning system.

In the case of global exposure (global shutter operation), batch sweep is performed prior to batch transfer by a shutter speed time. This sweeping sweeps out (reset) unnecessary charges from the photoelectric conversion elements of the pixels in the readout row. The sweep out (reset) of unnecessary charges results in a so-called electronic shutter operation being performed.

Here, the electronic shutter operation is an operation of discarding unnecessary photocharges collected in the photoelectric conversion elements and the like up to recently and newly starting exposure (starting accumulation of photocharges). A signal read out by a readout operation of the readout scanning system corresponds to an amount of light incident after the immediately previous readout operation or the electronic shutter operation.

In the case of the row driving, a period from a readout timing in the immediately previous readout operation or a sweep timing in the electronic shutter operation to a readout timing in a current readout operation is a photocharge accumulation time (an exposure time) in the pixel. In the case of the global exposure, a time from the batch sweep to the batch transfer is an accumulation time (an exposure time).

A pixel signal output from each pixel in a pixel row selected and scanned by the vertical drive unit 110 is supplied to the column signal processing unit 150 through each of the vertical pixel wires 129. The column signal processing unit 150 performs predetermined signal processing on the pixel signals output from the pixels in the selected row through the vertical pixel wire 129 for each pixel column of the pixel array unit 120, and temporarily holds the pixel signals after the signal processing.

Specifically, the column signal processing unit 150 performs at least noise removal processing, for example, correlated double sampling (CDS) processing as signal processing. This correlated double sampling performed by the column signal processing unit 150 removes fixed pattern noise specific to pixels such as reset noise and variations in threshold of an amplifier transistor. In addition to the noise removal processing, the column signal processing unit 150 may have an analog-to-digital (AD) conversion function to output a signal level as a digital signal, for example. The column signal processing unit 150 is provided with an analog-to-digital converter (ADC) for each column, for example.

The horizontal drive unit 160 includes a shift register, an address decoder, and the like to sequentially select the unit circuits corresponding to the pixel columns of the column signal processing unit 150. By the selective scanning performed by the horizontal drive unit 160, pixel signals processed by the column signal processing unit 150 are sequentially output to the signal processing unit 170.

The system control unit 130 includes a timing generator that generates various timing signals, and the like. This system control unit 130 controls the driving of the vertical drive unit 110, the column signal processing unit 150, the horizontal drive unit 160, and the like based on the various timing signals generated by the timing generator.

The signal processing unit 170 has at least an addition processing function to perform various signal processing such as addition processing on the pixel signals output from the column signal processing unit 150. The signal processing unit 170 may be an external signal processing unit provided on a substrate different from the CMOS image sensor 100, such as a digital signal processor (DSP) or software processing. The signal processing unit 170 may be mounted on the same substrate as the CMOS image sensor 100.

[Configuration Example of Pixel Array Unit]

Figure 2:
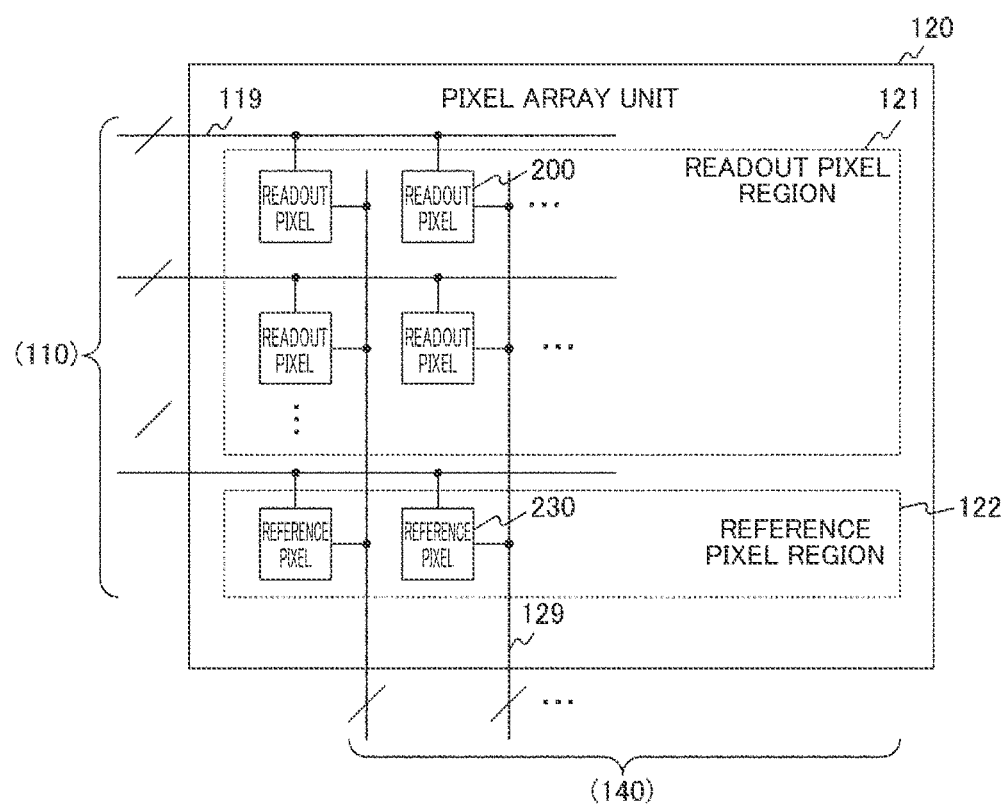
FIG. 2 is a diagram illustrating a configuration example of a pixel array unit according to the first embodiment of the present technology.

FIG. 2 is a plan view illustrating a configuration example of the pixel array unit 120 according to the first embodiment of the present technology. The pixel array unit 120 is provided with a reference pixel region 122 and a readout pixel region 121. In the reference pixel region 122, a plurality of reference pixels 230 are arranged in the horizontal direction. On the other hand, in the readout pixel region 121, a plurality of readout pixels 200 are arranged in a two-dimensional grid pattern. Here, the readout pixel 200 is a pixel from which a pixel signal is to be read out. On the other hand, the reference pixel 230 is a pixel that outputs a reference signal for comparison with the signal from the readout pixel 200 for differential amplification.

Each of the pixels in a row (the reference pixel 230 or the readout pixel 200) is connected to the vertical drive unit 110 via the corresponding pixel drive line 119. Each of the pixels in a column is connected to the column readout unit 140 via the corresponding vertical pixel wire 129.

[Configuration Example of Pixel]

Figure 3:
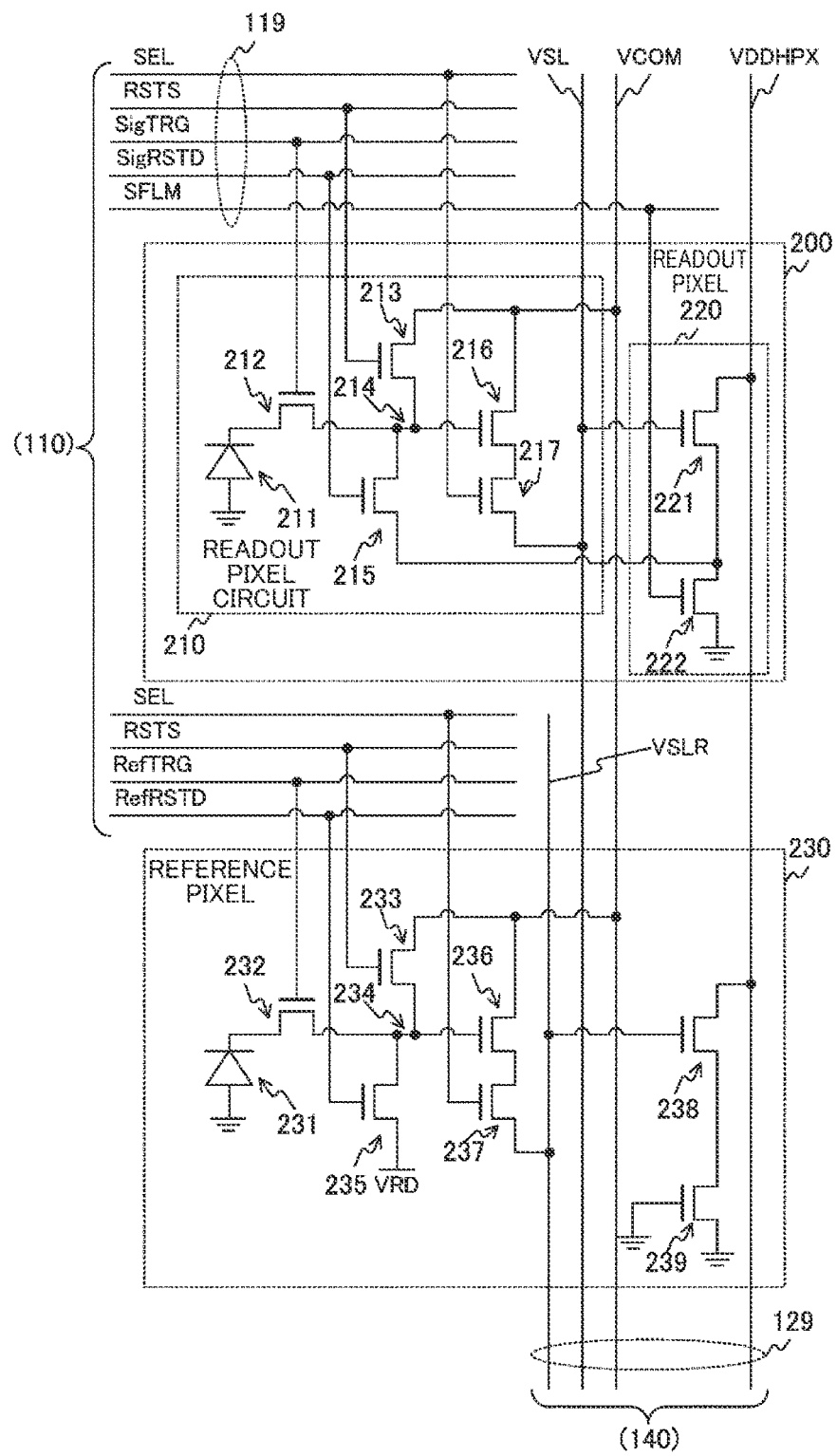
FIG. 3 is a circuit diagram illustrating a configuration example of a readout pixel and a reference pixel, according to the first embodiment of the present technology.

FIG. 3 is a circuit diagram illustrating a configuration example of the readout pixel 200 and the reference pixel 230, according to the first embodiment of the present technology. The readout pixel 200 includes a readout pixel circuit 210 and a potential difference generation circuit 220. The readout pixel circuit 210 includes a photoelectric conversion element 211, a transfer transistor 212, reset transistors 213 and 215, a floating diffusion layer 214, an amplifier transistor 216, and a selection transistor 217. The potential difference generation circuit 220 includes a source follower transistor 221 and a load metal oxide semiconductor (MOS) transistor 222.

The reference pixel 230 includes a photoelectric conversion element 231, a transfer transistor 232, reset transistors 233 and 235, a floating diffusion layer 234, an amplifier transistor 236, a selection transistor 237, a source follower transistor 238, and a load MOS transistor 239. For example, n-channel metal oxide semiconductor (nMOS) is used as various transistors in the pixel such as the source follower transistor 221.

For each row of readout pixels 200, five signal lines that transmit a selection signal SEL, a reset signal RSTS, a transfer signal SigTRG, a reset signal SigRSTD, and a control signal SFLM, which are from the vertical drive unit 110, are used as pixel drive lines 119 to be wired in the horizontal direction. In rows of reference pixels 230, four signal lines that transmit a selection signal SEL, a reset signal RSTS, a transfer signal RefTRG, and a reset signal RefRSTD, which are from the vertical drive unit 110, are used as pixel drive lines 119 to be wired in the horizontal direction.

For each column of pixels (readout pixels 200 and a reference pixel 230), four lines: a reference-side vertical signal line VSLR, a vertical signal line VSL, a vertical current supply line VCOM, and a power supply line VDDHPX, are used as vertical pixel wires 129 to be wired in the vertical direction.

In the reference pixel 230, the photoelectric conversion element 231 generates charge through photoelectric conversion. The transfer transistor 232 transfers the charge from the photoelectric conversion element 231 to the floating diffusion layer 234 according to the transfer signal RefTRG.

The reset transistor 233 connects the floating diffusion layer 234 to a power supply voltage of the column readout unit 140 to extract the charge from the floating diffusion layer 234 according to the reset signal RSTS, thereby initializing the voltage of the floating diffusion layer 234. The floating diffusion layer 234 accumulates the transferred charge and generates a voltage corresponding to the amount of charge.

The reset transistor 235 connects the floating diffusion layer 234 to a reset voltage VRD to extract the charge from the floating diffusion layer 234 according to the reset signal RefRSTD, thereby initializing the voltage of the floating diffusion layer 234.

The amplifier transistor 236 amplifies the voltage of the floating diffusion layer 234. The source of this amplifier transistor 236 is connected to the vertical current supply line VCOM. The selection transistor 237 outputs a signal corresponding to the amplified voltage to the reference-side vertical signal line VSLR according to the selection signal SEL.

The circuit configuration of the readout pixel 200 is similar to that of the reference pixel 230. However, the transfer transistor 212 is supplied with the transfer signal SigTRG, and the reset transistor 215 is supplied with the reset signal SigRSTD. The reset transistor 215 connects the floating diffusion layer 214 to the source of the source follower transistor 221, and the drain of the amplifier transistor 216 is connected to the vertical signal line VSL through the selection transistor 217.

As the amplifier transistors 216 and 236, for example, transistors of depletion type are used.

The source follower transistor 221 and the load MOS transistor 222 are connected in series between the power supply line VDDHPX and a ground potential. The gate of the source follower transistor 221 is connected to the vertical signal line VSL, and the source thereof is connected to the drain of the reset transistor 215. The control signal SFLM from the vertical drive unit 110 is supplied to the gate of the load MOS transistor 222. The connection configuration of the source follower transistor 238 and the load MOS transistor 239 is similar to that of the source follower transistor 221 and the load MOS transistor 222. However, the gate of the source follower transistor 238 is connected to the reference-side vertical signal line VSLR, and the gate of the load MOS transistor 239 is connected to a ground terminal.

A circuit including the potential difference generation circuit 220 in each row is an example of a potential difference generation unit described in the claims.

[Configuration Example of Column Readout Unit]

Figure 4:
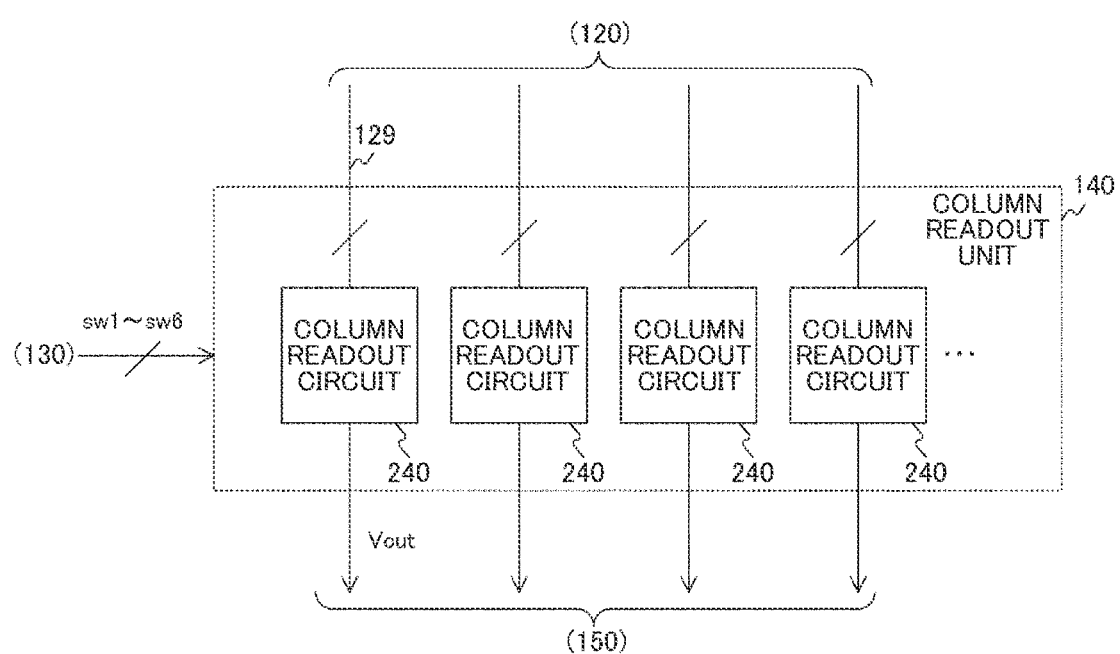
FIG. 4 is a block diagram illustrating a configuration example of a column readout unit according to the first embodiment of the present technology.

FIG. 4 is a block diagram illustrating a configuration example of the column readout unit 140 according to the first embodiment of the present technology. The column readout unit 140 is provided with a column readout circuit 240 for each column. The column readout circuit 240 outputs a pixel signal Vout to the column signal processing unit 150. Control signals sw1 to sw6 from the system control unit 130 are input to each of the column readout circuits 240.

[Configuration Example of Column Readout Circuit]

Figure 5:
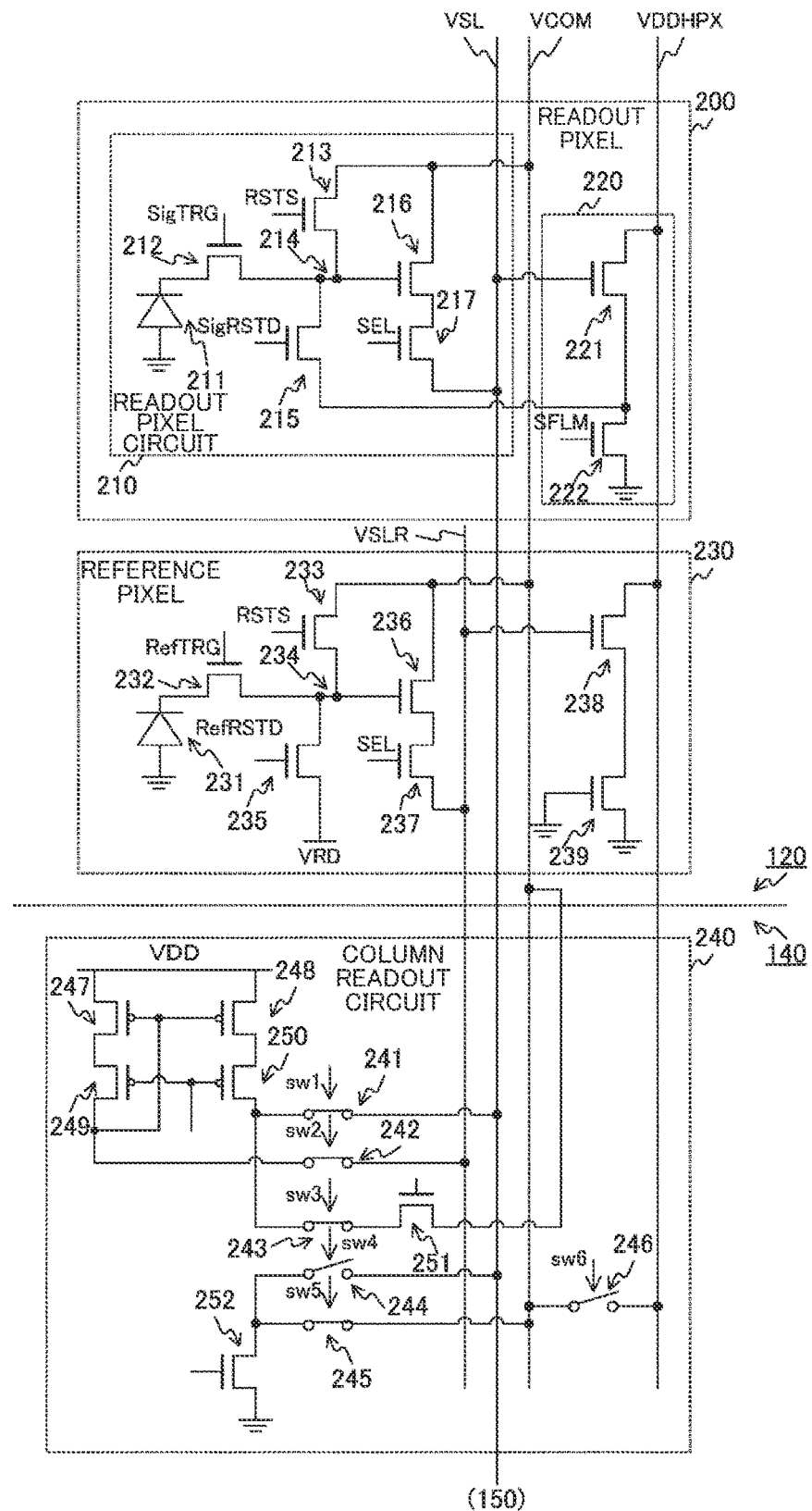
FIG. 5 is a circuit diagram illustrating a configuration example of the readout pixel, the reference pixel, and a column readout circuit, according to the first embodiment of the present technology.

FIG. 5 is a circuit diagram illustrating a configuration example of the readout pixel 200, the reference pixel 230, and the column readout circuit 240, according to the first embodiment of the present technology.

The column readout circuit 240 includes switches 241 to 246, pMOS (p-channel MOS) transistors 247 to 250, and nMOS transistors 251 and 252.

The pMOS transistors 247 and 248 are connected in parallel to a power supply voltage VDD. The gate of the pMOS transistor 247 is connected to the drain of the pMOS transistor 249 and the gate of the pMOS transistor 248. The source of the pMOS transistor 249 is connected to the drain of the pMOS transistor 247, and the source of the pMOS transistor 250 is connected to the drain of the pMOS transistor 248. A predetermined bias voltage is applied to the gates of the pMOS transistors 249 and 250.

The switch 241 opens and closes the path between the drain of the pMOS transistor 250 and the vertical signal line VSL according to the control signal sw1 from the system control unit 130. The switch 242 opens and closes the path between the drain of the pMOS transistor 249 and the reference-side vertical signal line VSLR according to the control signal sw2 from the system control unit 130.

The switch 243 opens and closes the path between the drain of the pMOS transistor 250 and the source of the nMOS transistor 251 according to the control signal sw3 from the system control unit 130. The switch 244 opens and closes the path between the vertical signal line VSL and the nMOS transistor 252 according to the control signal sw4 from the system control unit 130.

The switch 245 opens and closes the path between the vertical current supply line VCOM and the nMOS transistor 252 according to the control signal sw5 from the system control unit 130. The switch 246 opens and closes the path between the vertical current supply line VCOM and the power supply line VDDHPX according to the control signal sw6 from the system control unit 130.

The nMOS transistor 251 is inserted between the switch 243 and the vertical current supply line VCOM, and a predetermined bias voltage is applied to the gate of the nMOS transistor 251. This nMOS transistor 251 functions as a clip transistor that limits the voltage of the vertical signal line VSL to a predetermined clip level or less. A predetermined bias voltage is applied to the gate of the nMOS transistor 252. This nMOS transistor 252 functions as a current source that supplies a current according to the bias voltage.

Here, the CMOS image sensor 100 is set to either a differential mode or an SF mode. The differential mode is a mode in which the CMOS image sensor 100 generates a signal obtained by amplifying a difference between the pixel signals of a pair of pixels (i.e., by differential amplification). On the other hand, the SF mode is a mode in which a source follower readout circuit is formed to output the pixel signals without differential amplification.

In the differential mode, the gain for an image signal can be increased to greatly increase the conversion efficiency, but the operating point is narrow, making it difficult to extend the dynamic range. Accordingly, the differential mode is suitable for imaging in dark places, while the SF mode is suitable for imaging in bright places. Therefore, for example, a circuit external to the CMOS image sensor 100 measures the amount of ambient light, and an instruction for the differential mode is issued if the amount of light measured is smaller than a predetermined threshold value, and an instruction for the SF mode is issued if the amount of light measured is equal to or greater than the threshold value. The CMOS image sensor 100 itself may measure the light to set the mode.

When the differential mode is set, the system control unit 130 turns on the switches 241, 242, 243, and 245 and turns off the switches 244 and 246 by the control signals sw1 to sw6. As a result, a differential amplifier circuit is formed, and a signal obtained by amplifying a difference between the pixel signals of the reference pixel 230 and the readout pixel 200 is output as the pixel signal Vout. In the differential amplifier circuit, a part of a 2×I current supplied by the current source (the nMOS transistor 252) flows through the reference-side vertical signal line VSLR, and the rest of the current flows through the vertical signal line VSL. When the floating diffusion layers 214 and 234 are initialized, the reference current flowing through the reference-side vertical signal line VSLR and the signal current flowing through the vertical signal line VSL have the same value (I).

On the other hand, when the SF mode is set, the system control unit 130 turns off the switches 241, 242, 243, and 245 and turns off the switches 244 and 246 by the control signals sw1 to sw6. As a result, the pixel signal of the readout pixel 200 is output from the vertical signal line VSL without being subjected to differential amplification.

In the differential mode, for initialization, a potential difference between the floating diffusion layer 214 on the readout side (i.e., the gate of the amplifier transistor 216) and the drain of the amplifier transistor 216 is controlled to a potential difference between the gate and source of the source follower transistor 221.

Now, given as a first comparative example a differential amplifier circuit that does not include the potential difference generation circuit 220 and short-circuits the reset voltage VRD and the vertical signal line VSL for initialization of the floating diffusion layer. At the initialization in this first comparative example, the amplifier transistor 216 of the readout pixel 200 is diode-connected, and the following equation holds true:

$$Vgs = Vds \quad \text{Equation 1}$$

In the above equation, Vgs is the gate-source voltage of the amplifier transistor 216, and Vds is the drain-source voltage of the amplifier transistor 216.

The differential amplifier circuit of the first comparative example is a voltage follower circuit, and the differential input terminals are virtually short-circuited, and accordingly, the floating diffusion layer 214 of the readout pixel 200 and the vertical signal line VSL have the same voltage as the reset voltage VRD.

After the reset is released, the potential of the floating diffusion layer is shifted by $\Delta V_{FT}$ due to reset feedthrough. If the readout pixel circuit 210 and the reference pixel 230 have a high layout correlation, the reset feedthrough of each pixel has the same variation. Therefore, the common-mode reset feedthrough is input to the two inputs of the differential amplifier (+ and −). Since it is a common-mode signal, it does not affect the output amplitude of the vertical signal line VSL, and the reset voltage VRD set at the time of reset is maintained as it is. Therefore, the operating point of the amplifier transistor 216 after reset is represented by the following equation:

$$Vgs' + \Delta VFT \approx Vds'$$

In the above equation, Vgs' is the gate-source voltage of the amplifier transistor 216 after the reset is released, and Vds' is the drain-source voltage of the amplifier transistor 216 after the reset is released.

In addition, the potential of the vertical current supply line VCOM (i.e., the source of the amplifier transistor 216) is also shifted due to the reset feedthrough. Here, in order for the amplifier transistor 216 to operate in the saturation region, it is necessary to satisfy the following equations:

$$Vds \geq Vdsat \quad \text{Equation 2}$$

$$Vdsat = Vgs - Vth \quad \text{Equation 3}$$

In the above equation, Vth is the threshold voltage of the amplifier transistor 216.

Given an open loop gain −Av of the differential amplifier circuit, a charge-voltage conversion efficiency $\eta_{vsl}$ in the vertical signal line VSL is represented by the following equation:

$$\eta_{vsl} = e/\{C_{fd}/(-Av) + (C_{gd} + C_{fd\text{-}vsl})\} \quad \text{Equation 4}$$

In the above equation, e is an elementary charge whose unit is, for example, coulombs (C). $C_{fd}$ is the capacitance of the floating diffusion layer 214. $C_{gd}$ is the parasitic capacitance between the gate and drain of the amplifier transistor 216. $C_{fd\text{-}vsl}$ is the parasitic capacitance between the floating diffusion layer 214 and the vertical signal line VSL. The unit of these capacitances is, for example, Farads (F).

In the first comparative example, since Equation 1 holds true, Equations 2 and 3 are not fulfilled, and a difference between the drain-source voltages Vds and Vdsat becomes small. This difference is referred to as a "saturation region operating margin".

Such a small saturation region operating margin results in a reduced absolute value of the open-loop gain (−Av) and an increased contribution rate of $C_{fd}/(-Av)$ in Equation 4. This increases a gain variation $\Delta Av$ of the amplifier transistor 216. The increased gain variation $\Delta Av$ results in deterioration of photo response non-uniformity (PRNU) characteristics. Due to the deterioration of PRNU characteristics, the image quality of image data is reduced.

By contrast, in the case where the potential difference generation circuit 230 is provided, the potential difference between the gate and drain of the amplifier transistor 216 can be controlled to a value of $\Delta Va$ generated by the potential difference generation circuit 230 at the time of reset. The potential difference $\Delta Va$ is set, for example, to be equal to or higher than a threshold voltage Vth. As a result, the saturation region operation margin becomes large, and Equations 2 and 3 are satisfied. Consequently, the absolute value of the open-loop gain (−Av) is increased, the contribution rate of Cfd/(−Av) in Equation 4 is reduced, and the gain variation $\Delta Av$ of the amplifier transistor 216 is reduced. Such a reduced gain variation $\Delta Av$ results in excellent PRNU characteristics, so that the image quality can be improved.

Figure 6:
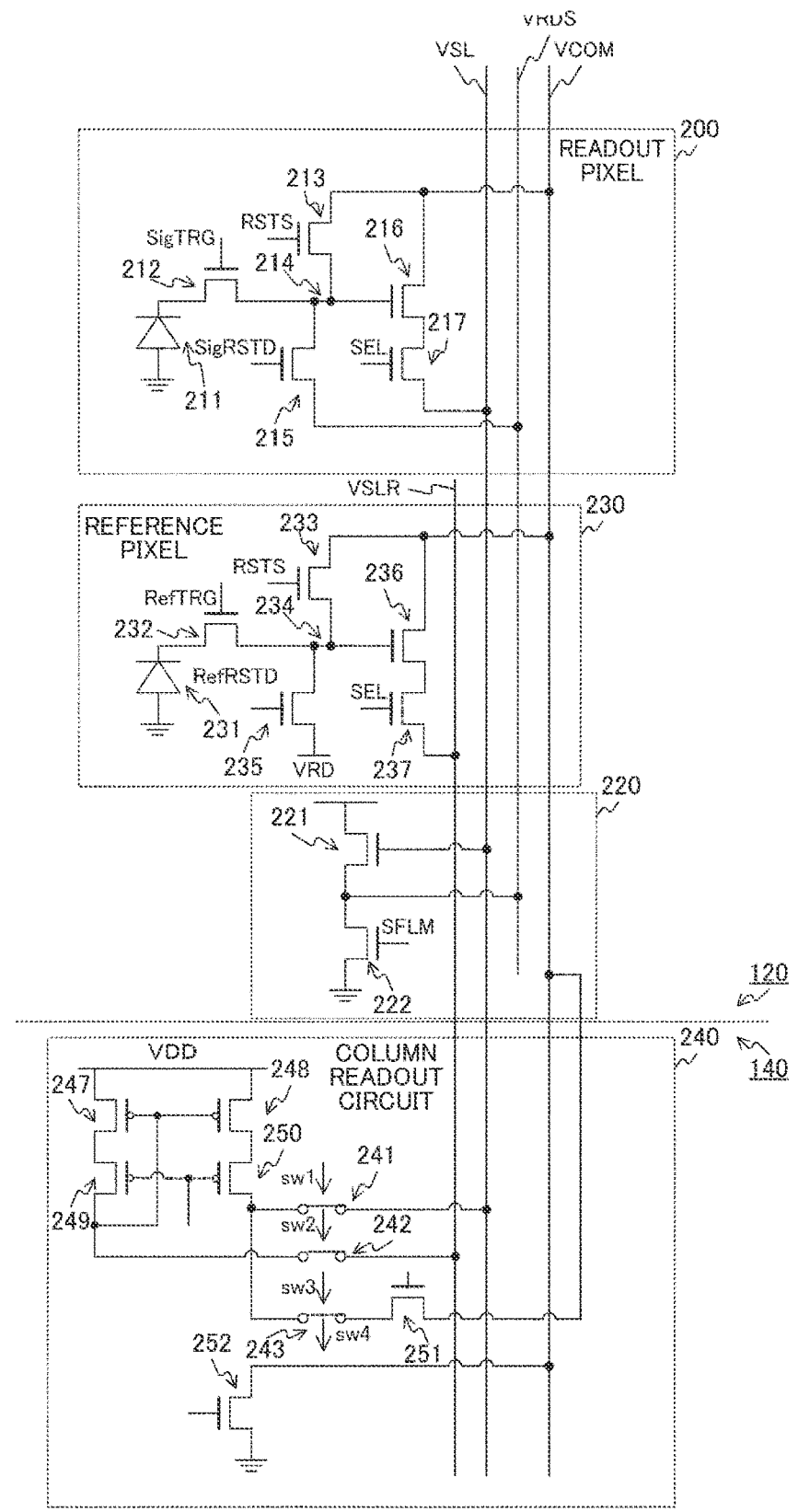
FIG. 6 is a circuit diagram illustrating a configuration example of a readout pixel, a reference pixel, and a column readout circuit, according to a second comparative example.

Next, as illustrated by way of example in FIG. 6, given as a second comparative example a configuration in which the potential difference generation circuit 220 is arranged for each column.

In the second comparative example, considering the operating point of the amplifier transistor 216, the following equation holds true:

$$V_{ds\_amp} = V_{gs\_amp} + V_{gs\_SF} = V_{gs\_amp} + V_{ov\_SF} + V_{th\_SF} \quad \text{Equation 5}$$

In the above equation, Vds_amp is the drain-source voltage of the amplifier transistor 216, and Vgs_amp is the gate-source voltage of the transistor. $V_{gs\_SF}$ is the gate-source voltage of the source follower transistor 221. $V_{ov\_SF}$ is an overdrive voltage necessary to cause a current to flow through the source follower transistor 221, and $V_{th\_SF}$ is the threshold voltage of the source follower transistor 221.

As illustrated by way of example in the drawing, in the second comparative example, the source follower transistor 221 is arranged for each column. Therefore, if there is a variation in the threshold voltage $V_{th\_SF}$, the operating points of all pixels in the same column are determined by Equation 5, including the variation, and $V_{ds\_amp}$ also varies accordingly. Therefore, the Av term in the conversion efficiency equation varies from column to column, which enhances the column-to-column variations in conversion efficiency. This may cause a gain-based vertical streak(s), which is a problem because the larger the amount of light, the larger output signal differences between columns occur.

By contrast, in the CMOS image sensor 100 in which the source follower transistor 221 is arranged for each pixel, the variation in $C_{fd}/(-Av)$ occurs in each pixel instead of each column. As a result, gain-based vertical streaks are prevented, and thus, the image quality can be improved, as compared to in the second comparative example.

[Operation Example of Solid-State Imaging Element]

Figure 7:
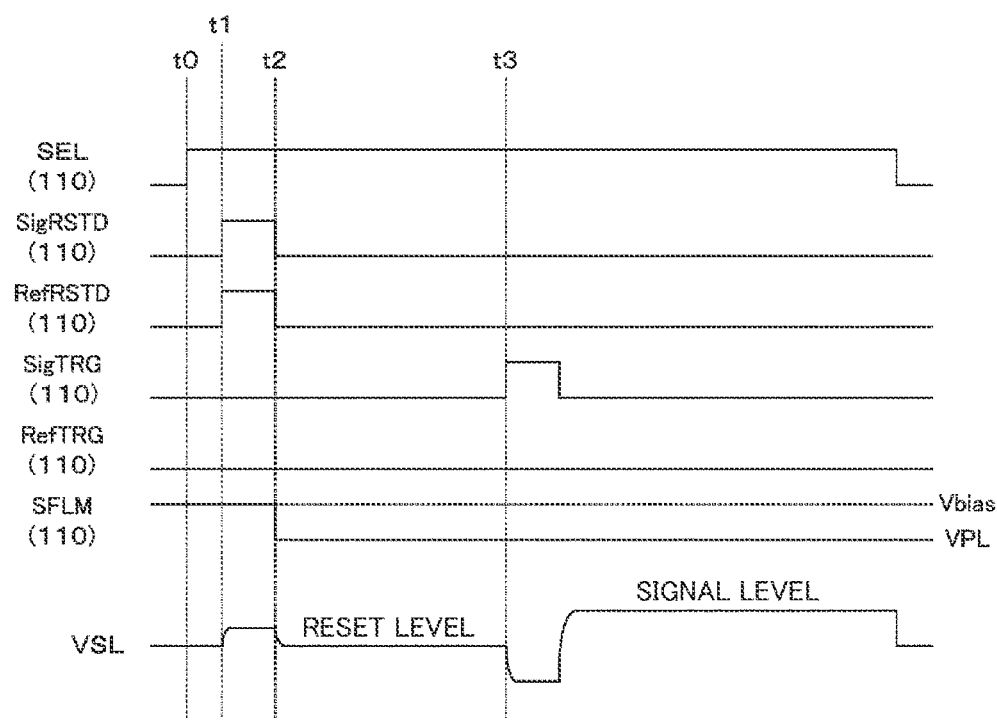
FIG. 7 is a timing chart illustrating an example of a readout operation in a differential mode in the first embodiment of the present technology.

FIG. 7 is a timing chart illustrating an example of a readout operation in the differential mode in the first embodiment of the present technology. At start timing t0 of reading out a predetermined row, the vertical drive unit 110 sets the selection signal SEL for that row to high level.

Then, the vertical drive unit 110 supplies reset signals SigRSTD and RefRSTD with high level within a period of timing t1 to timing t2 for initialization. As a result, the floating diffusion layers 214 and 234 are initialized, and a reset level is generated.

At timing t2, the vertical drive unit 110 reduces the control signal SFLM from a bias voltage Vbias to a substrate voltage VPL. The bias voltage Vbias has a value equal to or higher than the threshold voltage of load MOS transistor 222, and the substrate voltage VPL has a value lower than the bias voltage Vbias. This control makes it possible to turn off the load MOS transistor 222 after initialization to save current consumption. The control signal SFLM for unselected rows is controlled to high level in the initial state.

Then, the vertical drive unit 110 supplies a transfer signal SigTRG with high level over a pulse period from transfer timing t3. As a result, charge is transferred to the floating diffusion layer 214 so that a signal level is generated.

Figure 8:
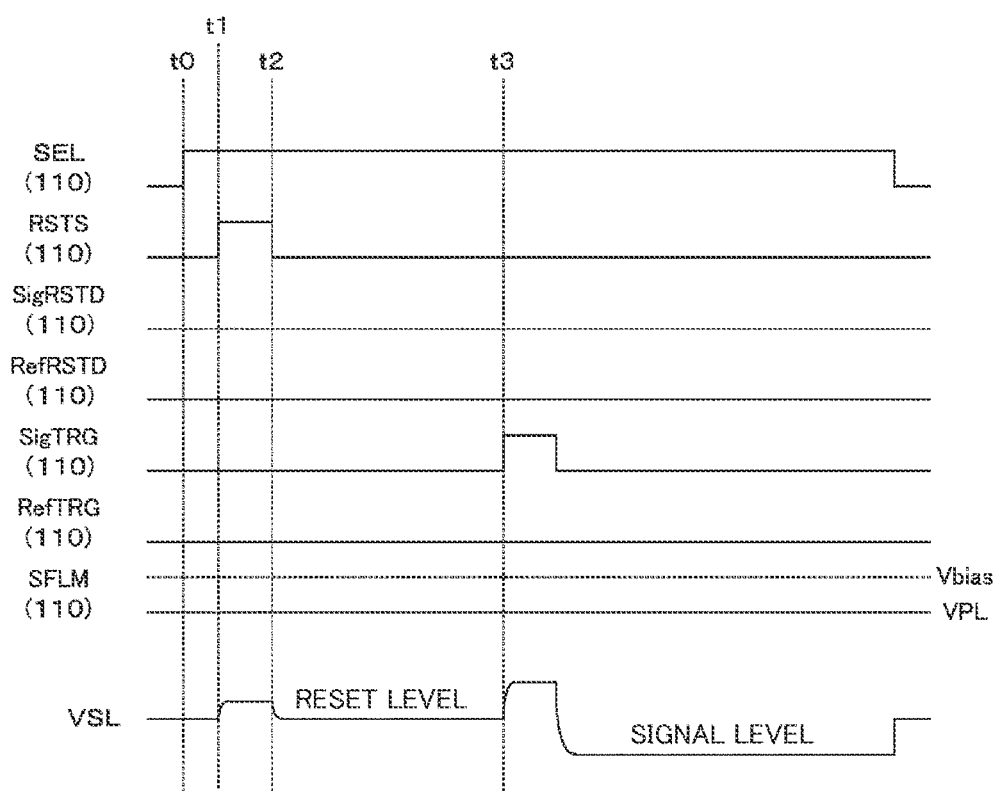
FIG. 8 is a timing chart illustrating an example of a readout operation in a source follower (SF) mode in the first embodiment of the present technology.

FIG. 8 is a timing chart illustrating an example of a readout operation in the SF mode in the first embodiment of the present technology. At start timing to of reading out the selected row, the vertical drive unit 110 sets the selection signal SEL for that row to high level.

The vertical drive unit 110 supplies a reset signal RSTS with high level within a period of timing t1 to timing t2 for initialization. As a result, the floating diffusion layers 214 is initialized, and a reset level is generated.

Then, the vertical drive unit 110 supplies a transfer signal SigTRG with high level over a pulse period from transfer timing t3. As a result, charge is transferred to the floating diffusion layer 214 so that a signal level is generated.

Figure 9:
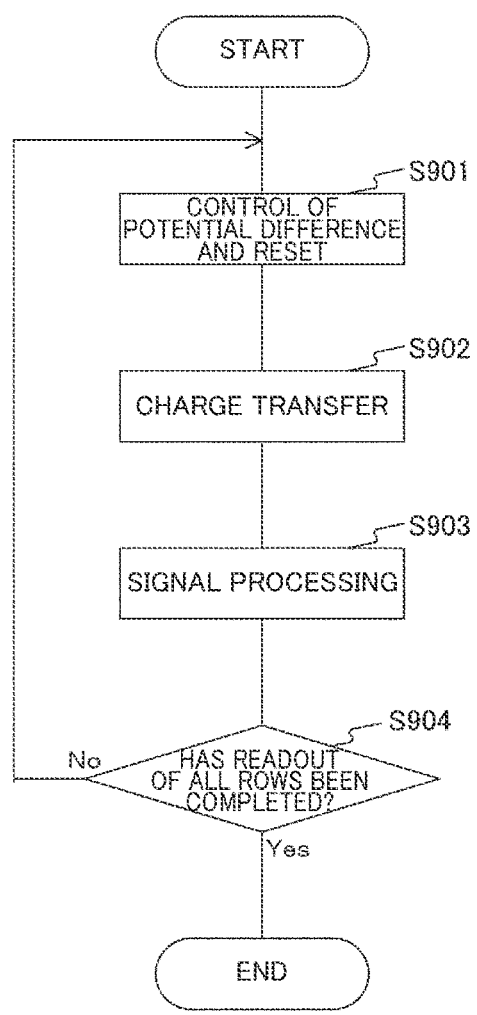
FIG. 9 is a flowchart illustrating an example of an operation of the CMOS image sensor according to the first embodiment of the present technology.

FIG. 9 is a flowchart illustrating an example of the operation of the CMOS image sensor 100 according to the first embodiment of the present technology. This operation is started, for example, when the differential mode is set.

The CMOS image sensor 100 selects a row, and resets the floating diffusion layer while controlling the potential difference between the gate and drain of each amplifier transistor 216 in the selected row to ΔVa (step S901). The CMOS image sensor 100 transfers charges to the floating diffusion layers in the selected row (step S902), and performs signal processing such as AD conversion processing and CDS processing (step S903).

The CMOS image sensor 100 determines whether or not the readout of all the rows has been completed (step S904). If the readout of all the rows has not been completed (step S904: No), the CMOS image sensor 100 repeats step S901 and subsequent steps. On the other hand, if the readout of all the pixels has been completed (step S904: Yes), the CMOS image sensor 100 ends the operation for imaging. The control illustrated by way of example in FIG. 7 is performed in steps S901 and S902 of FIG. 9.

In a case of continuously capturing a plurality of pieces of image data, steps S901 to S904 are repeatedly executed in synchronization with a vertical synchronization signal.

Figure 10:
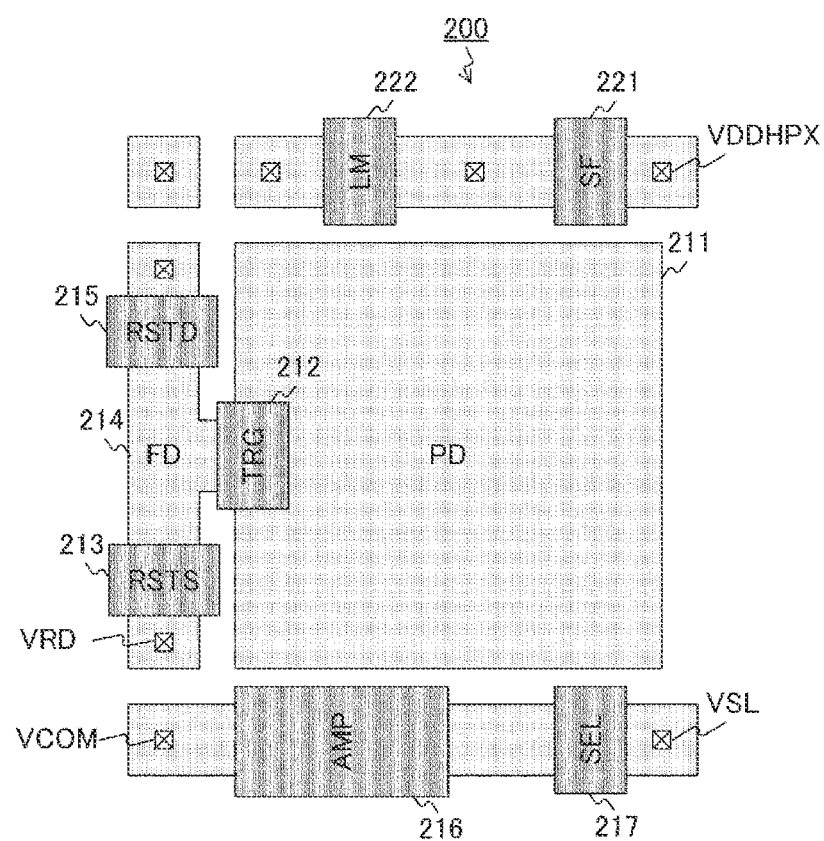
FIG. 10 is a diagram illustrating an example of a layout of elements in the readout pixel according to the first embodiment of the present technology.

FIG. 10 is a diagram illustrating an example of a layout of elements in the readout pixel according to the first embodiment of the present technology. The transfer transistor 212 is arranged between the photoelectric conversion element 211 and the floating diffusion layer 214. The source follower transistor 221, the load MOS transistor 222, reset transistors 213 and 215, the amplifier transistor 216, and the selection transistor 217 are arranged around the photoelectric conversion element 211.

The layout (not illustrated) of the reference pixel 230 is the same as that of the readout pixel 200 except that it differs in the connection destinations of the reset transistor 235 and the selection transistor 237.

As described above, according to the first embodiment of the present technology, the source follower transistor 221 to control the potential difference between the gate and drain of the amplifier transistor 216 to ΔVa is provided for each pixel, so that gain-based vertical streaks are prevented, and thus, the image quality can be improved.

2. Second Embodiment

In the first embodiment described above, the current is cut off by controlling the gate voltage of the load MOS transistor 222. However, with this configuration, in order to select the row again, it takes time until the gate voltage stabilizes, which may reduce the frame rate. The CMOS image sensor 100 according to a second embodiment differs from the first embodiment in that a transistor for cutting off current is inserted between the source follower transistor 221 and the load MOS transistor 222.

Figure 11:
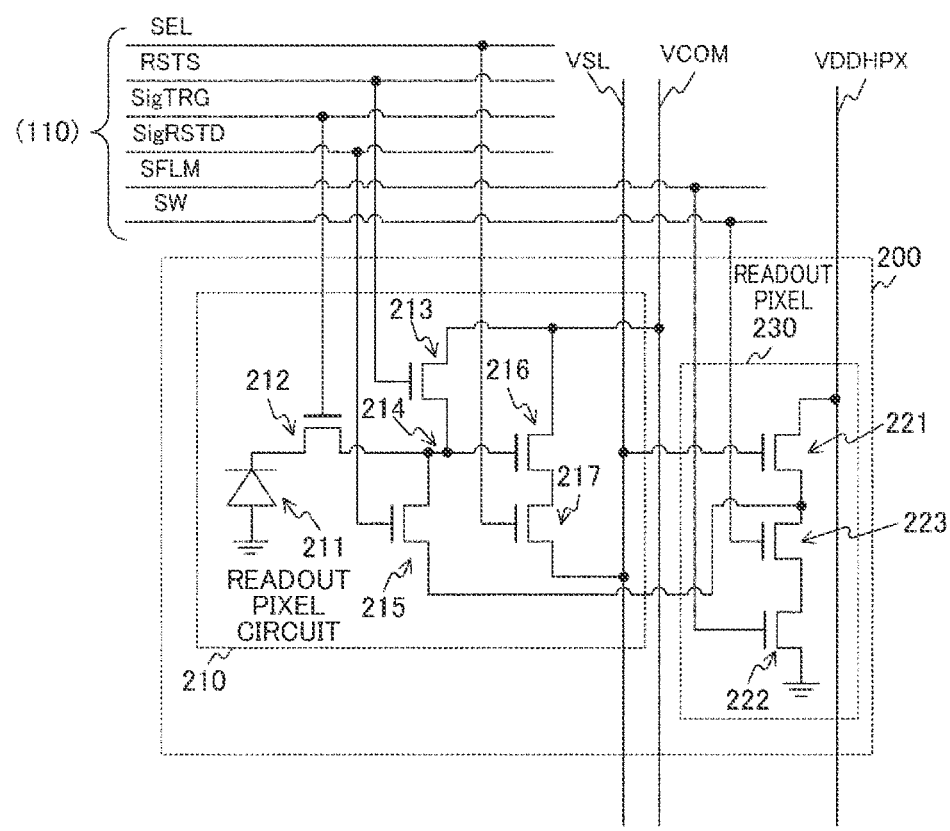
FIG. 11 is a circuit diagram illustrating a configuration example of a readout pixel according to a second embodiment of the present technology.

FIG. 11 is a circuit diagram illustrating a configuration example of a readout pixel 200 according to the second embodiment of the present technology. The readout pixel 200 according to the second embodiment differs from that according to the first embodiment in that the potential difference generation circuit 220 further includes a current cutoff transistor 223. As the current cutoff transistor 223, an nMOS transistor is used, for example.

The current cutoff transistor 223 opens and closes the path between the source follower transistor 221 and the load MOS transistor 222 according to the control signal SW from the vertical drive unit 110. The circuit configuration of the reference pixel 230 according to the second embodiment is similar to the readout pixel 200 except that it differs in the connection destinations of the reset transistor 235 and the selection transistor 237. The same applies to subsequent embodiments.

Figure 12:
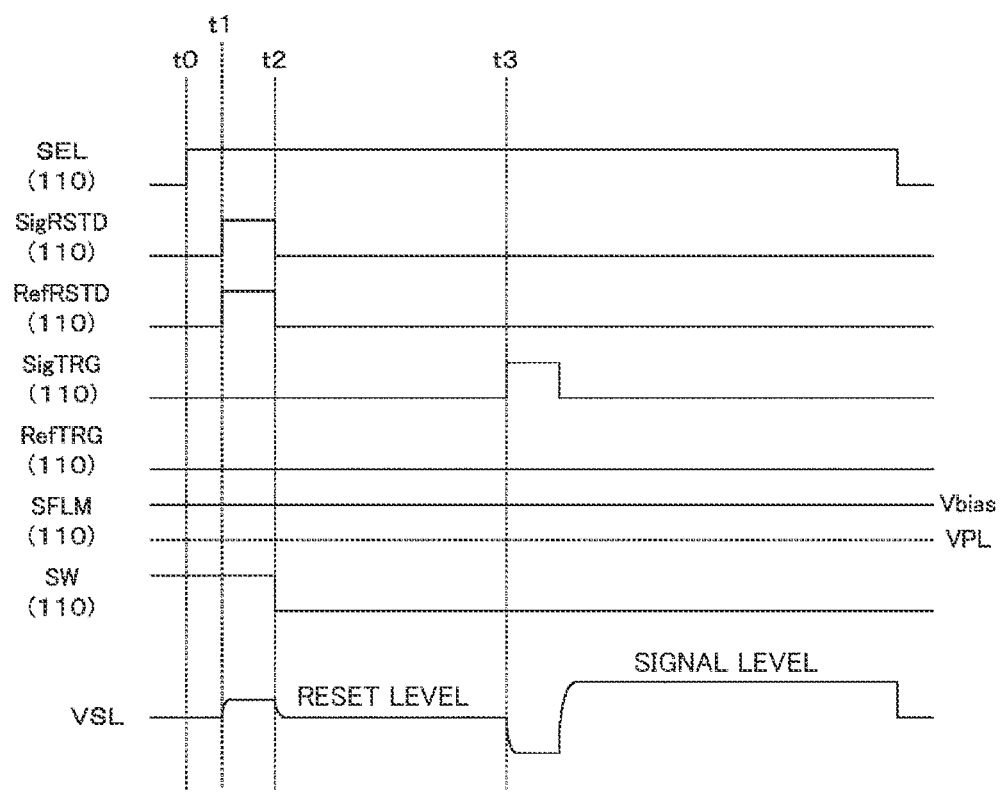
FIG. 12 is a timing chart illustrating an example of a readout operation in a differential mode in the second embodiment of the present technology.

FIG. 12 is a timing chart illustrating an example of a readout operation in the differential mode in the second embodiment of the present technology. In this second embodiment, the vertical drive unit 110 controls the control signal SW for the selected row from high level to low level at timing t2 which is the end of initialization to turn off the current cutoff transistor 223. On the other hand, the control signal SFLM is controlled to high level. The control signal SW for unselected rows is controlled to high level in the initial state.

By providing the current cutoff transistor 223, there is no need to control the gate voltage of the load MOS transistor 222 (i.e., the control signal SFLM), as illustrated by way of example in the drawing. Therefore, there is no need to wait for the gate voltage stabilizing in order to select a row again, and thus, the frame rate can be improved.

Figure 13:
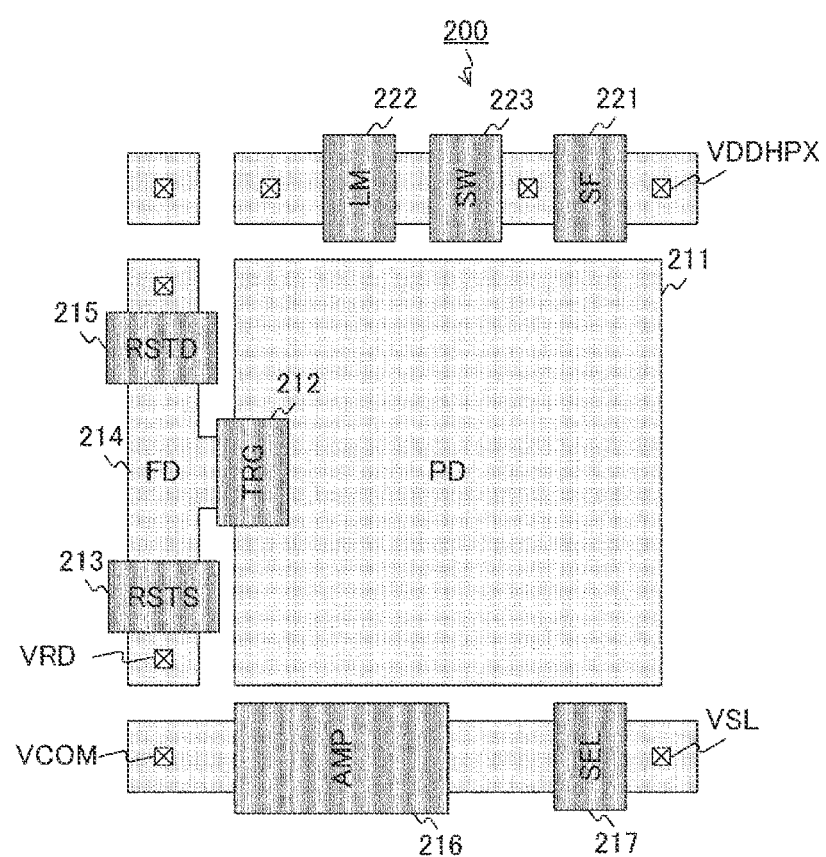
FIG. 13 is a diagram illustrating an example of a layout of elements in the readout pixel according to the second embodiment of the present technology.

FIG. 13 is a diagram illustrating an example of a layout of elements in the readout pixel 200 according to the second embodiment of the present technology. This layout of the readout pixel 200 according to the second embodiment differs from that according to the first embodiment in that a current cutoff transistor 223 is further arranged between the source follower transistor 221 and the load MOS transistor 222. The layout (not illustrated) of the reference pixel 230 according to the second embodiment is the same as the readout pixel 200 except that it differs in the connection destinations of the reset transistor 235 and the selection transistor 237.

As described above, according to the second embodiment of the present technology, the current cutoff transistor 223 that opens and closes the path between the source follower transistor 221 and the load MOS transistor 222 is provided, so that there is no need to control the gate voltage of the load MOS transistor 222. As a result, the frame rate can be improved.

3. Third Embodiment

In the first embodiment described above, the source of the load MOS transistor 222 is connected to the ground potential. However, with that configuration, it is difficult to further reduce the number of transistors. A CMOS image sensor 100 according to this third embodiment differs from that according to the first embodiment in that the source voltage of the load MOS transistor 222 is controlled.

Figure 14:
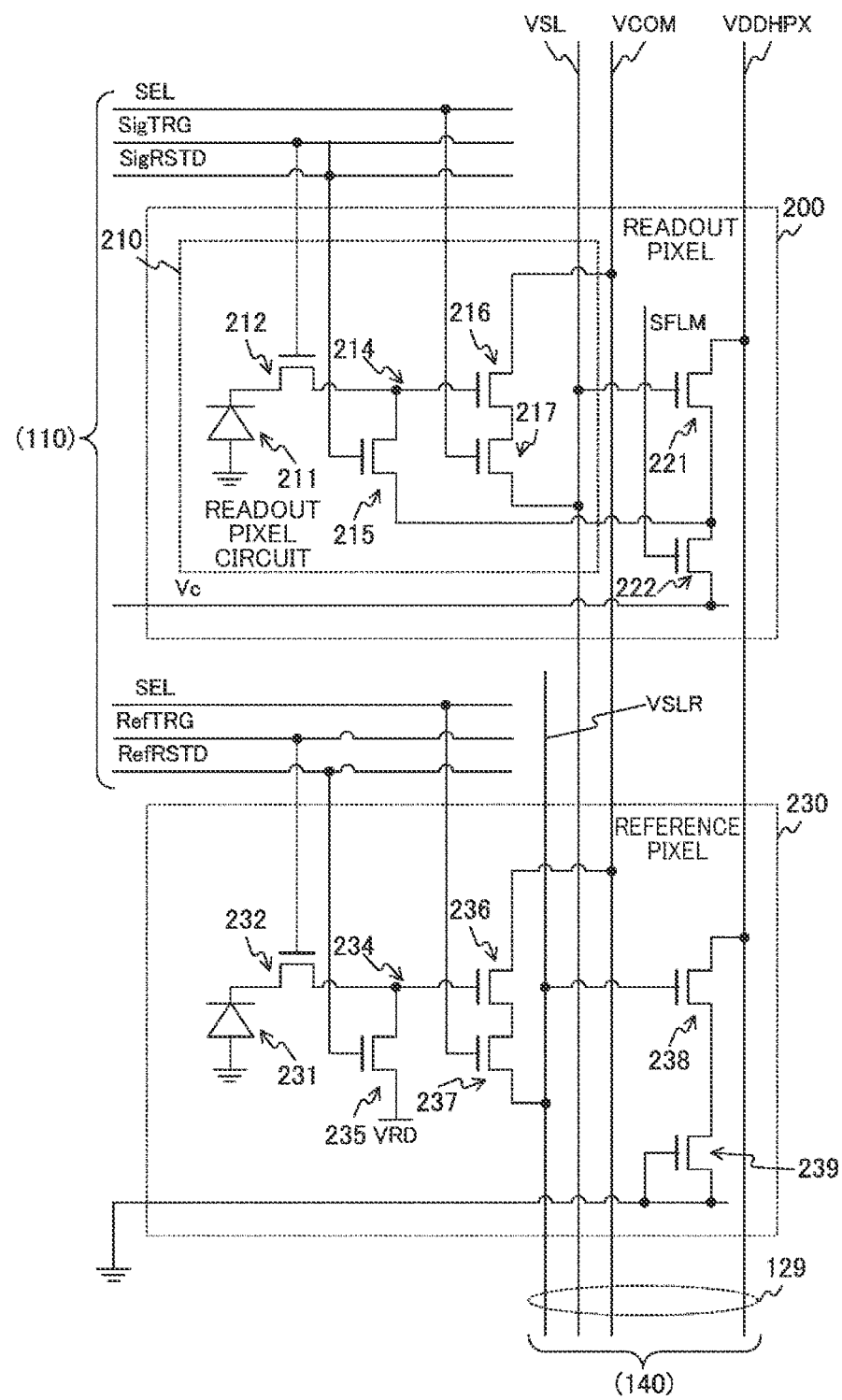
FIG. 14 is a circuit diagram illustrating a configuration example of a readout pixel and a reference pixel, according to a third embodiment of the present technology.

FIG. 14 is a circuit diagram illustrating a configuration example of a readout pixel 200 and a reference pixel 230, according to the third embodiment of the present technology. The readout pixel 200 according to this third embodiment differs from that according to the first embodiment in that a control voltage Vc is supplied to the source of the load MOS transistor 222 and the reset transistor 213 is not included.

The reference pixel 230 according to the third embodiment differs from that according to the first embodiment in that it does not include the reset transistor 233.

Figure 15:
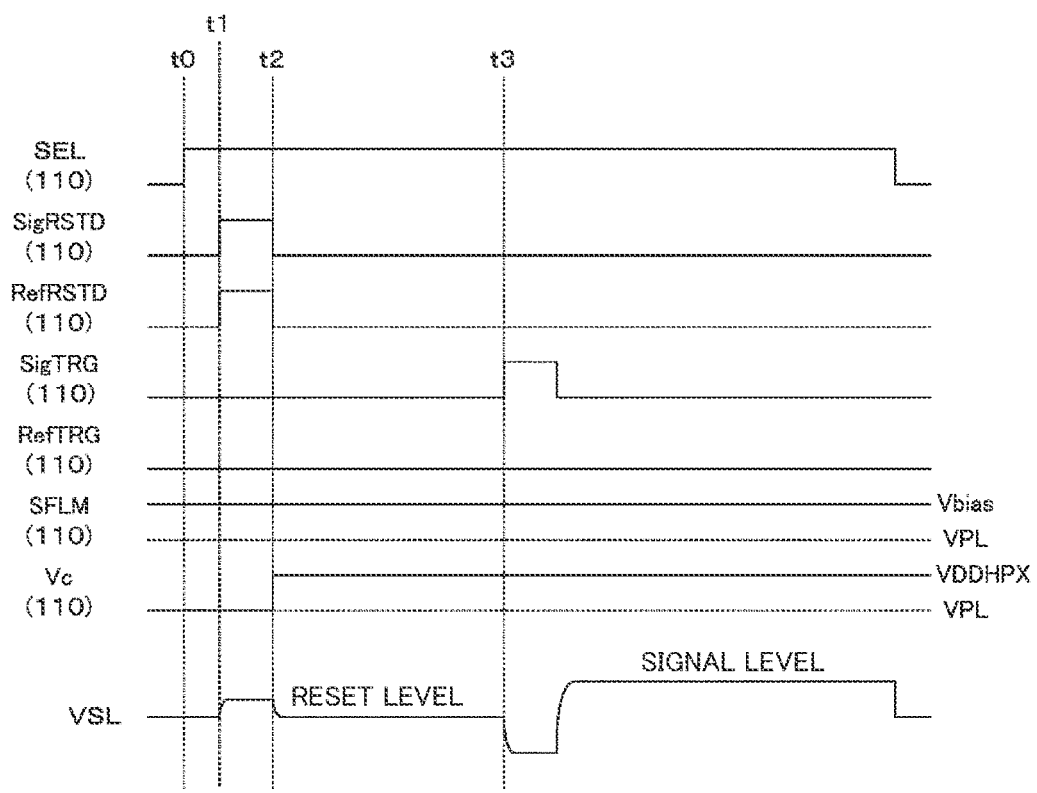
FIG. 15 is a timing chart illustrating an example of a readout operation in a differential mode in the third embodiment of the present technology.

FIG. 15 is a timing chart illustrating an example of a readout operation in a differential mode in the third embodiment of the present technology. The vertical drive unit 110 controls the control voltage Vc to the selected row (i.e., the source voltage of the load MOS transistor 222) from low level to high level at timing t2 which is the end of initialization. On the other hand, the control signal SFLM remains at high level. The control voltage Vc to unselected rows is controlled to low level in the initial state.

Figure 16:
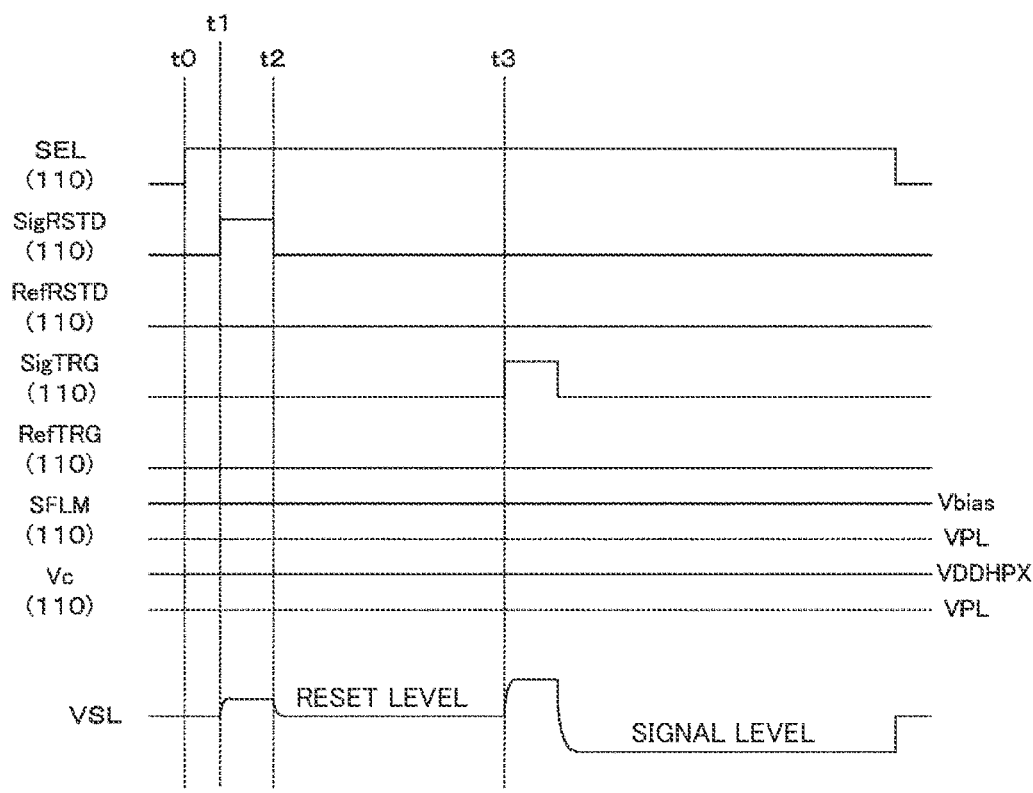
FIG. 16 is a timing chart illustrating an example of a readout operation in an SF mode in the third embodiment of the present technology.

FIG. 16 is a timing chart illustrating an example of a readout operation in an SF mode in the third embodiment of the present technology. The control voltage Vc and the control signal SFLM are controlled to high level. As a result, the gate and source of the load MOS transistor 222 become high level in the SF mode, so that the voltages of the floating diffusion layers 214 and 234 can be initialized. Therefore, the reset transistors 213 and 233 for initialization in the SF mode are not required.

Figure 17:
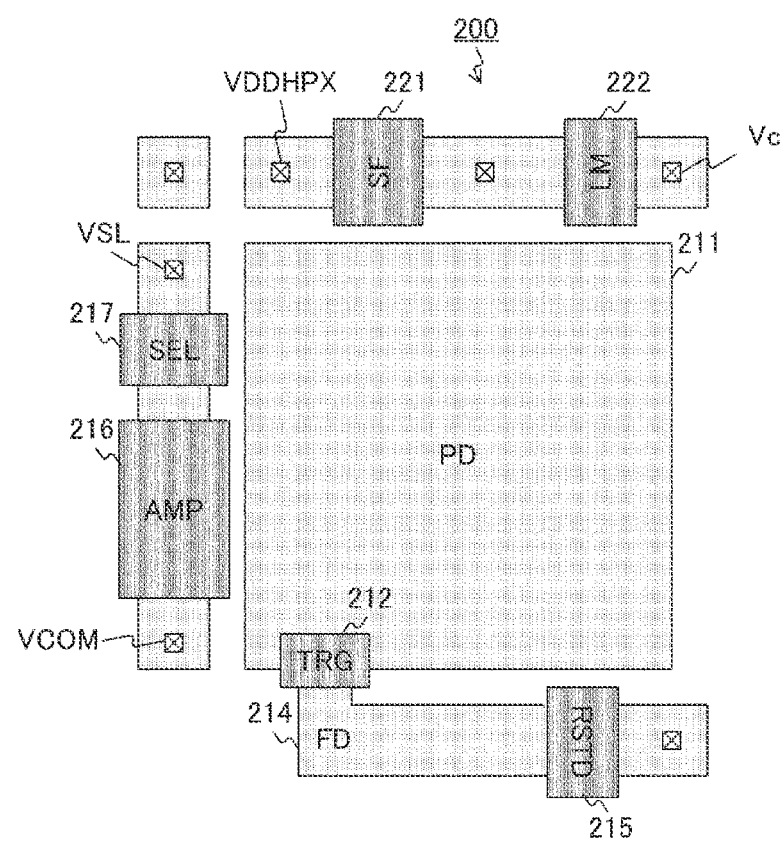
FIG. 17 is a diagram illustrating an example of a layout of elements in the readout pixel according to the third embodiment of the present technology.

FIG. 17 is a diagram illustrating an example of a layout of elements in the readout pixel 200 according to the third embodiment of the present technology. The layout of the readout pixel 200 according to this third embodiment differs from that according to the first embodiment in that the reset transistor 213 is not arranged and the control voltage Vc is connected to the source of the load MOS transistor 222.

The layout (not illustrated) of the reference pixel 230 according to the third embodiment is the same as that of the readout pixel 200 except that it differs in the connection destinations of the reset transistor 235 and the selection transistor 237.

As described above, according to the third embodiment of the present technology, the vertical drive unit 110 controls the source voltage (control voltage Vc) of the load MOS transistor 222, so that the reset transistors 213 and 233 can be eliminated.

4. Fourth Embodiment

In the first embodiment described above, the gate of the source follower transistor 221 of each pixel is connected to the vertical signal line VSL. However, with that configuration, the source follower transistors 221 are connected in parallel corresponding to the number of pixels arranged in the vertical direction. Consequently, the gate capacitances of these transistors are added to the vertical signal line VSL, which may result in deterioration of settling. A CMOS image sensor 100 according to this fourth embodiment differs from that according to the first embodiment in that the connection destination of the gate of the source follower transistor 221 is changed.

Figure 18:
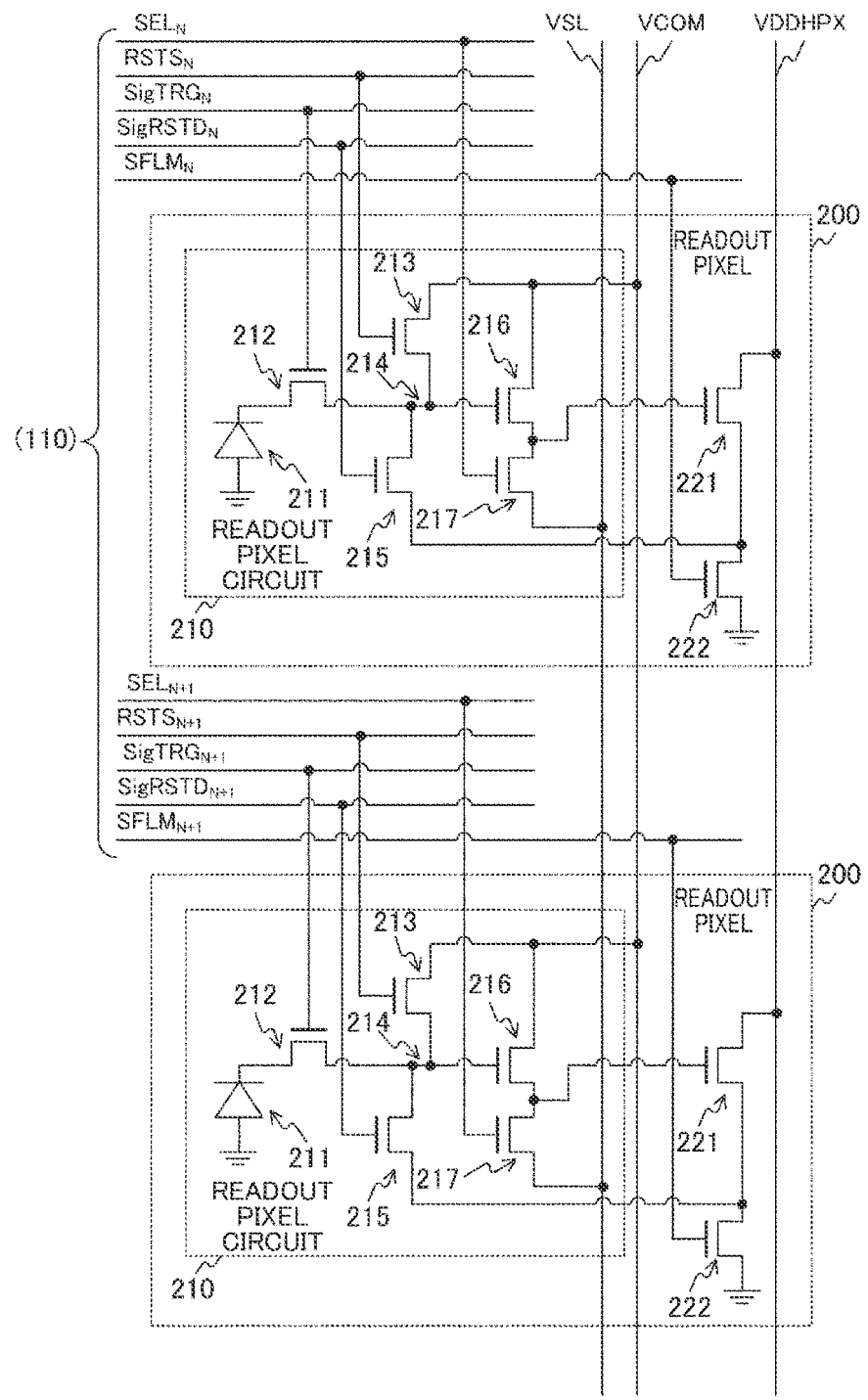
FIG. 18 is a circuit diagram illustrating a configuration example of a readout pixel according to a fourth embodiment of the present technology.

FIG. 18 is a circuit diagram illustrating a configuration example of a readout pixel 200 according to the fourth embodiment of the present technology. The readout pixel 200 according to this fourth embodiment differs from that according to the first embodiment in that the gate of the source follower transistor 221 is connected to a connection node between the amplifier transistor 216 and the selection transistor 217. With this connection, the gate capacitance of the source follower transistor 221 is separated from the vertical signal line VSL, and deterioration of settling can be avoided.

Here, signals supplied to the N-th row by the vertical drive unit 110 are referred to as $SEL_N$, $RSTS_N$, $SigTRG_N$, $SigRSTD_N$, and $SFLM_N$.

Figure 19:
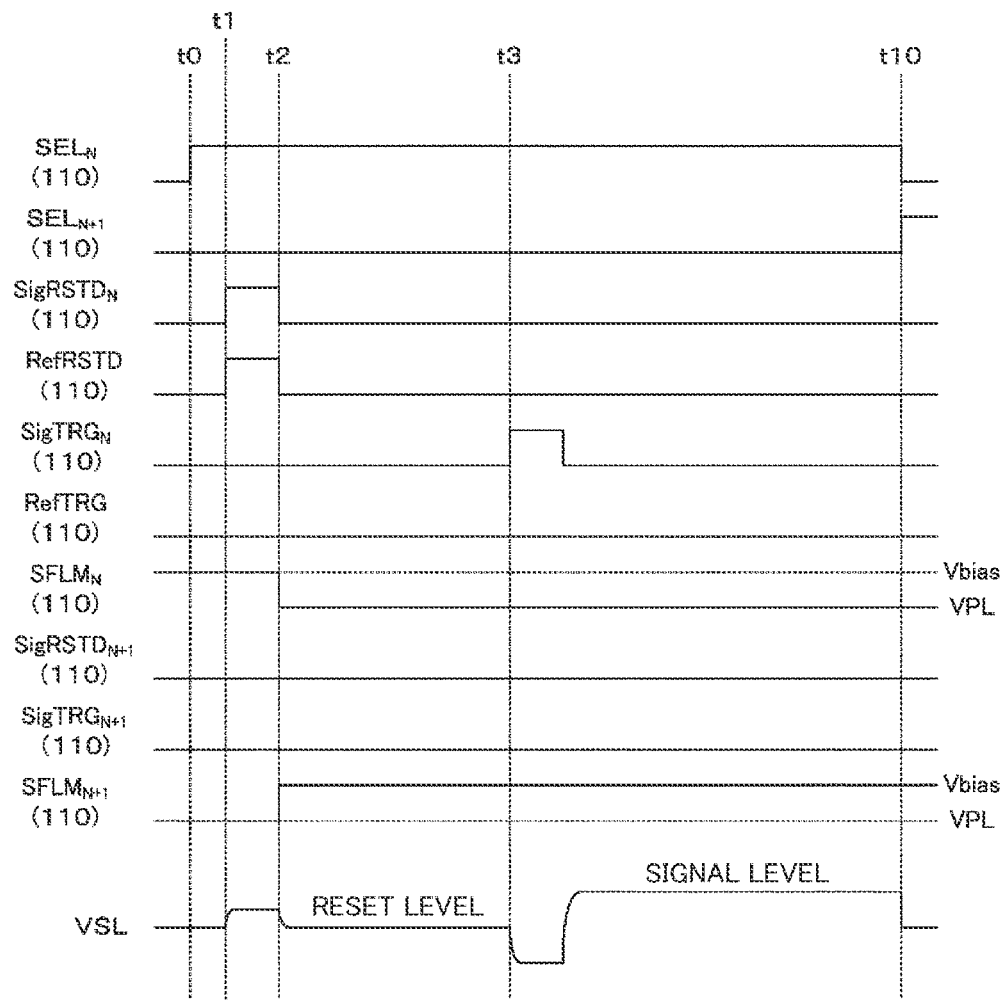
FIG. 19 is a timing chart illustrating an example of a readout operation for the N-th row (where N is an integer) in a differential mode in the fourth embodiment of the present technology.

FIG. 19 is a timing chart illustrating an example of a readout operation for the N-th row in a differential mode in the fourth embodiment of the present technology. At start timing t0 of reading out the N-th row, the vertical drive unit 110 sets the selection signal $SEL_N$ for that row to high level.

The vertical drive unit 110 supplies reset signals $SigRSTD_N$ and RefRSTD with high level within a period of timing t1 to timing t2 for initialization. Then, the vertical drive unit 110 supplies a transfer signal $SigTRG_N$ with high level over a pulse period from transfer timing t3.

The vertical drive unit 110 changes the control signal SFLMN for the selected N-th row from high level to low level at timing t2, and changes the control signal $SFLM_{N+1}$ for the next selected (N+1)-th row from low level to high level.

Figure 20:
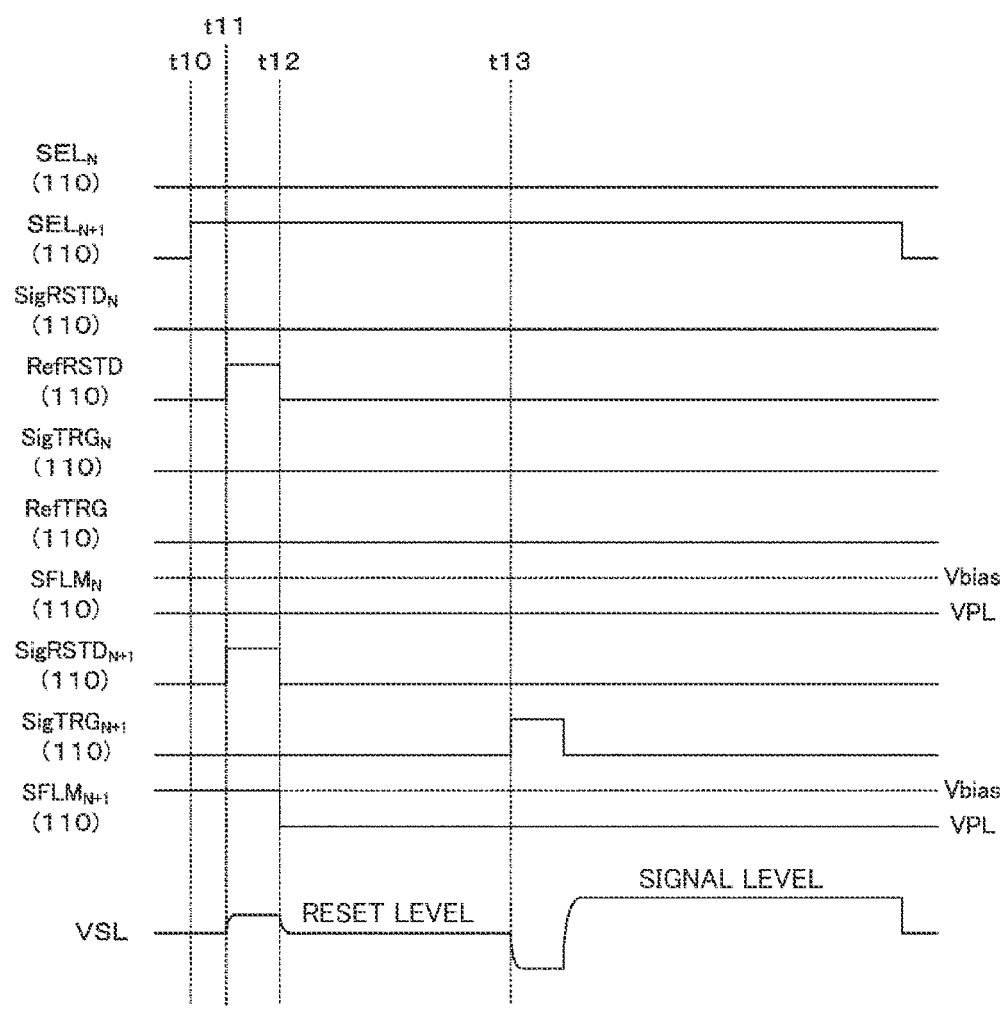
FIG. 20 is a timing chart illustrating an example of a readout operation for the (N+1)-th row in the differential mode in the fourth embodiment of the present technology.

FIG. 20 is a timing chart illustrating an example of a readout operation for the (N+1)-th row in the differential mode in the fourth embodiment of the present technology. At start timing t10 of reading out the (N+1)-th row, the vertical drive unit 110 sets the selection signal $SEL_{N+1}$ for that row to high level.

The vertical drive unit 110 supplies reset signals Sig-$RSTD_{N+1}$ and RefRSTD with high level within a period of timing t11 to timing t12 for initialization. Then, the vertical drive unit 110 supplies a transfer signal $SigTRG_{N+1}$ with high level over a pulse period from transfer timing t13.

The vertical drive unit 110 changes the control signal $SFLM_{N+1}$ for the (N+1)-th row from high level to low level at timing t12.

Figure 21:
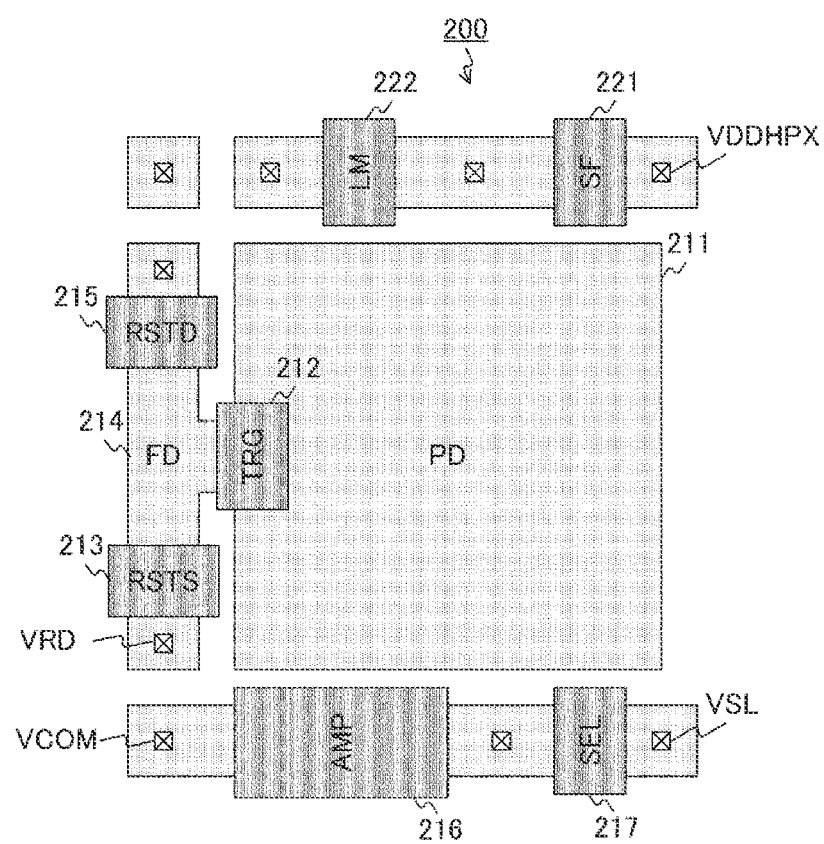
FIG. 21 is a diagram illustrating an example of a layout of elements in the readout pixel according to the fourth embodiment of the present technology.

FIG. 21 is a diagram illustrating an example of a layout of elements in the readout pixel 200 according to the fourth embodiment of the present technology. A connection terminal is added between the amplifier transistor 216 and the selection transistor 217, according to the fourth embodiment, and the terminal is connected to the gate of the source follower transistor 221. The layout (not illustrated) of the reference pixel 230 according to the fourth embodiment is the same as the readout pixel 200 except that it differs in the connection destinations of the reset transistor 235 and the selection transistor 237.

As described above, according to the fourth embodiment of the present technology, the gate of the source follower transistor 221 is connected to the connection node between the amplifier transistor 216 and the selection transistor 217, so that deterioration of settling can be suppressed.

5. Fifth Embodiment

In the first embodiment described above, the source follower transistor 221 and the load MOS transistor 222 are connected in series. However, with that configuration, it may not be possible to sufficiently reduce variations in conversion efficiency. A CMOS image sensor 100 of this fifth embodiment differs from that according to the first embodiment in that a switch is provided between the load MOS transistor 222 and the source follower transistor 221.

Figure 22:
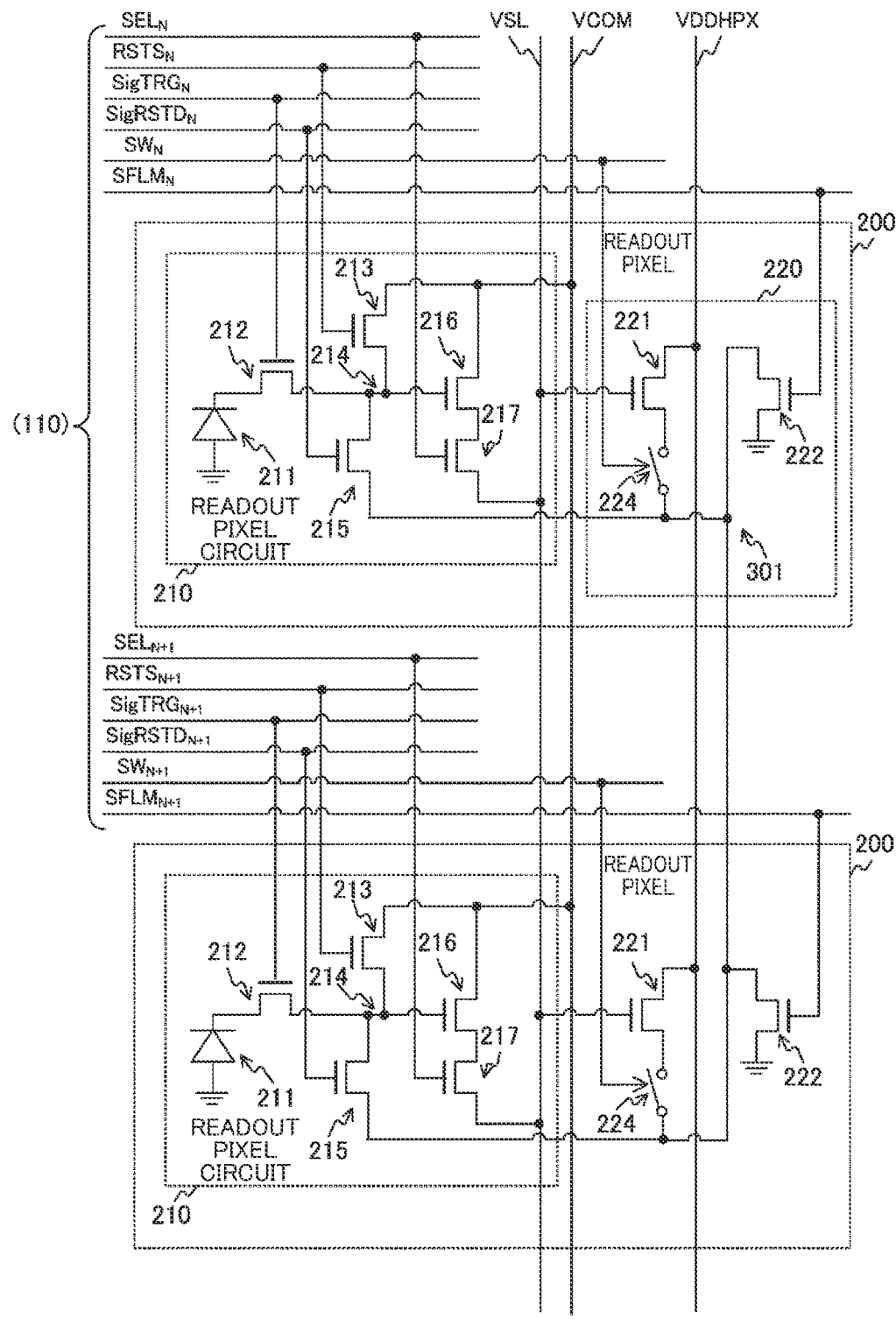
FIG. 22 is a circuit diagram illustrating a configuration example of a readout pixel according to a fifth embodiment of the present technology.

FIG. 22 is a circuit diagram illustrating a configuration example of a readout pixel 200 according to the fifth embodiment of the present technology. The readout pixel 200 according to this fifth embodiment differs from that according to the first embodiment in that the potential difference generation circuit 220 further includes a switch 224.

In each column, the load MOS transistor 222 in the N-th row and the load MOS transistor 222 in the (N+1)-th row are connected in parallel between a node 301 and a ground potential. The reset transistor 215 in the N-th row and the reset transistor 215 in the (N+1)-th row are commonly connected to the node 301.

The switch 224 in the N-th row opens and closes the path between the source of the source follower transistor 221 in the N-th row and the node 301 according to a control signal $SW_N$. The switch 224 in the (N+1)-th row opens and closes the path between the source of the source follower transistor 221 in the (N+1)-th row and the node 301 according to a control signal $SW_{N+1}$.

The source follower transistor 221, the load MOS transistor 222, and the switch 224 in the N-th row are examples of a first source follower transistor, a first load MOS transistor, and a first switch, which are described in the claims. The source follower transistor 221, the load MOS transistor 222, and the switch 224 in the N+1th row are examples of the second source follower transistor, the second load MOS transistor, and the second switch described in the claims.

The vertical drive unit 110 turns on the switch 224 in one of two adjacent rows (such as the N-th row) and turns off the switch 224 in the other row by the control signal $SW_N$ or $SW_{N+1}$ at initialization for imaging. For each set of two adjacent rows in a column, one to be turned on is randomly selected. As a result, variations in conversion efficiency result in random noise. Consequently, variations in conversion efficiency can be further suppressed.

The vertical drive unit 110 can also control both the switches 224 in two adjacent rows to be on at the same time. As a result, the two load MOS transistors 222 are connected in parallel, which means that a load MOS transistor with substantially the double size is connected. Consequently, variations in conversion efficiency between elements can be reduced.

For each column, the load MOS transistors 222 in two adjacent rows are connected in parallel to the common node. However, the load MOS transistors 222 in three or more adjacent rows may be connected in parallel to a common node.

As described above, according to the fifth embodiment of the present technology, the switch 224 is provided between the load MOS transistor 222 and the source follower transistor 221, so that variations in conversion efficiency can be further reduced by controlling the switch.

6. Sixth Embodiment

In the first embodiment described above, the load MOS transistor 222 is arranged for each readout pixel 200. However, with that configuration, it is difficult to reduce the size of the readout pixel 200. A CMOS image sensor 100 according to this sixth embodiment differs from that according to the first embodiment in that the load MOS transistor 222 is arranged for each column.

Figure 23:
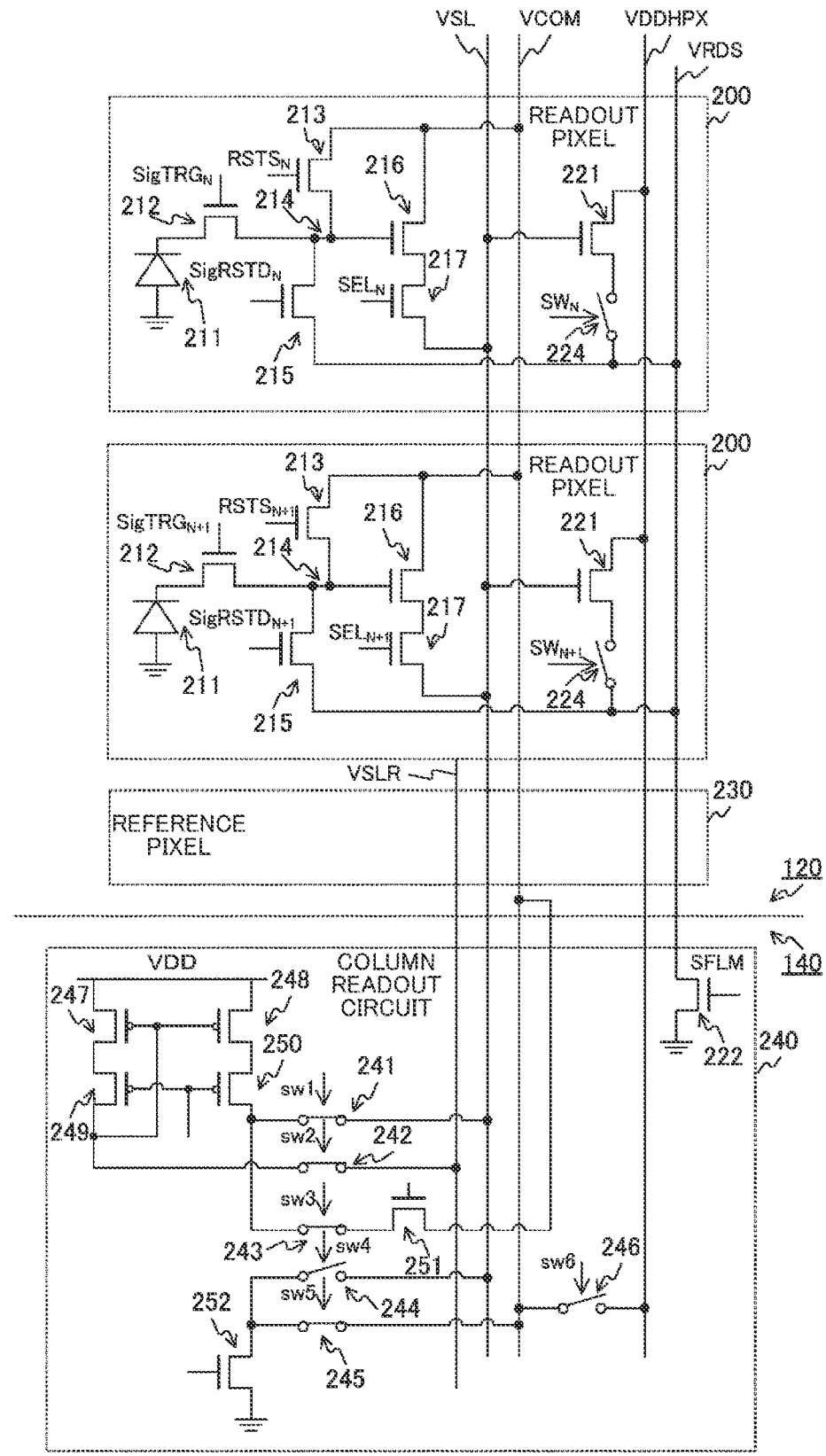
FIG. 23 is a circuit diagram illustrating a configuration example of a readout pixel and a column readout circuit, according to a sixth embodiment of the present technology.

FIG. 23 is a circuit diagram illustrating a configuration example of a readout pixel 200 and a column readout circuit 240, according to the sixth embodiment of the present technology. In the pixel array unit 120 according to this sixth embodiment, a reset input line VRDS is further wired for each column. Each of the readout pixels 200 does not include the load MOS transistor 222 and further includes a switch 224. For each column, the respective reset transistors 215 of the readout pixels 200 in that column are commonly connected to the reset input line VRDS corresponding to the column. The column readout circuit 240 further includes the load MOS transistor 222 inserted between the reset input line VRDS and a ground potential.

The switch 224 opens and closes the path between the source follower transistor 221 and the reset input line VRDS according to a control signal $SW_N$. The vertical drive unit 110 turns on the switch 224 corresponding to the row to be read out by the control signal $SW_N$.

As illustrated by way of example in the drawing, by disposing the load MOS transistor 222 for each column, the size of the transistor can be made larger than in the case where the load MOS transistor 222 is arranged for each pixel. As a result, variations in conversion efficiency can be reduced. In addition, the size of the readout pixel 200 can be reduced.

Figure 24:
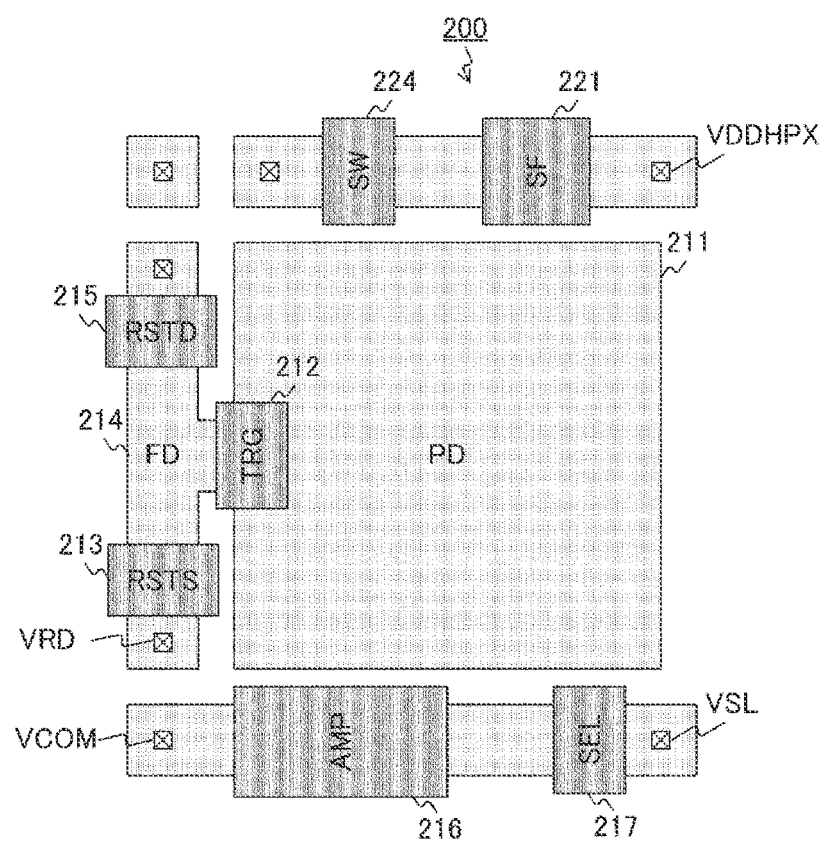
FIG. 24 is a diagram illustrating an example of a layout of elements in the readout pixel according to the sixth embodiment of the present technology.

FIG. 24 is a diagram illustrating an example of a layout of elements in the readout pixel 200 according to the sixth embodiment of the present technology. In the readout pixel 200 according to the sixth embodiment, a transistor (such as an nMOS transistor) functioning as the switch 224 is arranged in place of the load MOS transistor 222. The layout (not illustrated) of the reference pixel 230 according to the sixth embodiment is the same as the readout pixel 200 except that it differs in the connection destinations of the reset transistor 235 and the selection transistor 237.

As described above, according to the sixth embodiment of the present technology, the load MOS transistor 222 is arranged for each column, so that variations in conversion efficiency can be reduced and the size of the readout pixel 200 can be reduced, as compared to the case where the load MOS transistor 222 is arranged for each pixel.

7. Seventh Embodiment

In the sixth embodiment described above, the reset transistors 213 and 215 are arranged for each readout pixel 200, and the load MOS transistor 222 is arranged for each column. However, with that configuration, the number of transistors in the readout pixel 200 is further reduced. A CMOS image sensor 100 according to this seventh embodiment differs from that according to the sixth embodiment in that a column switch that opens and closes the path between the reset input line VRDS and the power supply line VDDHPX is provided.

Figure 25:
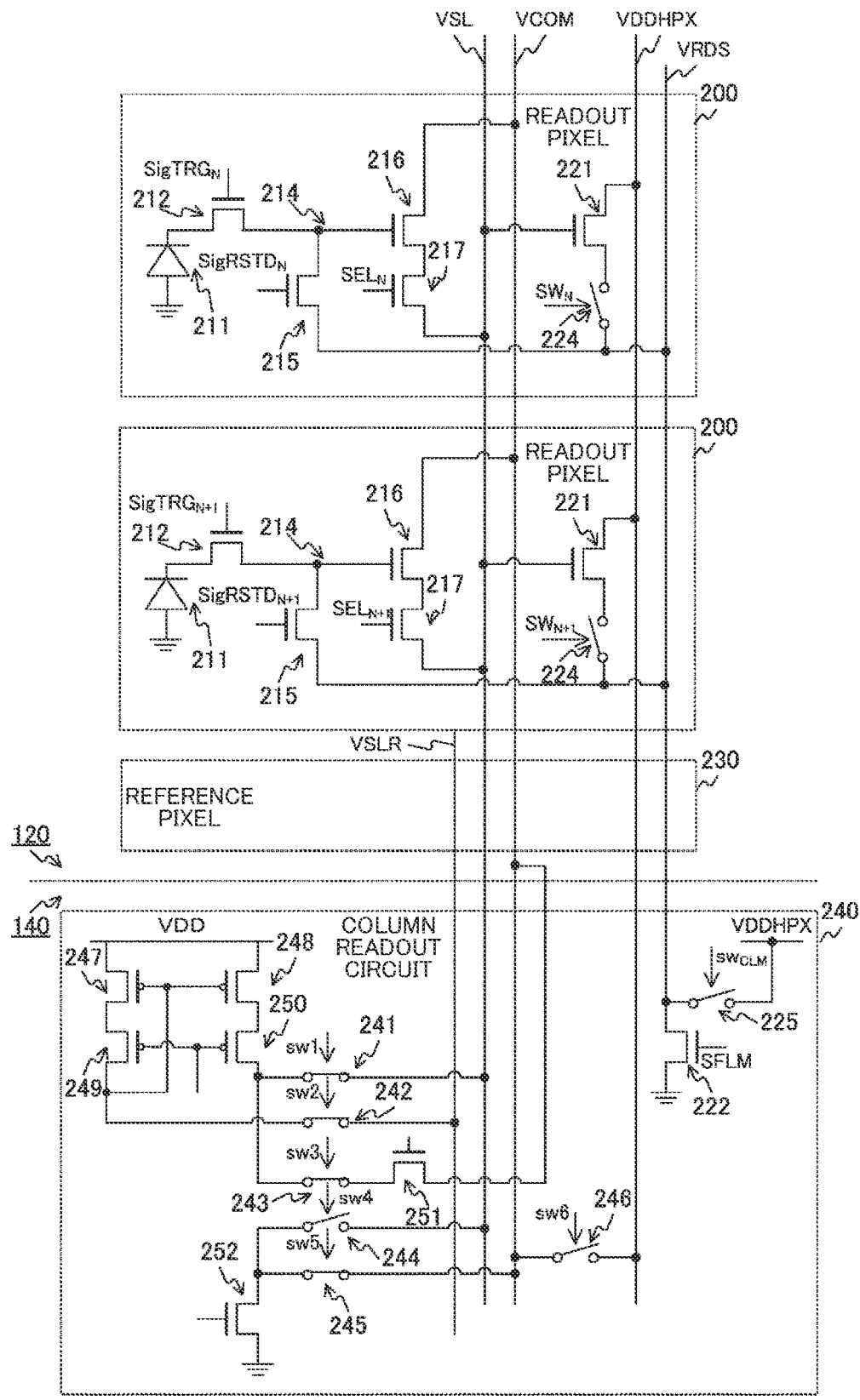
FIG. 25 is a circuit diagram illustrating a configuration example of a readout pixel and a column readout circuit, according to a seventh embodiment of the present technology.

FIG. 25 is a circuit diagram illustrating a configuration example of a readout pixel 200 and a column readout circuit 240, according to the seventh embodiment of the present technology. The column readout circuit 240 according to this seventh embodiment differs from that according to the first embodiment in that it further includes the column switch 225.

The switch 225 opens and closes the path between the reset input line VRDS and the power supply line VDDHPX according to a control signal $SW_{CLM}$ from the system control unit 130.

The readout pixel 200 according to the seventh embodiment differs from that according to the sixth embodiment in that it does not include the reset transistor 213.

Figure 26:
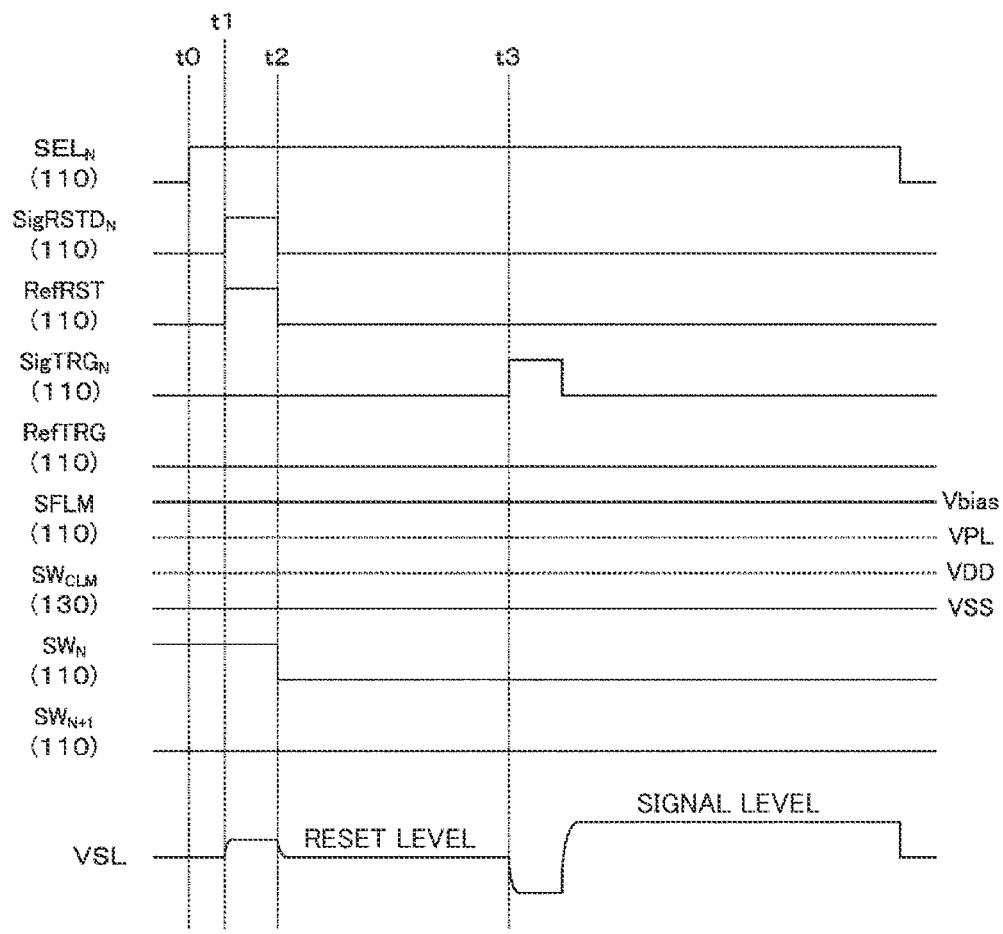
FIG. 26 is a timing chart illustrating an example of a readout operation for the M-th frame (where M is an integer) in a differential mode in the seventh embodiment of the present technology.

FIG. 26 is a timing chart illustrating an example of a readout operation for the M-th frame in a differential mode in the seventh embodiment of the present technology.

Figure 27:
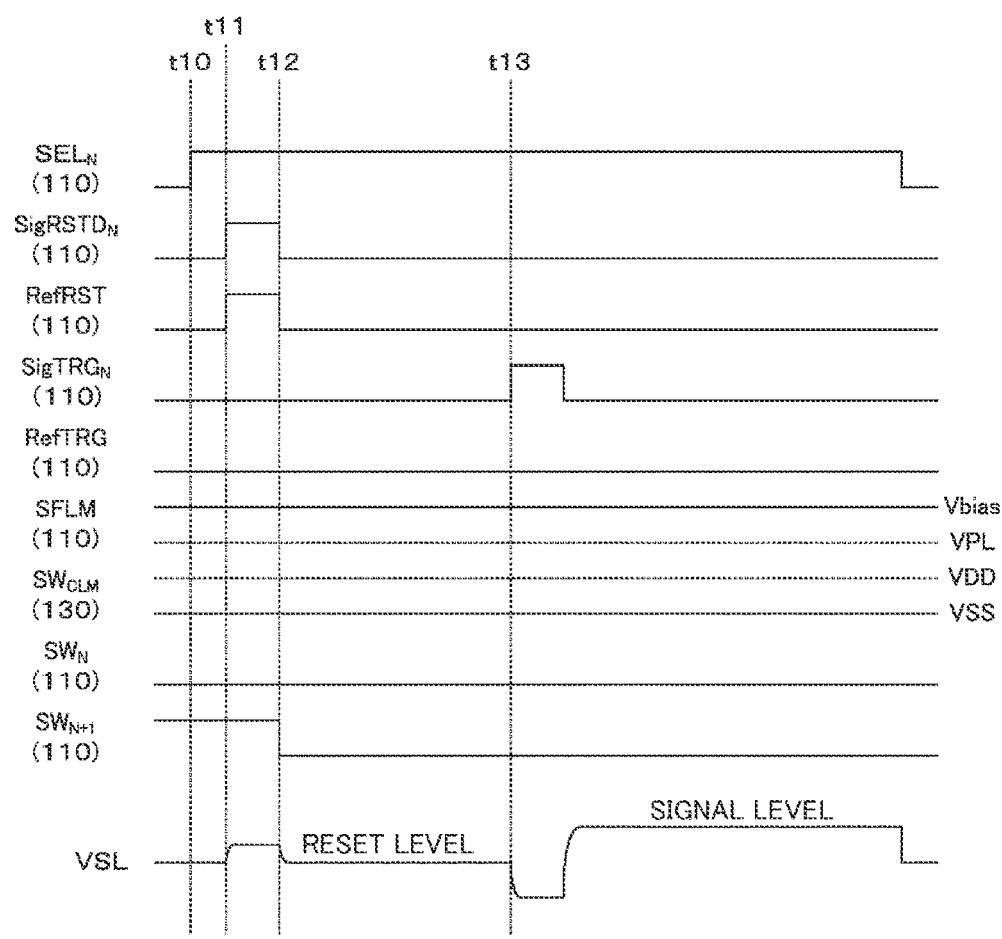
FIG. 27 is a timing chart illustrating an example of a readout operation for the (M+1)-th frame in the differential mode in the seventh embodiment of the present technology.

FIG. 27 is a timing chart illustrating an example of a readout operation for the (M+1)-th frame in the differential mode in the seventh embodiment of the present technology.

In the differential mode, the vertical drive unit 110 sets the control signal SFLM to Vbias. In addition, the system control unit 130 turns on only one of the respective switches 224 in two adjacent rows, and randomly switches which switch 224 is to be turned on for each frame. For example, in the M-th frame, the switch 224 in the N-th row of the N-th row and the (N+1)-th row is controlled to be on by the control signals $SW_N$ and $SW_{N+1}$. In the (M+1)-th frame, the switch 224 in the (N+1)-th row is controlled to be on by the control signals $SW_N$ and $SW_{N+1}$. Further, in the differential mode, the column switch 225 is controlled to be off.

With the control illustrated by way of example in FIGS. 26 and 27, variations in conversion efficiency observed as gain-based fixed pattern noise can result in random noise.

Figure 28:
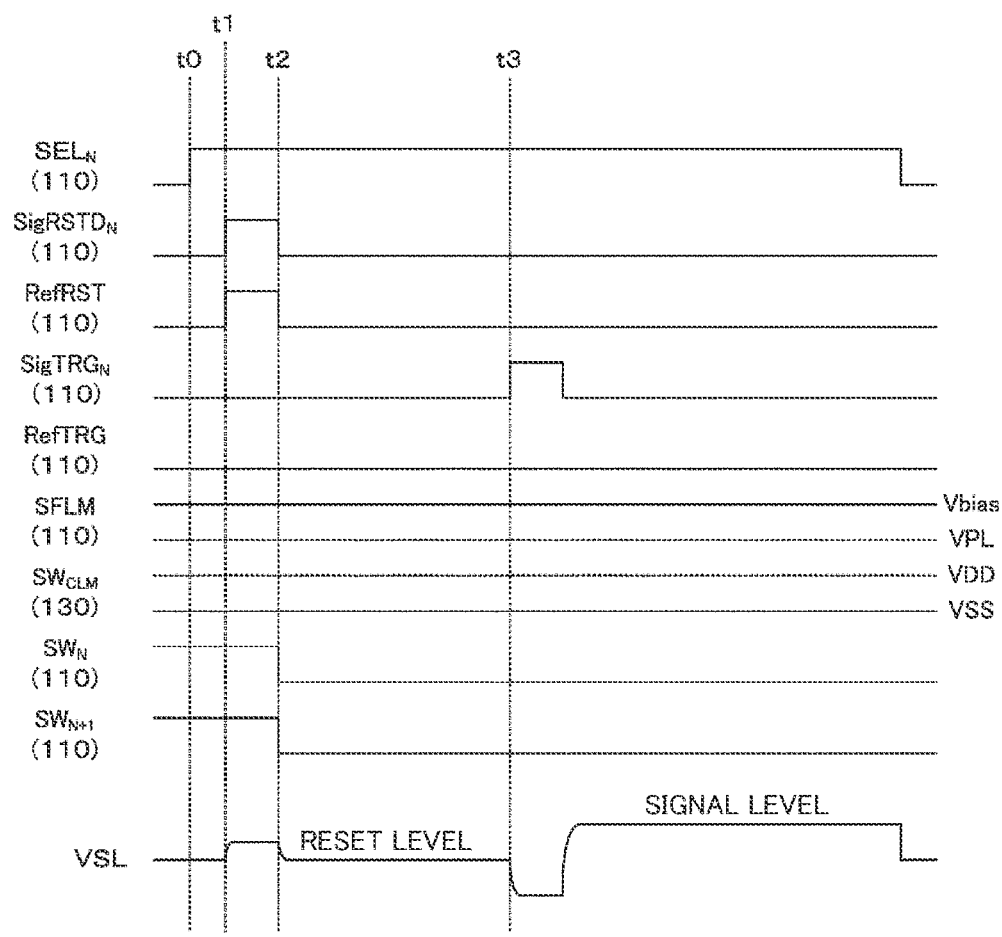
FIG. 28 is a timing chart illustrating another example of a readout operation in the differential mode in the seventh embodiment of the present technology.

As illustrated by way of example in FIG. 28, in the differential mode, the system control unit 130 can also turn on the switches 224 in two adjacent rows at the same time. As a result, the two load MOS transistors 222 are connected in parallel, which means that a load MOS transistor with substantially the double size is connected. Consequently, variations in conversion efficiency between elements can be reduced.

Figure 29:
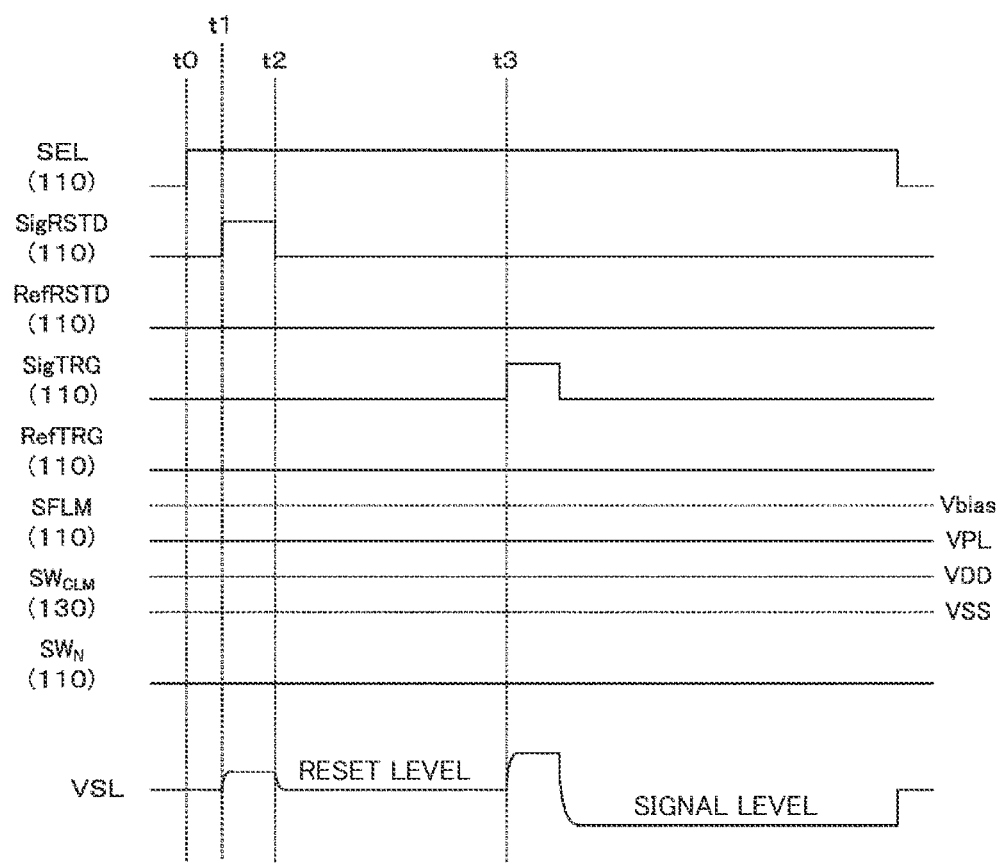
FIG. 29 is a timing chart illustrating an example of a readout operation in an SF mode in the seventh embodiment of the present technology.

FIG. 29 is a timing chart illustrating an example of a readout operation in an SF mode in the seventh embodiment of the present technology. In the SF mode, the system control unit 130 sets the control signal $SW_{CLM}$ to high level to turn on the column switch 225. As a result, in the SF mode, a voltage for resetting the floating diffusion layer 214 can be supplied from the reset input line VRDS through the column switch 225. Therefore, it is no need to arrange the reset transistors 213 and 233 in the readout pixel 200 and the reference pixel 230, and the number of these transistors can be reduced.

Figure 30:
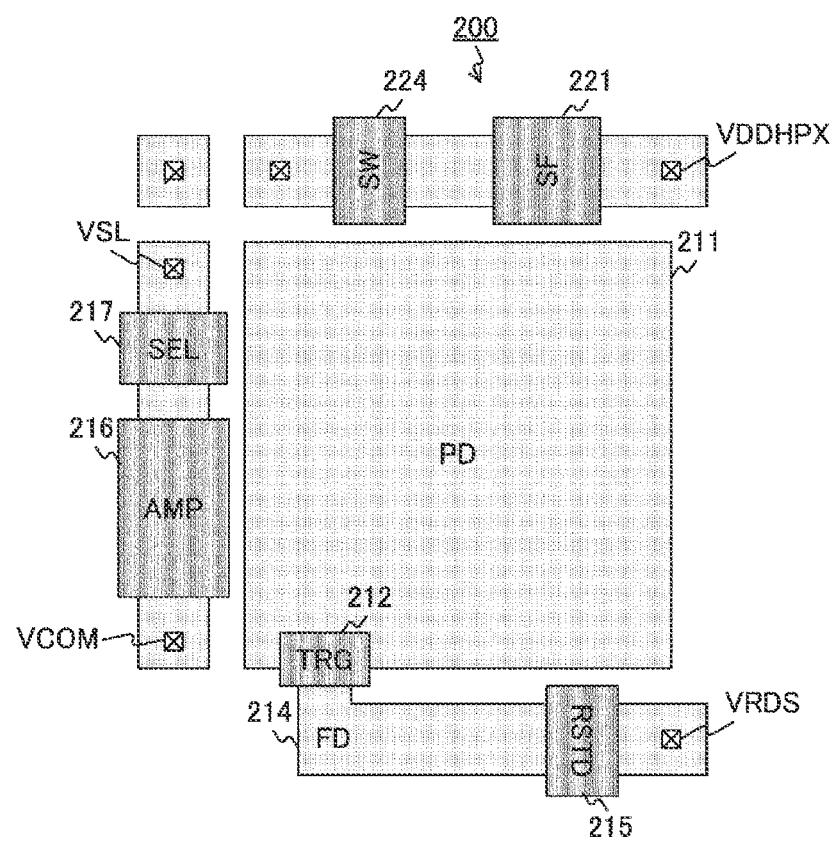
FIG. 30 is a diagram illustrating an example of a layout of elements in the readout pixel according to the seventh embodiment of the present technology.

FIG. 30 is a diagram illustrating an example of a layout of elements in the readout pixel 200 according to the seventh embodiment of the present technology. This layout of the readout pixel 200 according to the seventh embodiment differs from that according to the sixth embodiment in that the reset transistor 213 is not arranged and the reset input line VRDS is connected to the drain of the reset transistor 215. The layout (not illustrated) of the reference pixel 230 according to the seventh embodiment is the same as the readout pixel 200 except that it differs in the connection destinations of the reset transistor 235 and the selection transistor 237.

As described above, according to the seventh embodiment of the present technology, the column switch 225 that opens and closes the path between the reset input line VRDS and the power supply line VDDHPX is arranged, so that the reset transistors 215 can be eliminated.

8. Eighth Embodiment

In the first embodiment described above, the source follower transistor 221 and the load MOS transistor 222 are arranged for each readout pixel 200. However, with that configuration, it is difficult to reduce the size of the readout pixel 200. A CMOS image sensor 100 according to this eighth embodiment differs from that according to the first embodiment in that a floating diffusion layer 214 is shared by a plurality of readout pixels 200.

Figure 31:
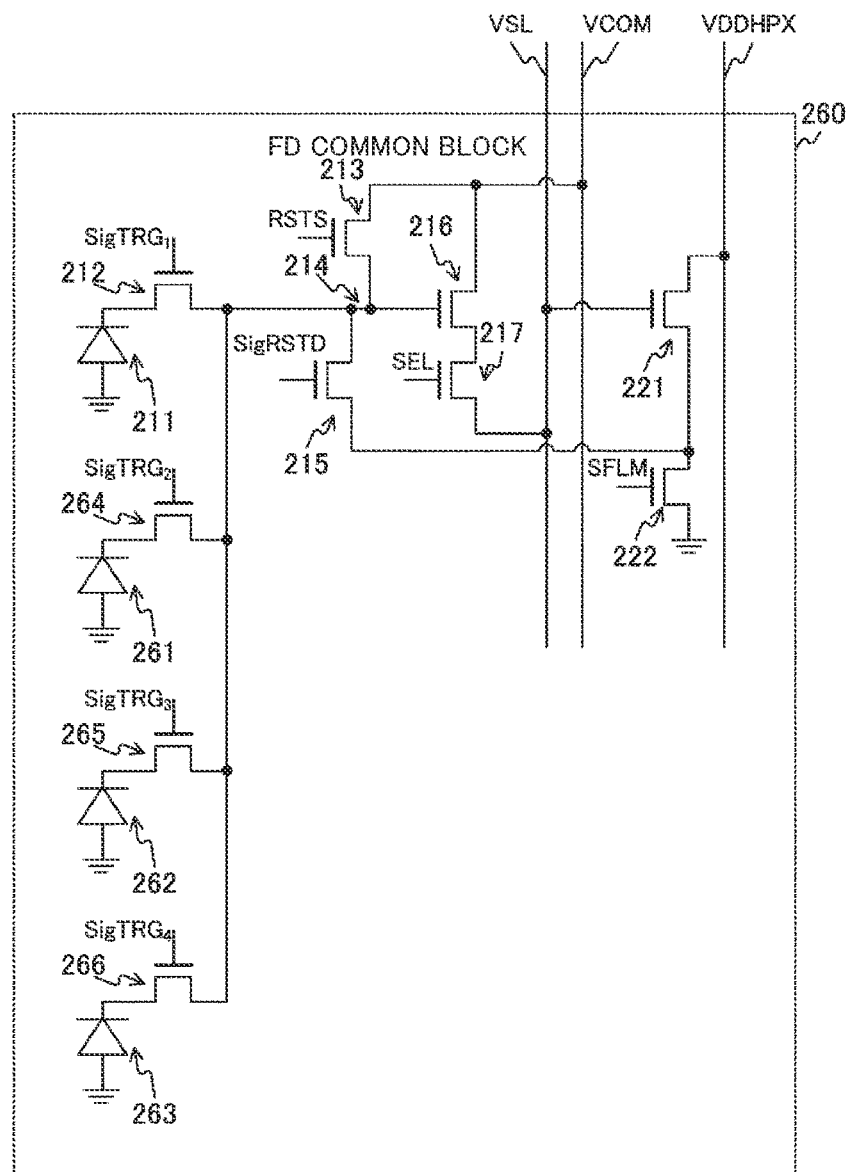
FIG. 31 is a circuit diagram illustrating a configuration example of an FD common block according to an eighth embodiment of the present technology.

FIG. 31 is a circuit diagram illustrating a configuration example of an FD common block 260 according to the eighth embodiment of the present technology. In the eighth embodiment, a predetermined number of FD common blocks 260 are arranged in a pixel array unit 120.

Each FD common block 260 includes photoelectric conversion elements 211, 261, 262, and 263, and transfer transistors 212, 264, 265, and 266. The FD common block 260 also includes reset transistors 213 and 215, a floating diffusion layer 214, an amplifier transistor 216, a selection transistor 217, a source follower transistor 221, and a load MOS transistor 222.

The transfer transistor 212 transfers charge from the photoelectric conversion element 211 to the floating diffusion layer 214 according to a transfer signal $SigTRG_1$. The transfer transistor 264 transfers charge from the photoelectric conversion element 261 to the floating diffusion layer 214 according to a transfer signal $SigTRG_2$. The transfer transistor 265 transfers charge from the photoelectric conversion element 262 to the floating diffusion layer 214 according to a transfer signal $SigTRG_3$. The transfer transistor 266 transfers charge from the photoelectric conversion element 263 to the floating diffusion layer 214 according to a transfer signal $SigTRG_4$.

The connection configuration of the elements after the floating diffusion layer 214 in the eighth embodiment is the same as that in the first embodiment.

The FD common block 260 functions as four readout pixels 200 that share the elements (such as the source follower transistor 221) after the floating diffusion layer 214. By a plurality of readout pixels 200 sharing the floating diffusion layer 214 and others, the number of elements per pixel can be reduced and the size of the readout pixel 200 can be reduced, as compared to the case of not sharing.

Although the number of pixels sharing the floating diffusion layer 214 is four, the number is not limited to four as long as it is two or more.

Figure 32:
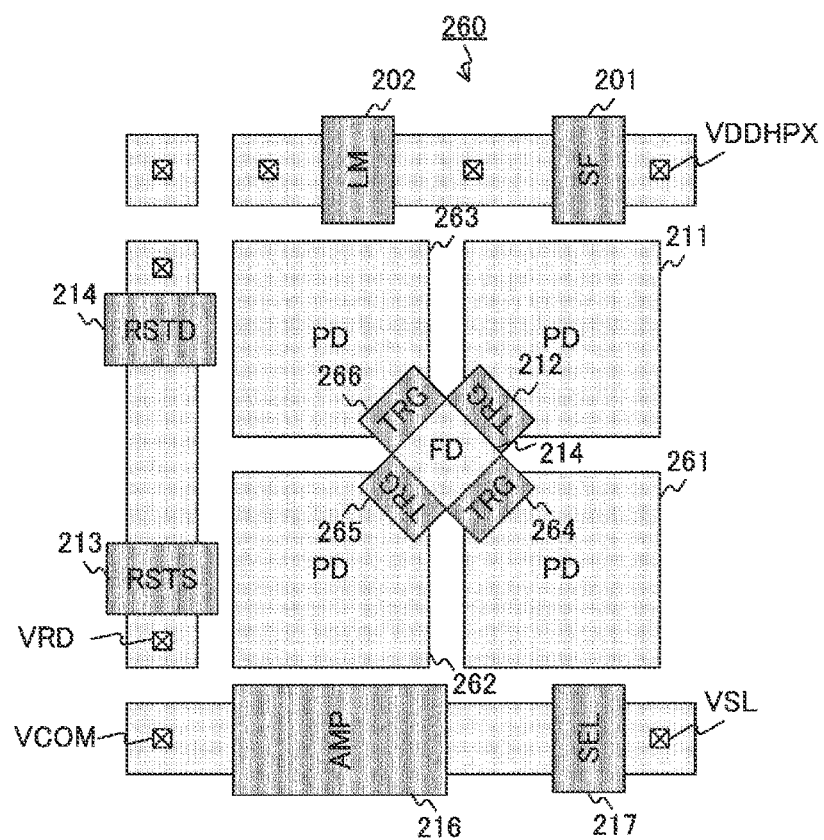
FIG. 32 is a diagram illustrating an example of a layout of elements in the FD common block according to the eighth embodiment of the present technology.

FIG. 32 is a diagram illustrating an example of a layout of elements in the FD common block 260 according to the eighth embodiment of the present technology. The layout of the FD common block 260 according to the eighth embodiment differs from the readout pixel 200 according to the first embodiment in that the photoelectric conversion elements 261, 262, and 263 and the transfer transistors 264, 265, and 266 are further arranged.

As described above, according to the eighth embodiment of the present technology, a plurality of the readout pixels 200 share the floating diffusion layer 214 and others, so that the size of the readout pixel 200 can be reduced as compared to the case of not sharing.

9. Ninth Embodiment

In the first embodiment described above, the circuits are arranged on a single semiconductor chip. However, with that configuration, it is difficult to reduce the size of the pixel. A CMOS image sensor 100 according to this ninth embodiment differs from that according to the first embodiment in that circuits are distributed to be arranged on a plurality of chips laminated.

Figure 33:
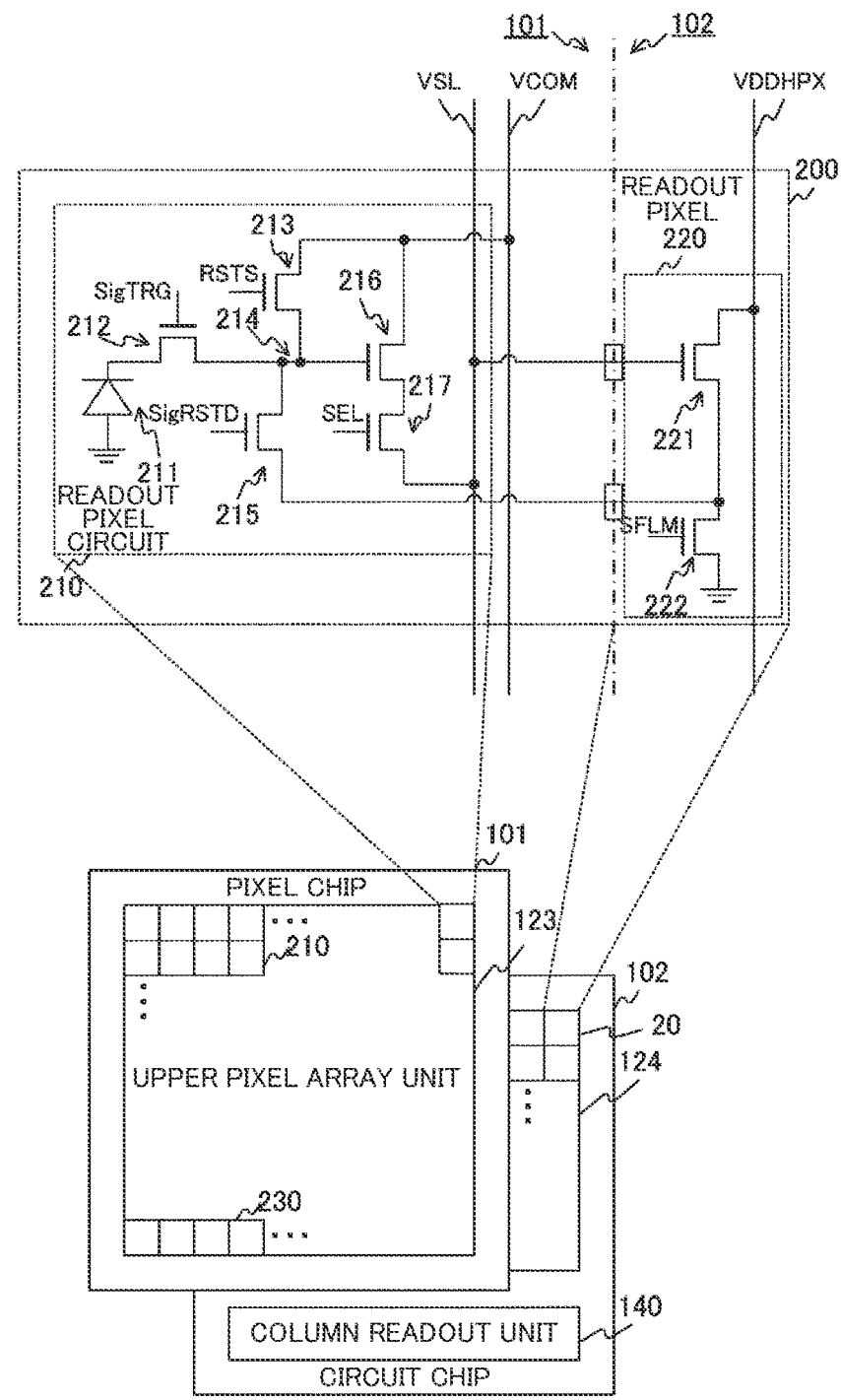
FIG. 33 illustrates an example of a laminated structure of a CMOS image sensor according to a ninth embodiment of the present technology.

FIG. 33 illustrates an example of a laminated structure of a CMOS image sensor 100 according to the ninth embodiment of the present technology. A CMOS image sensor 100 according to the ninth embodiment includes a circuit chip 102 and a pixel chip 101 laminated on the circuit chip 102. These chips are electrically connected with Cu—Cu junction. Note that the connection may be established by using a via or a bump instead of the Cu—Cu junction.

An upper pixel array unit 123 is arranged on the pixel chip 101. In this upper pixel array unit 123, a plurality of readout pixel circuits 210 and a plurality of reference pixels 230 are arranged in a two-dimensional grid pattern.

A lower pixel array unit 124, a vertical drive unit 110, a system control unit 130, a column readout unit 140, a column signal processing unit 150, a horizontal drive unit 160, and a signal processing unit 170 are arranged on the circuit chip 102. In the drawing, for convenience of description, circuits other than the lower pixel array unit 124 and the column readout unit 140 are not illustrated.

In the lower pixel array unit 124, a potential difference generation circuit 220 is arranged for each readout pixel circuit 210.

Figure 34:
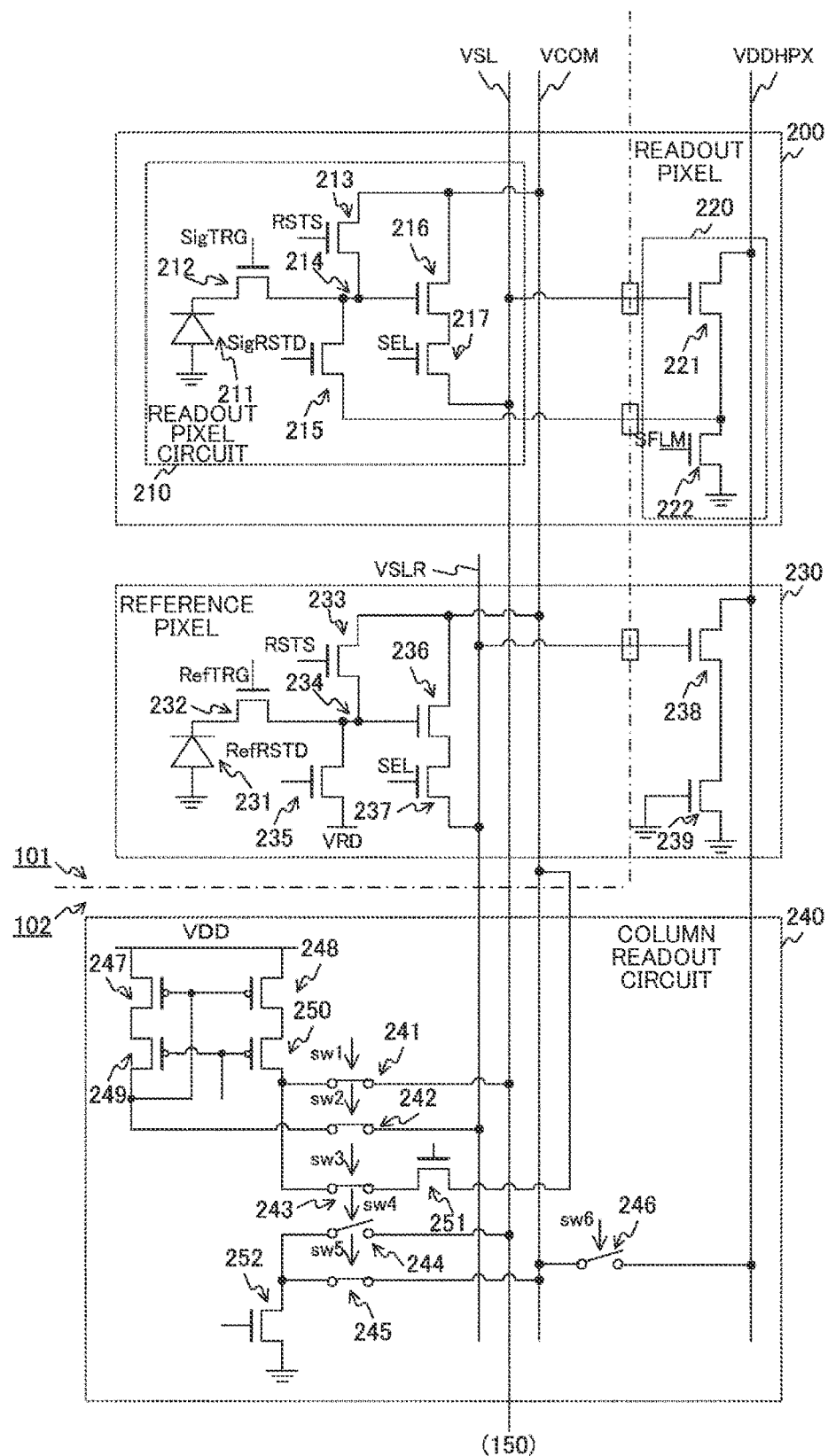
FIG. 34 is a circuit diagram illustrating a configuration example of a readout pixel, a reference pixel, and a column readout circuit, according to the ninth embodiment of the present technology.

FIG. 34 is a circuit diagram illustrating a configuration example of a readout pixel 200, the reference pixel 230, and the column readout circuit 240, according to the ninth embodiment of the present technology. The readout pixel circuit 210 and the reference pixel 230 are arranged on the pixel chip 101. On the other hand, the potential difference generation circuit 220 and the column readout circuit 240 are arranged on the circuit chip 102. As illustrated by way of example in the drawing, by distributing the circuits to be arranged on the pixel chip 101 and the circuit chip 102, the number of elements for each pixel on the pixel chip 101 can be reduced. As a result, the size of the pixel can be reduced as compared to the case of no laminated structure.

As described above, according to the ninth embodiment of the present technology, the circuits are distributed to be arranged on a plurality of laminated chips, so that the size of the pixel can be reduced.

10. Tenth Embodiment

In the ninth embodiment described above, the gate of the source follower transistor 221 is connected to the vertical signal line VSL through the Cu—Cu connection. However, with that configuration, a number of connections to connect to the vertical signal line VSL is required corresponding to the number of rows. Therefore, the load on the vertical signal line VSL may increase, resulting in deterioration of settling. A CMOS image sensor 100 according to this tenth embodiment differs from that according to the ninth embodiment in that a switch 218 that opens and closes the path between the gate of the source follower transistor 221 and the vertical signal line VSL is added to the pixel chip 101.

Figure 35:
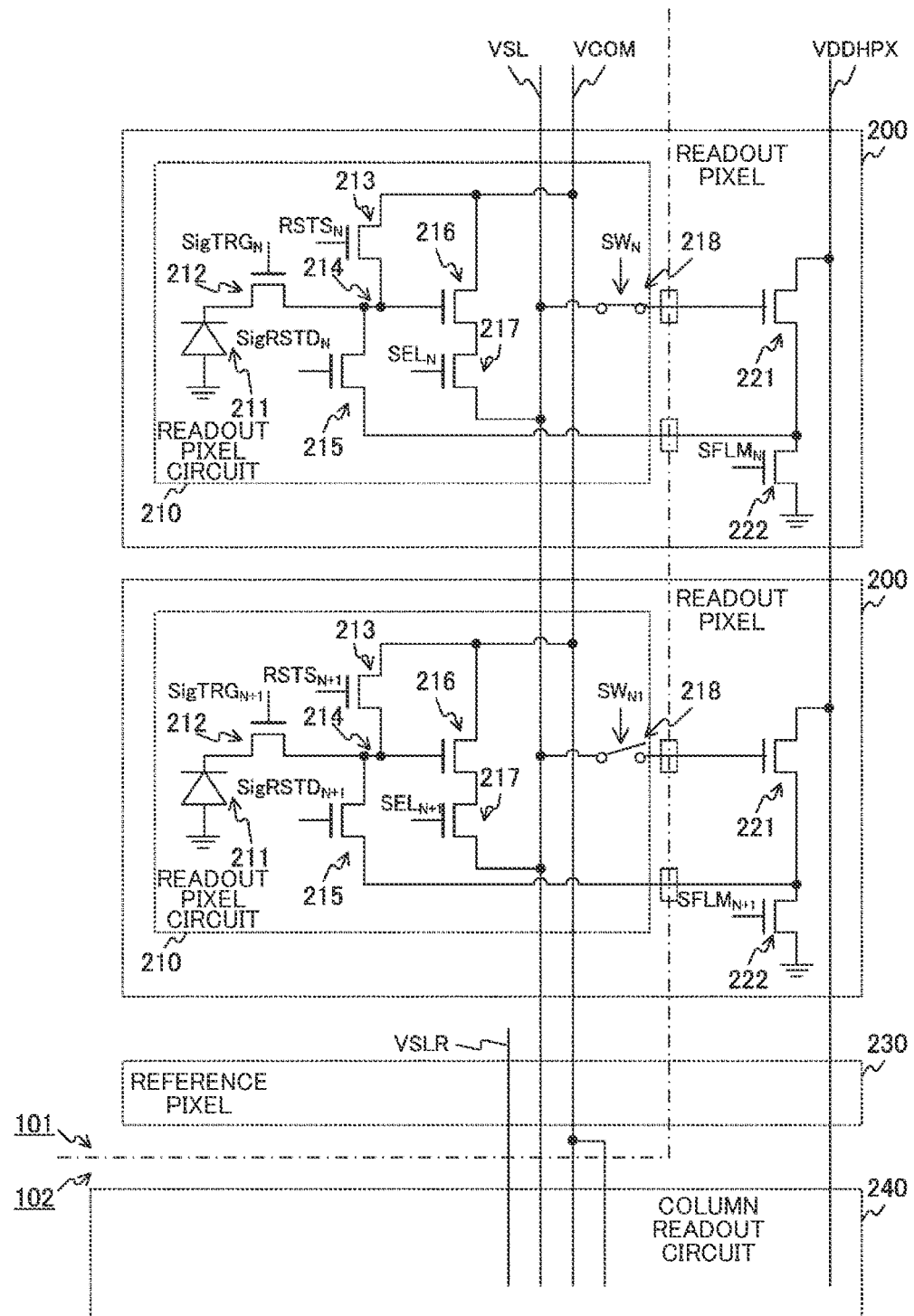
FIG. 35 is a circuit diagram illustrating a configuration example of a readout pixel according to a tenth embodiment of the present technology.

FIG. 35 is a circuit diagram illustrating a configuration example of a readout pixel 200 according to the tenth embodiment of the present technology. The readout pixel 200 according to this tenth embodiment differs from that according to the first embodiment in that a readout pixel circuit 210 on the pixel chip 101 further includes the switch 218.

The switch 218 opens and closes the path between the gate of the source follower transistor 221 and the vertical signal line VSL according to a control signal $SW_N$ from the vertical drive unit 110.

Figure 36:
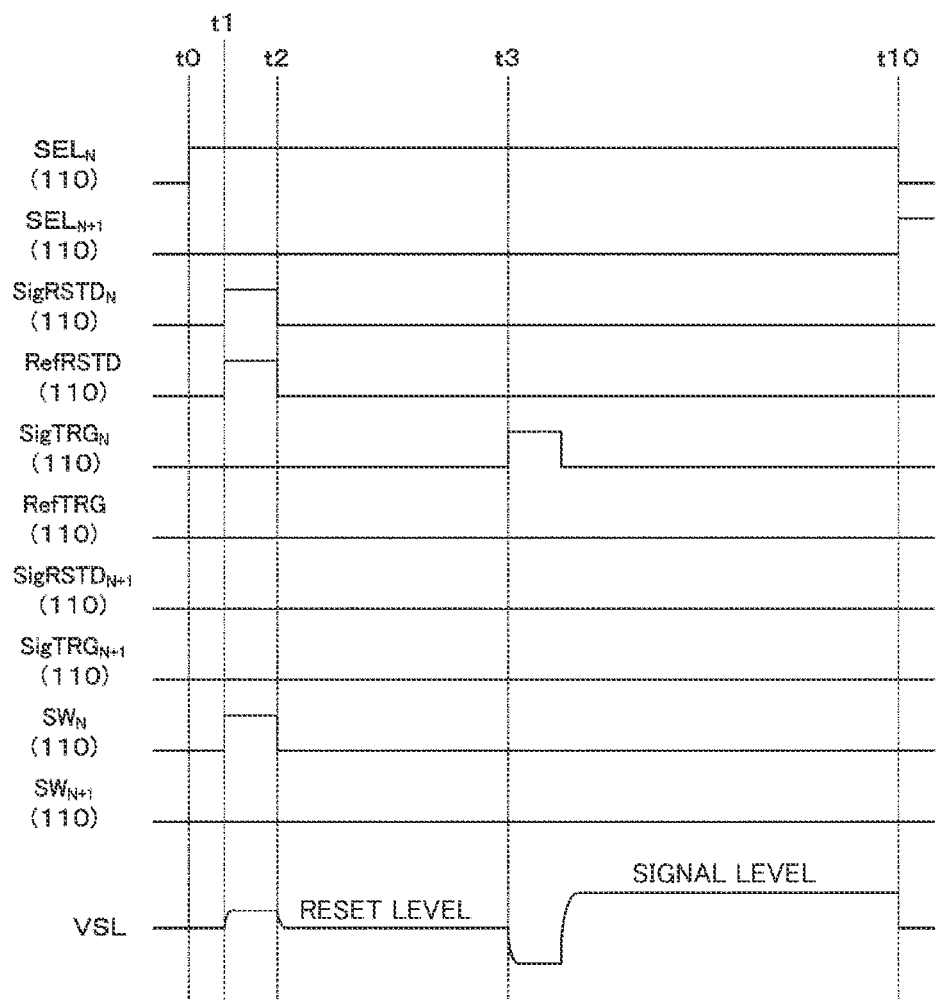
FIG. 36 is a timing chart illustrating an example of a readout operation in a differential mode in the tenth embodiment of the present technology.

FIG. 36 is a timing chart illustrating an example of a readout operation in a differential mode in the tenth embodiment of the present technology. The vertical drive unit 110 turns on the switches 218 in the row to be read out by the control signal $SW_N$ within a period of timing t1 to t2, and turns off the switches 218 in the remaining rows. As a result, only the Cu—Cu connections in the row to be read out are connected to the vertical signal line VSL, and the remaining Cu—Cu connections are disconnected. Consequently, deterioration of settling can be suppressed.

As described above, according to the tenth embodiment of the present technology, the switch 218 that opens and closes the path between the gate of the source follower transistor 221 and the vertical signal line VSL is arranged, so that the number of Cu—Cu connections to connect the vertical signal line VSL can be minimized. As a result, deterioration of settling can be suppressed.

11. Eleventh Embodiment

In the tenth embodiment described above, the switch 218 that opens and closes the path between the gate of the source follower transistor 221 and the vertical signal line VSL is arranged. However, with that configuration, it is difficult to reduce the number of elements in each pixel. A CMOS image sensor 100 according to this eleventh embodiment differs from that according to the tenth embodiment in that the connection destination of the gate of the source follower transistor 221 is changed.

Figure 37:
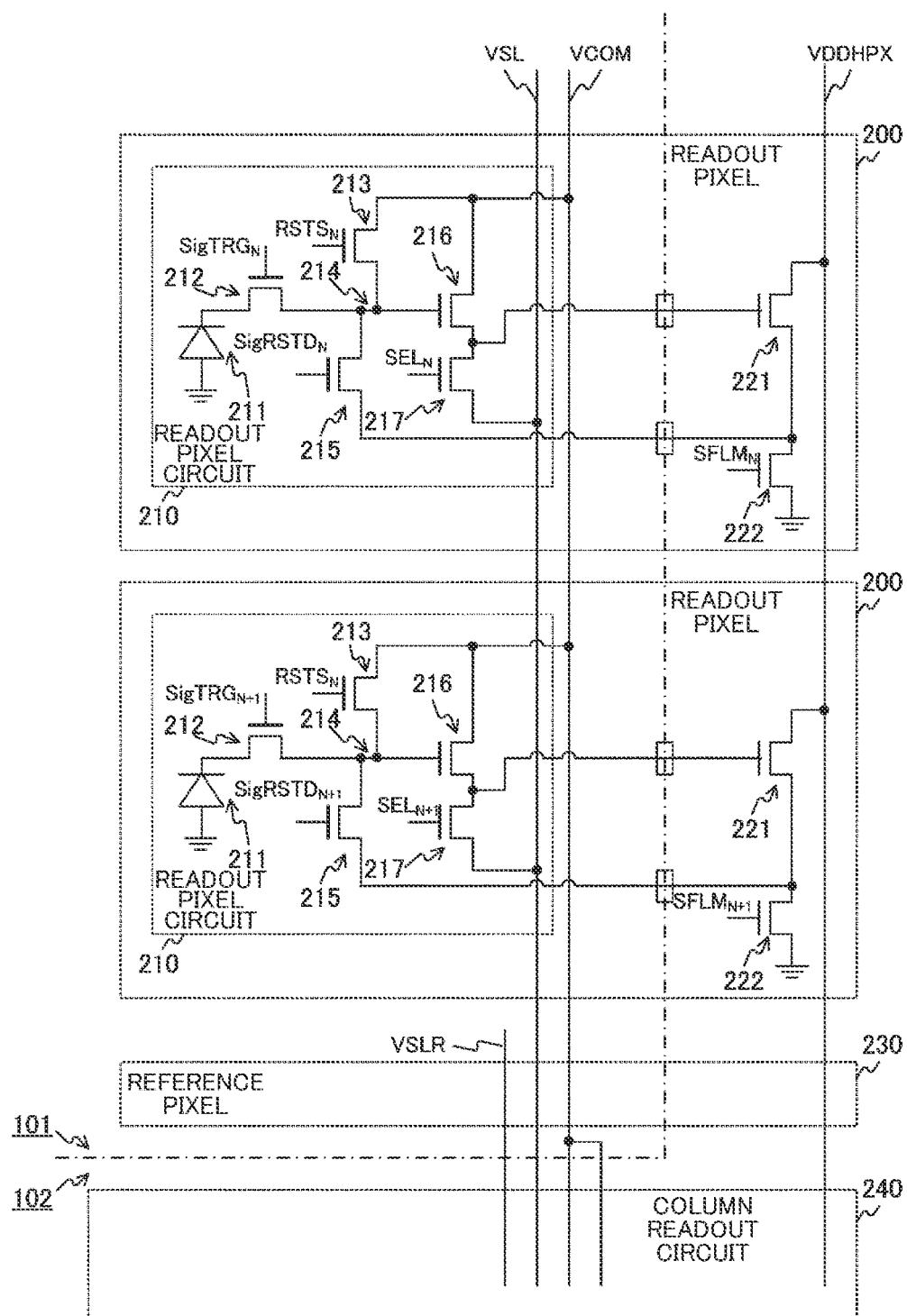
FIG. 37 is a circuit diagram illustrating a configuration example of a readout pixel according to an eleventh embodiment of the present technology.

FIG. 37 is a circuit diagram illustrating a configuration example of a readout pixel 200 according to the eleventh embodiment of the present technology. The readout pixel 200 according to this eleventh embodiment differs from that according to the tenth embodiment in that it does not include the switch 218 and the gate of the source follower transistor 221 is connected to a connection node between the amplifier transistor 216 and the selection transistor 217. With this connection, the gate capacitance of the source follower transistor 221 is separated from the vertical signal line VSL, and deterioration of settling can be avoided as in the tenth embodiment. Therefore, the switch 218 can be eliminated.

As described above, according to the eleventh embodiment of the present technology, the gate of the source follower transistor 221 is connected to the connection node between the amplifier transistor 216 and the selection transistor 217, so that the number of switches 218 can be reduced while suppressing deterioration of settling.

12. Twelfth Embodiment

In the ninth embodiment described above, the circuits are distributed to be arranged on a plurality of chips. However, with that configuration, it is difficult to further reduce the number of transistors in the readout pixel circuit 210. A CMOS image sensor 100 according to this twelfth embodiment differs from that according to the ninth embodiment in that a switch is added to each of the pixel chip 101 and the circuit chip 102.

Figure 38:
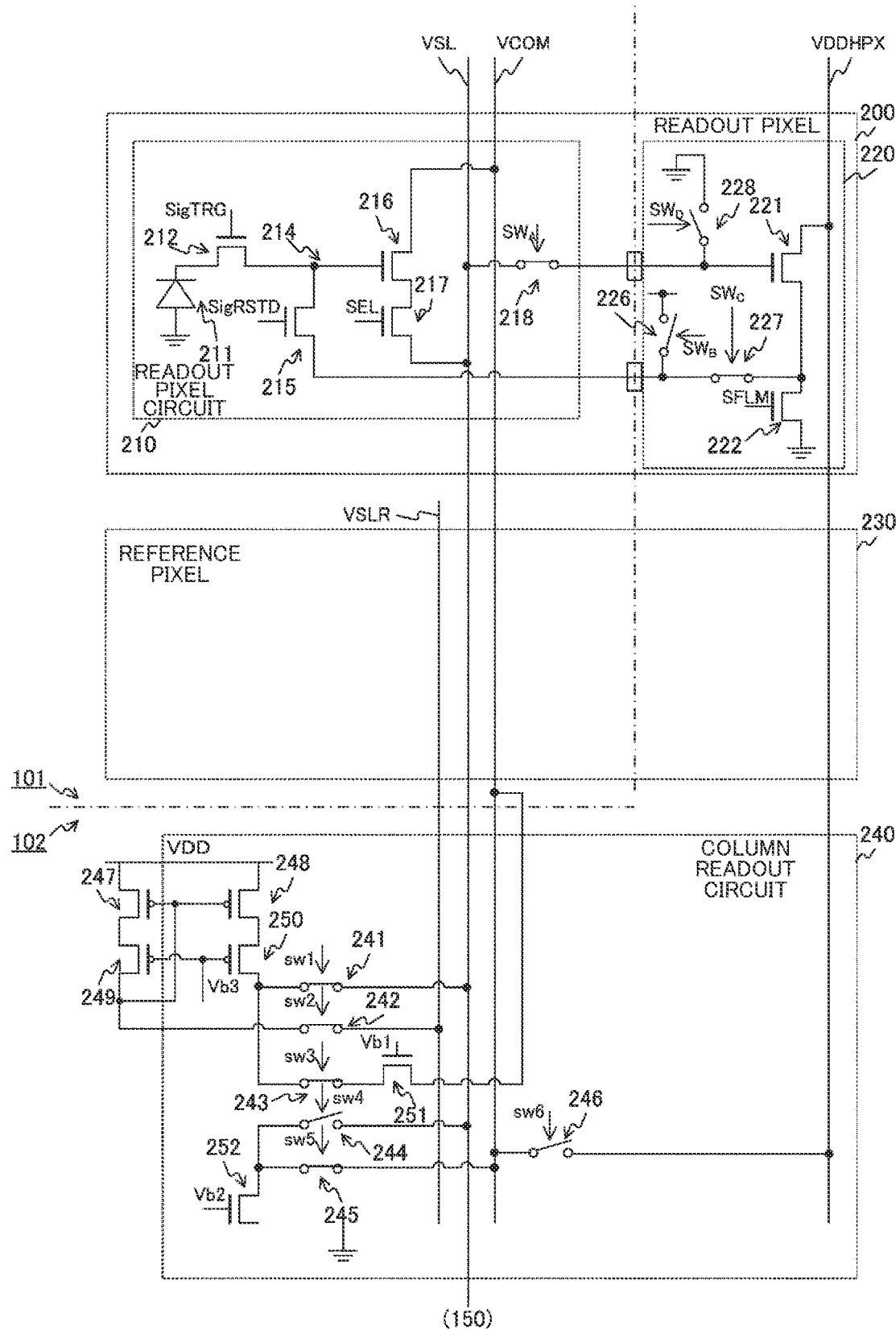
FIG. 38 is a circuit diagram illustrating a configuration example of a readout pixel, a reference pixel, and a column readout circuit, according to a twelfth embodiment of the present technology.

FIG. 38 is a circuit diagram illustrating a configuration example of a readout pixel 200, a reference pixel 230, and a column readout circuit 240, according to the twelfth embodiment of the present technology. The readout pixel 200 according to this twelfth embodiment differs from that according to the ninth embodiment in that it does not include the reset transistor 213 and further includes switches 218, 226, 227, and 228. The reference pixel 230 according to the twelfth embodiment differs from that according to the ninth embodiment in that it does not include the reset transistor 233.

The switch 218 is arranged in the readout pixel circuit 210 on the pixel chip 101, and opens and closes the path between the gate of the source follower transistor 221 and the vertical signal line VSL according to a control signal $SW_A$ from the vertical drive unit 110. The switch 218 is an example of a first switch described in the claims.

The switches 226 to 228 are arranged in the potential difference generation circuit 220 of the circuit chip 102. The switch 226 opens and closes the path between the drain of the reset transistor 215 and a predetermined power supply voltage according to a control signal $SW_B$ from the vertical drive unit 110. The switch 226 is an example of a second switch described in the claims.

The switch 227 opens and closes the path between the drain of the reset transistor 215 and a connection node between the source follower transistor 221 and the load MOS transistor 222 according to a control signal $SW_C$ from the vertical drive unit 110. The switch 227 is an example of a third switch described in the claims.

The switch 228 opens and closes the path between the gate of the source follower transistor 221 and a ground potential according to a control signal $SW_D$ from the vertical drive unit 110. The switch 228 is an example of a fourth switch described in the claims.

As illustrated by way of example in the drawing, the vertical drive unit 110 turns on the switches 218 and 227 and turns off the switches 226 and 228 by the control signals $SW_A$ to $SW_D$ in a differential mode.

Figure 39:
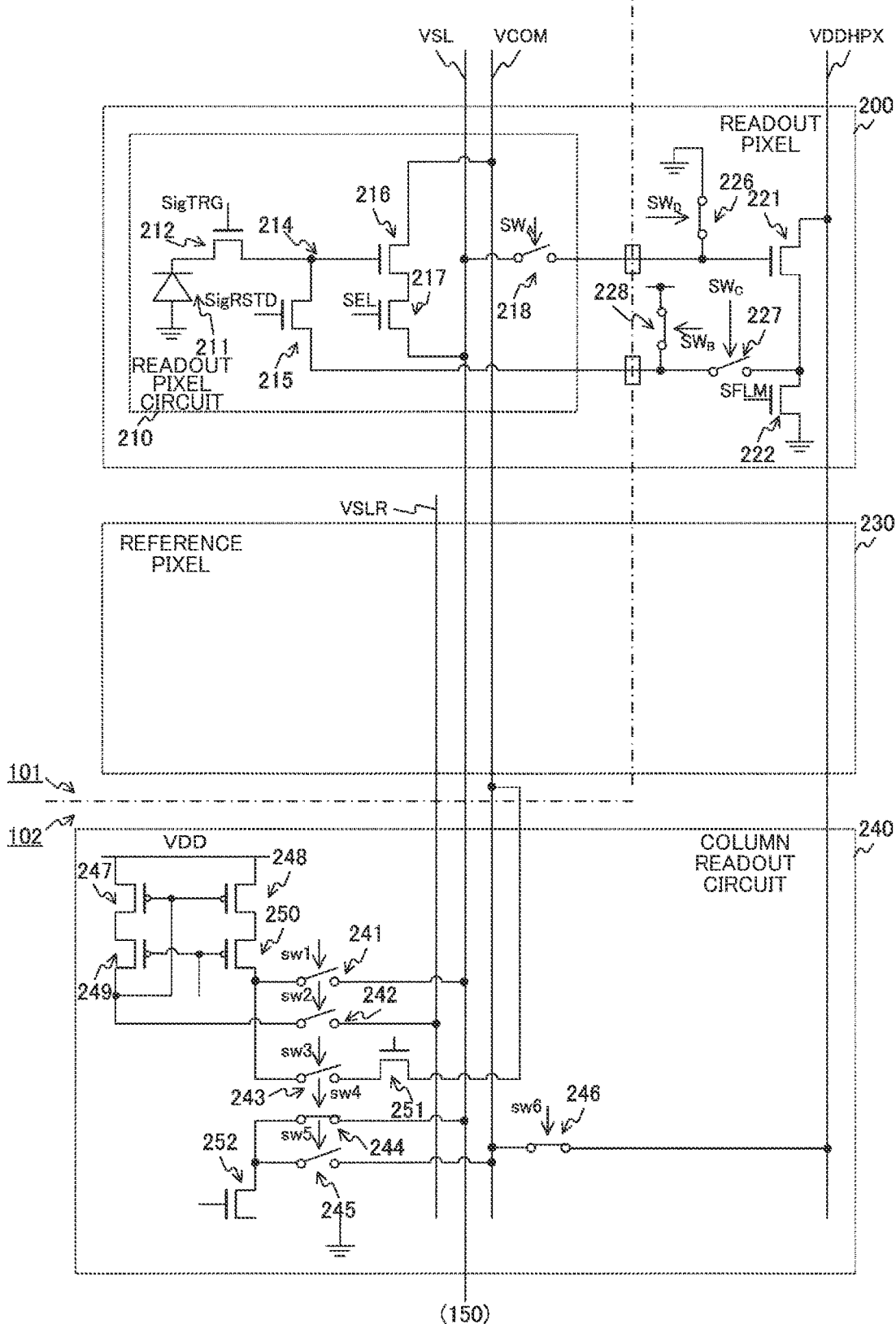
FIG. 39 is a circuit diagram illustrating an example of a state of the readout pixel in an SF mode in the twelfth embodiment of the present technology.

On the other hand, as illustrated by way of example in FIG. 39, the vertical drive unit 110 turns off the switches 218 and 227 and turns on the switches 226 and 228 by the control signals $SW_A$ to $SW_D$ in an SF mode.

Figure 40:
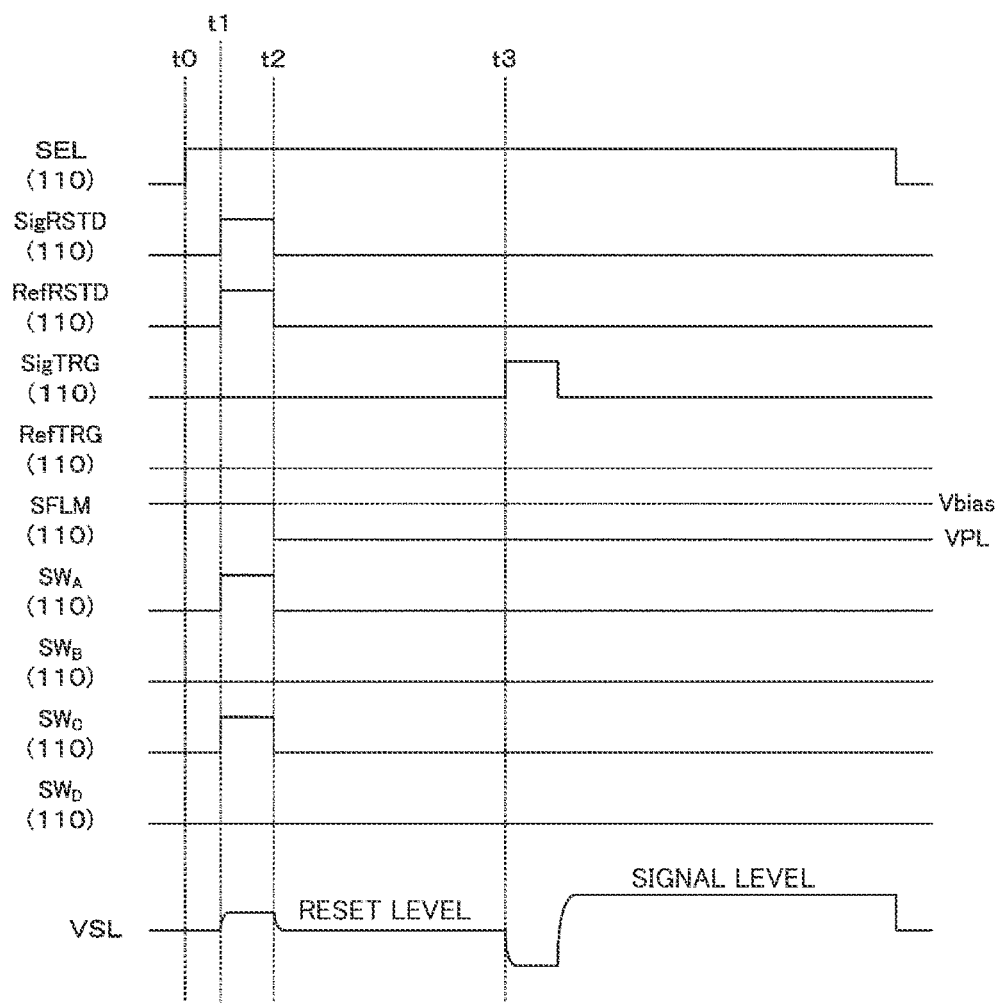
FIG. 40 is a timing chart illustrating an example of a readout operation in a differential mode in the twelfth embodiment of the present technology.

FIG. 40 is a timing chart illustrating an example of a readout operation in the differential mode in the twelfth embodiment of the present technology. As illustrated by way of example in the drawing, the vertical drive unit 110 sets the control signals $SW_A$ and $SW_C$ to high level to turn on the switches 218 and 227 over a period of timing t1 to t2 for initialization. As a result, a feedback path is formed in the differential mode.

Figure 41:
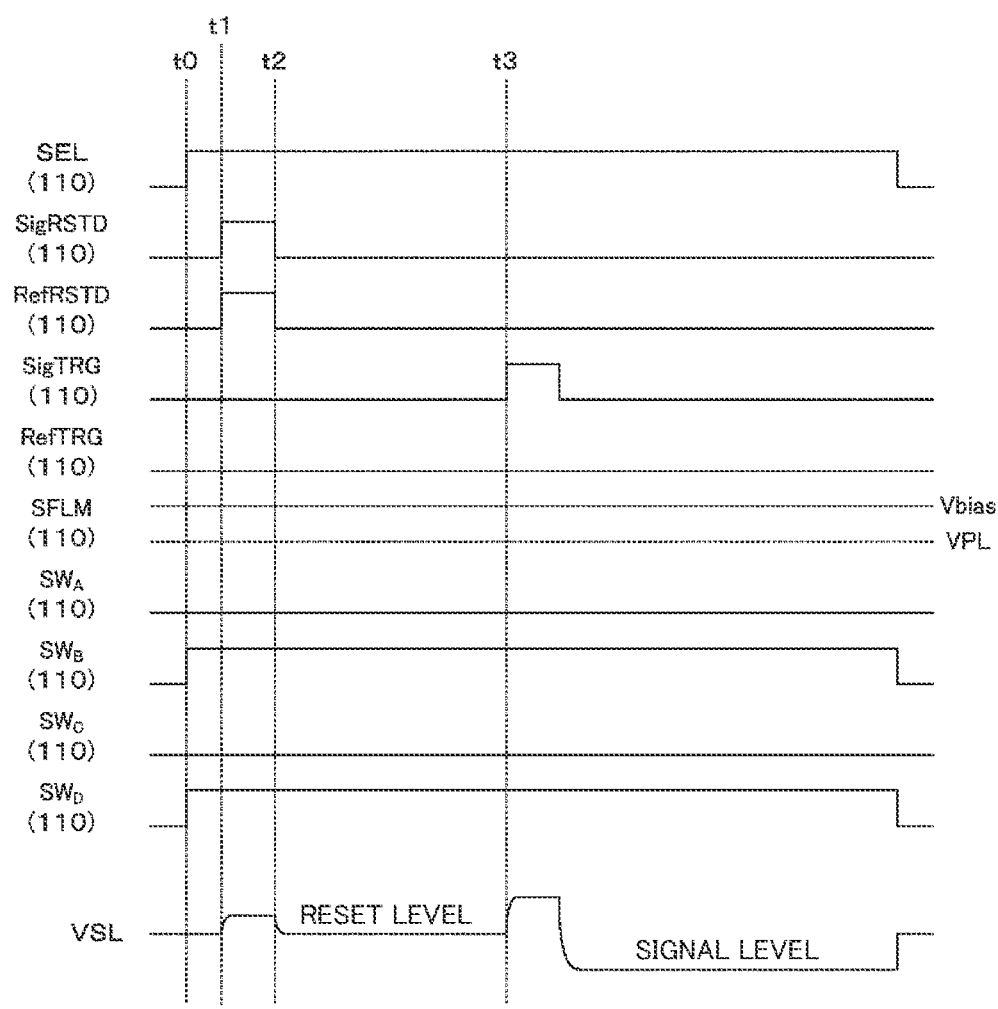
FIG. 41 is a timing chart illustrating an example of a readout operation in the SF mode in the twelfth embodiment of the present technology.

FIG. 41 is a timing chart illustrating an example of a readout operation in the SF mode in the twelfth embodiment of the present technology. As illustrated by way of example in the drawing, the vertical drive unit 110 sets the control signals $SW_B$ and $SW_D$ to high level to turn on the switches 226 and 228 at timing to when a row is selected. As a result, the floating diffusion layer 214 is initialized, so that the reset transistors 213 and 233 can be eliminated.

As described above, according to the twelfth embodiment of the present technology, the switch 218 and the switches 226 to 228 are added, so that the reset transistors 213 and 233 can be eliminated.

13. Thirteenth Embodiment

In the ninth embodiment described above, the connection destinations of the gate and source of the source follower transistor 221 are fixed. However, with that configuration, it is difficult to further suppress variations in conversion efficiency. A CMOS image sensor 100 according to this thirteenth embodiment differs from that according to the first embodiment in that a demultiplexer and a multiplexer that switch the connection destinations of the gate and source of the source follower transistor 221 are added.

Figure 42:
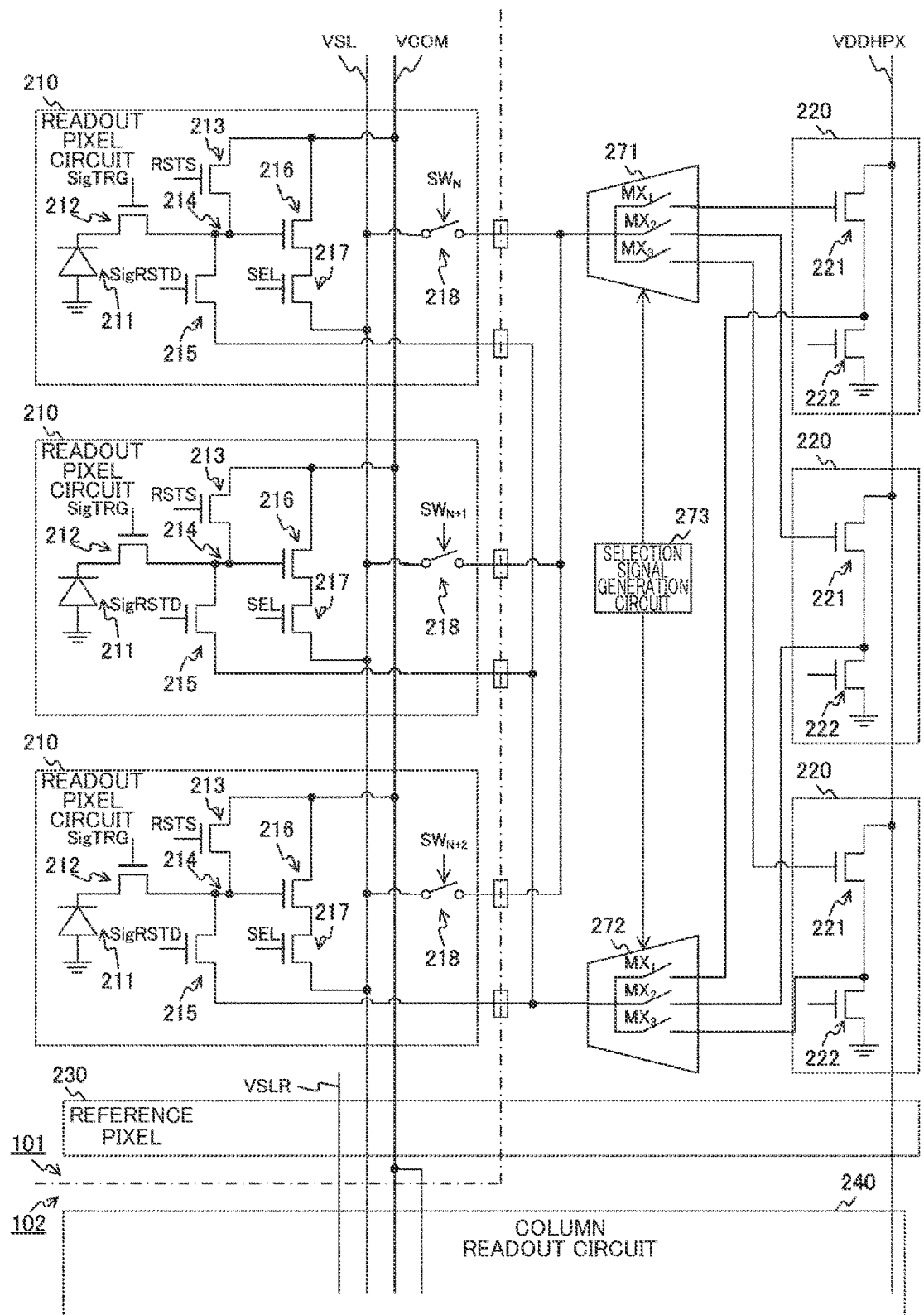
FIG. 42 is a circuit diagram illustrating a configuration example of a readout pixel according to a thirteenth embodiment of the present technology.

FIG. 42 is a circuit diagram illustrating a configuration example of a readout pixel 200 according to the thirteenth embodiment of the present technology. In a circuit chip 102 of this thirteenth embodiment, the demultiplexer 271, the multiplexer 272, and a selection signal generation circuit 273 are further arranged every predetermined number of rows (e.g., three rows). Further, a switch 218 is further arranged in the readout pixel circuit 210.

A circuit including the demultiplexer 271, the multiplexer 272, and the selection signal generation circuit 273, and the readout pixel circuits 210 and potential difference generation circuits 220 in the three corresponding rows functions as a readout pixel 200 for three rows.

The switch 218 opens and closes the path between the vertical signal line VSL and the input terminal of the demultiplexer 271 according to a control signal $SW_N$ from the vertical drive unit 110. The vertical drive unit 110 turns on the switches 218 in the row to be read and turns off the switches 218 in the remaining rows.

The demultiplexer 271 connects the gate of one of the source follower transistors 221 in three adjacent rows to the vertical signal line VSL through the switch 218 under the control of the selection signal generation circuit 273.

The multiplexer 272 connects the source of one of the source follower transistors 221 in three adjacent rows to the drain of the reset transistor 215 in each of the three rows under the control of the selection signal generation circuit 273.

The selection signal generation circuit 273 generates selection signals MX1 to MX3 for switching the connection destination of the demultiplexer 271 and the multiplexer 272, and supplies the signals to the demultiplexer 271 and the multiplexer 272.

Figure 43:
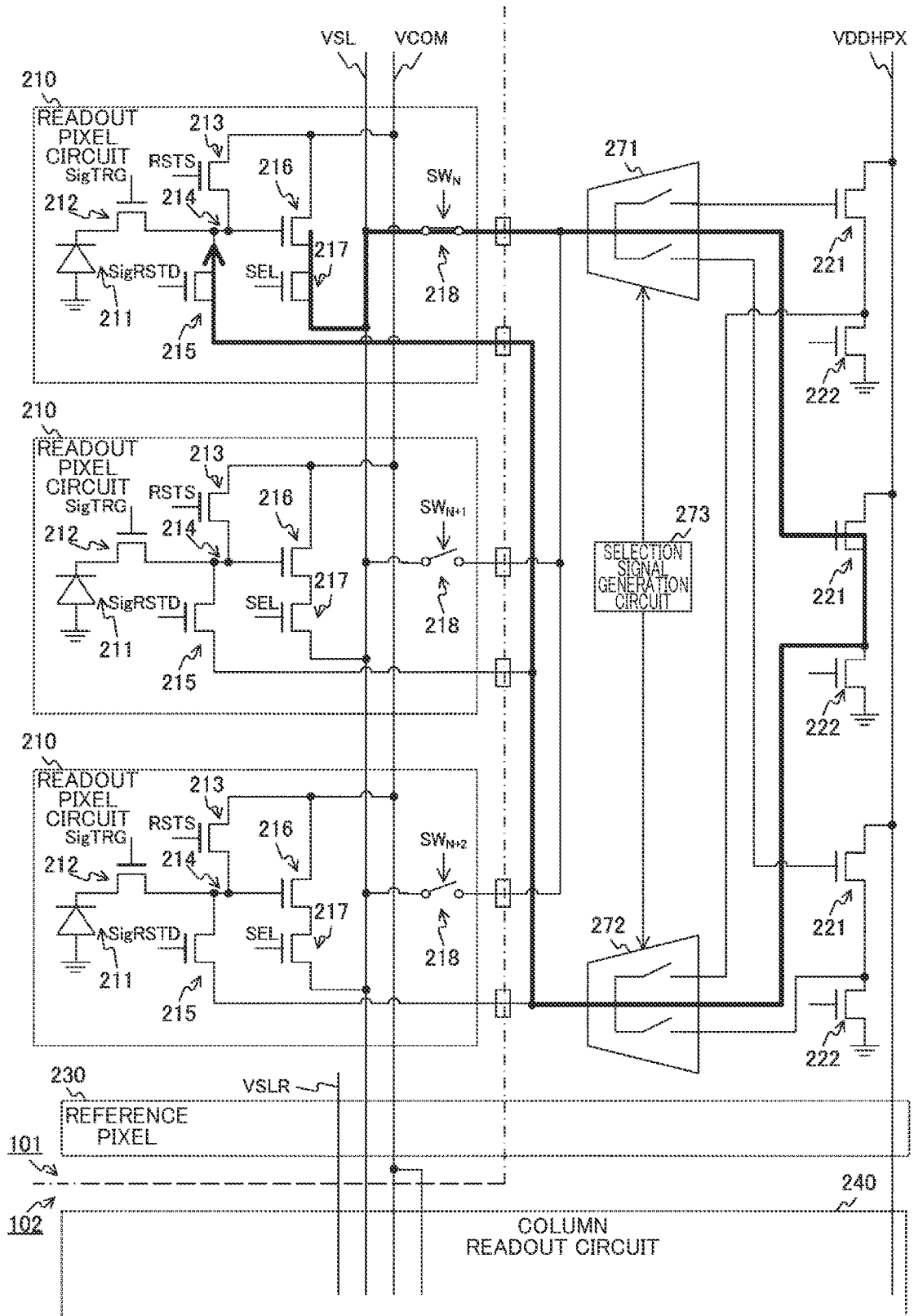
FIG. 43 is a circuit diagram illustrating a state of the readout pixel to read out the M-th frame in a differential mode in the thirteenth embodiment of the present technology.

FIG. 43 is a circuit diagram illustrating a state of the readout pixel 200 to read out the M-th frame in a differential mode in the thirteenth embodiment of the present technology. The thick line in the drawing indicates a return route.

Figure 44:
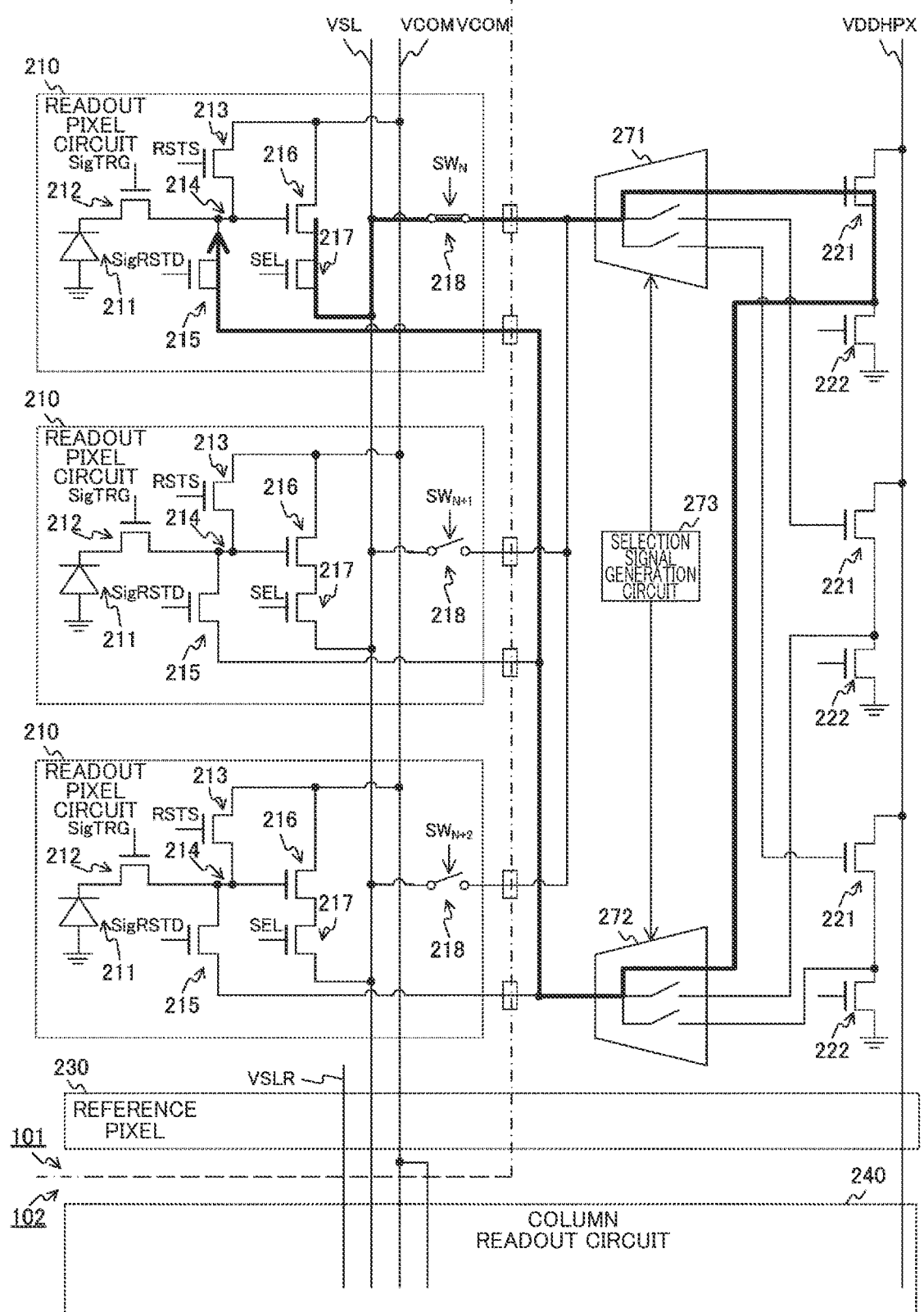
FIG. 44 is a circuit diagram illustrating a state of the readout pixel to read out the (M+1)-th frame in the differential mode in the thirteenth embodiment of the present technology.

FIG. 44 is a circuit diagram illustrating a state of the readout pixel 200 to read out the (M+1)-th frame in the differential mode in the thirteenth embodiment of the present technology. The thick line in the drawing indicates a return route.

As illustrated by way of example in FIGS. 43 and 44, the demultiplexer 271 randomly switches the connection destination of the switch 218 in the row to be read out for each frame. The multiplexer 272 connects the source of the source follower transistor 221 whose gate is connected to the demultiplexer 271 to the reset transistor 215 in the row to be read out. As a result, the amount of variation in conversion efficiency that occurs as fixed pattern noise can be changed for each frame, and can result in random noise.

Figure 45:
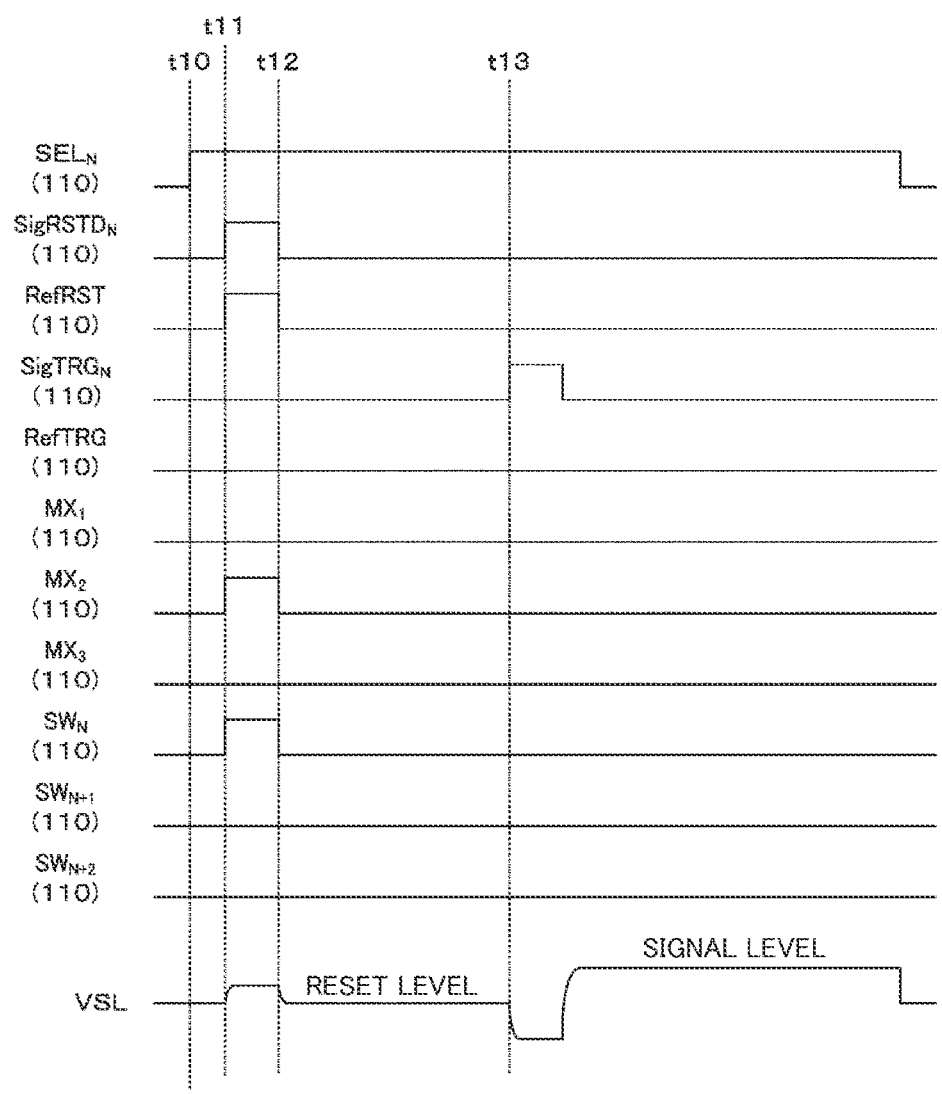
FIG. 45 is a timing chart illustrating an example of a readout operation for the M-th frame in the differential mode in the thirteenth embodiment of the present technology.

FIG. 45 is a timing chart illustrating an example of a readout operation for the M-th frame in the differential mode in the thirteenth embodiment of the present technology. When reading out the N-th row in the M-th frame, the vertical drive unit 110 sets the control signal $MX_2$ to high level within a period of timing t11 to t12 for initialization to connect the readout pixel circuit 210 in the N-th row to the source follower transistor 221 in the (N+1)-th row.

Figure 46:
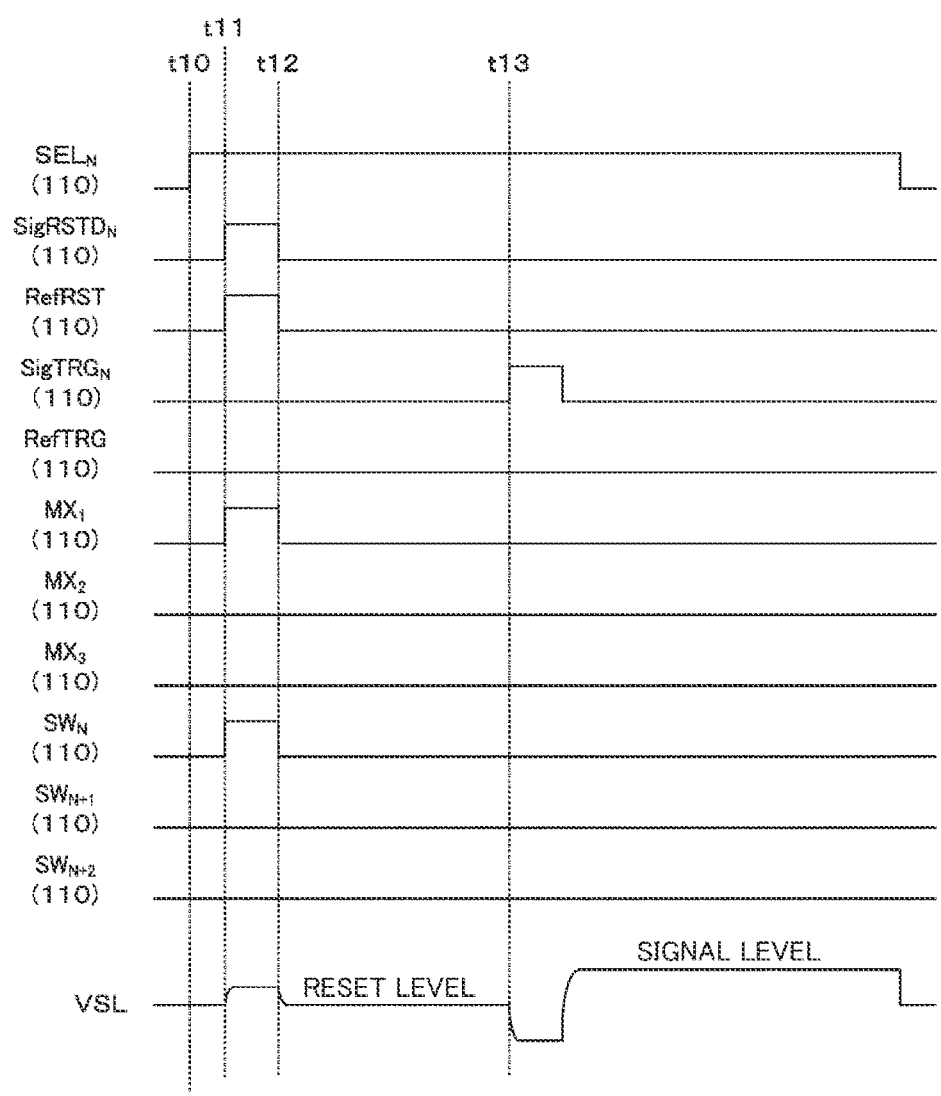
FIG. 46 is a timing chart illustrating an example of a readout operation for the (M+1)-th frame in the differential mode in the thirteenth embodiment of the present technology.

FIG. 46 is a timing chart illustrating an example of a readout operation for the (M+1)-th frame in the differential mode in the thirteenth embodiment of the present technology. When reading out the N-th row in the (M+1)-th frame, the vertical drive unit 110 sets the control signal $MX_1$ to high level within a period of timing t11 to t12 for initialization to connect the readout pixel circuit 210 in the N-th row to the source follower transistor 221 in the N-th row.

As described above, according to the thirteenth embodiment of the present technology, the demultiplexer 271 and the multiplexer 272 randomly switch the connection destination, so that variations in conversion efficiency can be reduced.

14. Fourteenth Embodiment

In the ninth embodiment described above, the connection destinations of the gate and source of the source follower transistor 221 are fixed. However, with that configuration, it is difficult to further suppress variations in conversion efficiency. A CMOS image sensor 100 according to this fourteenth embodiment differs from that according to the ninth embodiment in that selectors that switch the connection destinations of the gate and source of the source follower transistor 221 are added.

Figure 47:
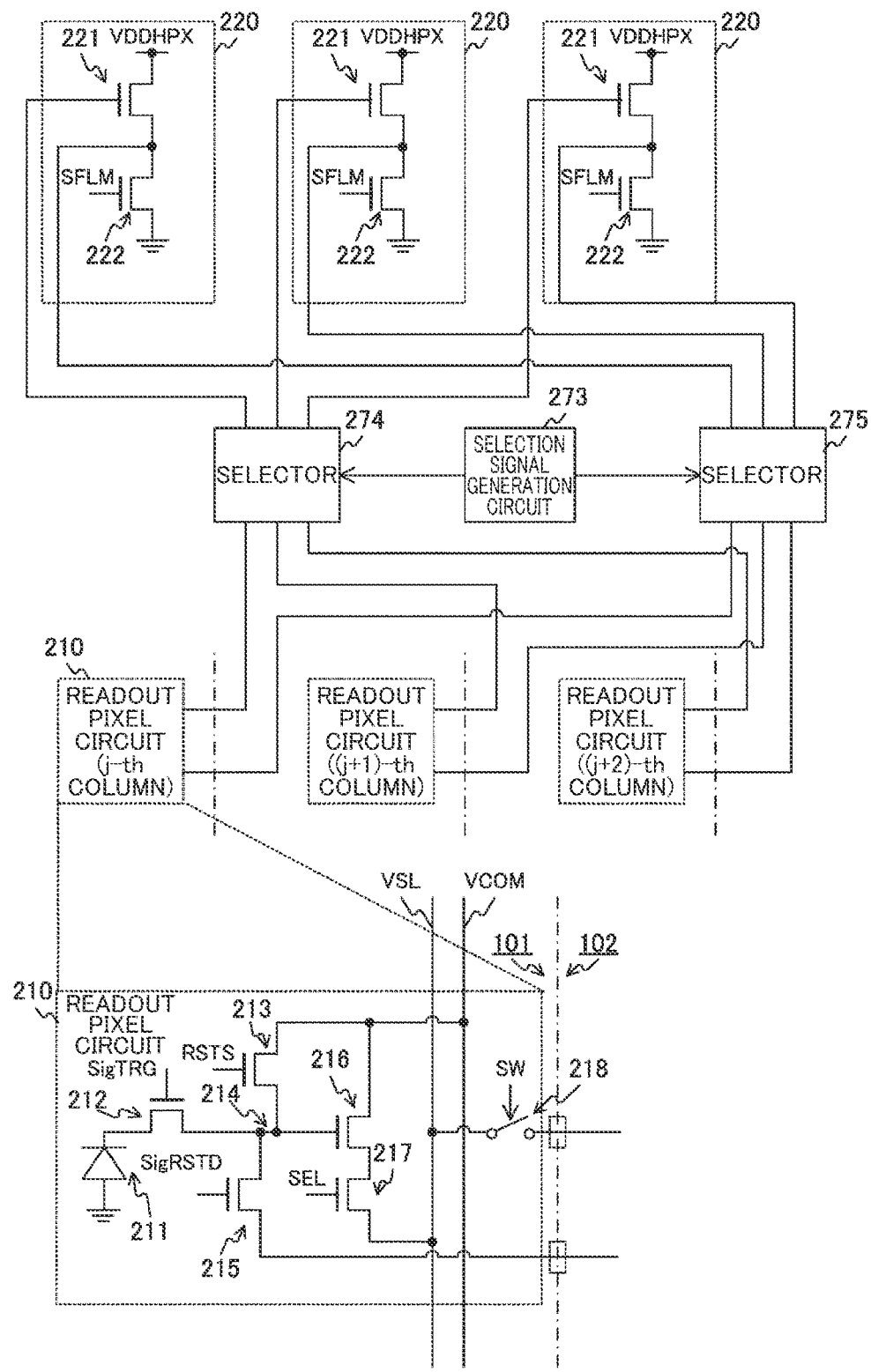
FIG. 47 is a circuit diagram illustrating a configuration example of a readout pixel according to a fourteenth embodiment of the present technology.

FIG. 47 is a circuit diagram illustrating a configuration example of a readout pixel 200 according to the fourteenth embodiment of the present technology. In this fourteenth embodiment, selectors 274 and 275 and a selection signal generation circuit 273 are arranged in the circuit chip 102 every predetermined number of columns (e.g., three columns) in the horizontal direction. For example, if the total number of rows is I (where I is an integer) and the total number of columns is J (where J is an integer), then I/3×J sets of the selector 274, the selector 275, and the selection signal generation circuit 273 are arranged. Further, a switch 218 is further arranged in the readout pixel circuit 210.

The potential difference generation circuit 220 including the source follower transistor 221 and the load MOS transistor 222 is arranged for each pixel.

A circuit including the selector 274, the selector 275, and the selection signal generation circuit 273, and the readout pixel circuits 210 and potential difference generation circuits 220 in the three corresponding columns functions as a readout pixel 200 for three columns.

The switch 218 opens and closes the path between the vertical signal line VSL and the input terminal of the selector 274 according to a control signal SW from the vertical drive unit 110. The vertical drive unit 110 turns on the switches 218 in the row to be read and turns off the switches 218 in the remaining rows.

Under the control of the selection signal generation circuit 273, the selector 274 connects the switches 218 in the three columns to the gates of the source follower transistors in the three columns on a one-to-one basis in the corresponding row. Under the control of the selection signal generation circuit 273, the selector 275 connects the sources of the source follower transistors in the three columns to the readout pixel circuits 210 in the three columns on a one-to-one basis in the corresponding row. The selectors 274 and 275 are examples of first and second selectors described in the claims.

The selection signal generation circuit 273 generates selection signals for switching the connection destinations of the selectors 274 and 275, and supplies the signals to the selectors.

The connection destinations of the selectors 274 and 275 are randomly switched for each frame. For example, in the M-th frame, the readout pixel circuit 210 in the j-th column (where j is an integer) and the source follower transistor 221 in the j-th column are connected to each other. In that frame, the readout pixel circuits 210 in the (j+1)-th and (j+2)-th columns and the source follower transistors 221 in the (j+1)-th and (j+2)-th columns are connected to each other, respectively.

Then, in the (M+1)-th frame, the readout pixel circuit 210 in the j-th column and the source follower transistor 221 in the (j+1)-th column are connected to each other. In that frame, the readout pixel circuits 210 in the (j+1)-th and (j+2)-th columns and the source follower transistors 221 in the j-th and (j+2)-th columns are connected to each other, respectively.

By the selectors 274 and 275 randomly switching the connection destinations, variations in conversion efficiency can result in random noise.

As described above, according to the fourteenth embodiment of the present technology, the selectors 274 and 275 randomly switch the connection destinations, so that variations in conversion efficiency can be reduced.

15. Fifteenth Embodiment

In the ninth embodiment described above, the potential difference generation circuit 220 is arranged for each readout pixel 200. However, with that configuration, it is difficult to reduce variations in the threshold voltage of the source follower transistor 221. A CMOS image sensor 100 according to this fifteenth embodiment differs from that according to the ninth embodiment in that a plurality of pixels share one potential difference generation circuit 220.

Figure 48:
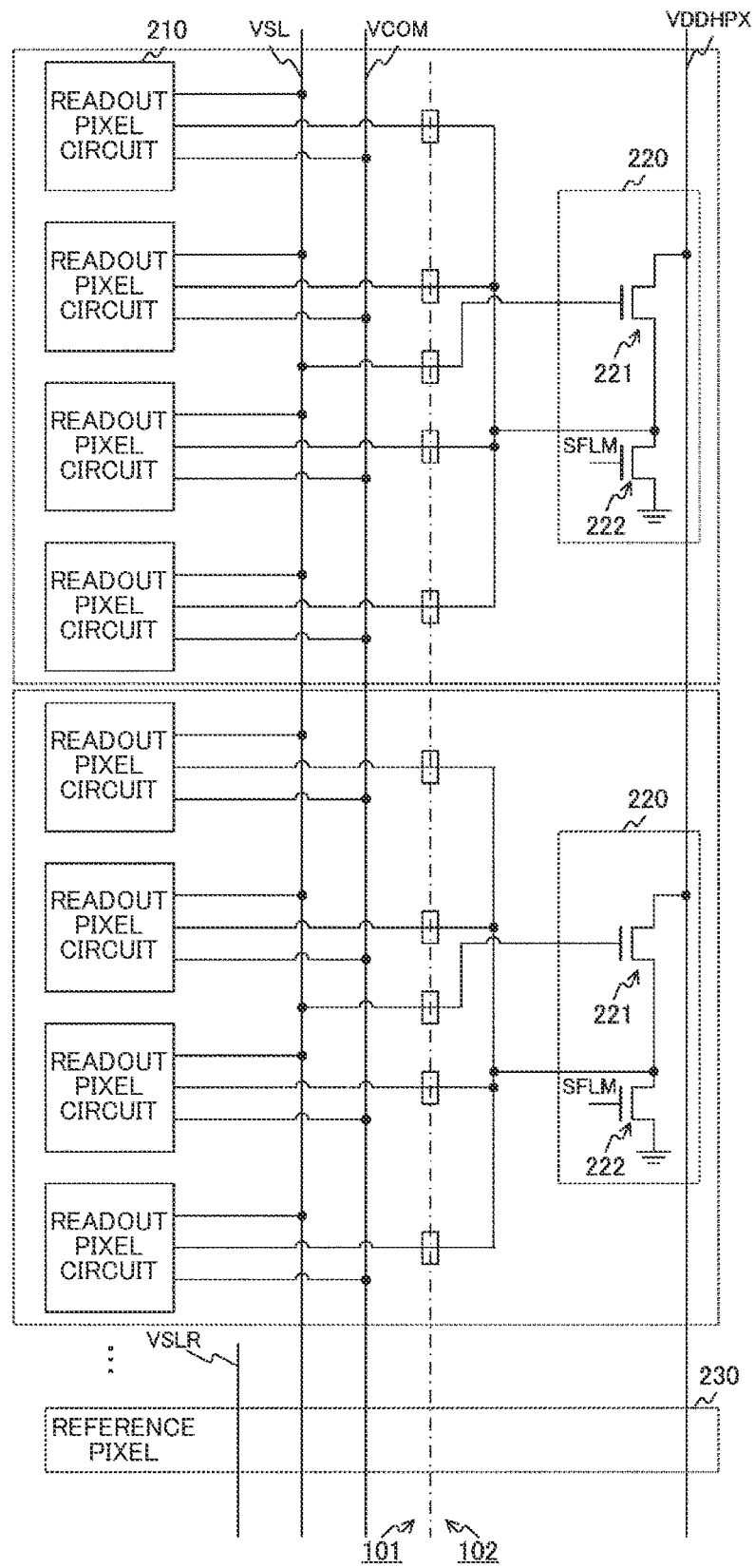
FIG. 48 is a circuit diagram illustrating a configuration example of a readout pixel according to a fifteenth embodiment of the present technology.

FIG. 48 is a circuit diagram illustrating a configuration example of a readout pixel 200 according to the fifteenth embodiment of the present technology. In this fifteenth embodiment, a column is divided into a plurality of common areas. Each common area includes K (where K is an integer) readout pixel circuits 210 arranged in the vertical direction and the potential difference generation circuit 220. A portion surrounded by a dotted line in the drawing indicates a common area.

The source follower transistor 221 is commonly connected to K readout pixel circuits 210 within the corresponding common area. In other words, one source follower transistor 221 is shared by the K readout pixel circuits 210 within the common area. The common area functions as K readout pixels 200.

By one source follower transistor 221 being shared by K (four in the drawing) readout pixel circuits 210, the number of Cu—Cu connections can be reduced as compared to the case where a source follower transistor 221 is arranged for each pixel. In addition, the area of the source follower transistor 221 can be increased, and thus, variations in its threshold voltage can be reduced.

As described above, according to the fifteenth embodiment of the present technology, one source follower transistor 221 is shared by K readout pixel circuits 210, so that the number of Cu—Cu connections can be reduced, and thus, variations in the threshold voltage of the source follower transistor 221 can be reduced.

16. Sixteenth Embodiment

In the fifteenth embodiment described above, K adjacent readout pixel circuits 210 are connected to one source follower transistor 221. However, with that configuration, since the K readout pixels 200, which are affected by variations in the threshold voltage of the source follower transistor 221, are adjacent to each other, these pixels are easily recognized as a large cluster in the image data. A MOS image sensor 100 according to this sixteenth embodiment differs from that according to the fifteenth embodiment in that switches that change the connection destination of the source follower transistor 221 are added.

Figure 49:
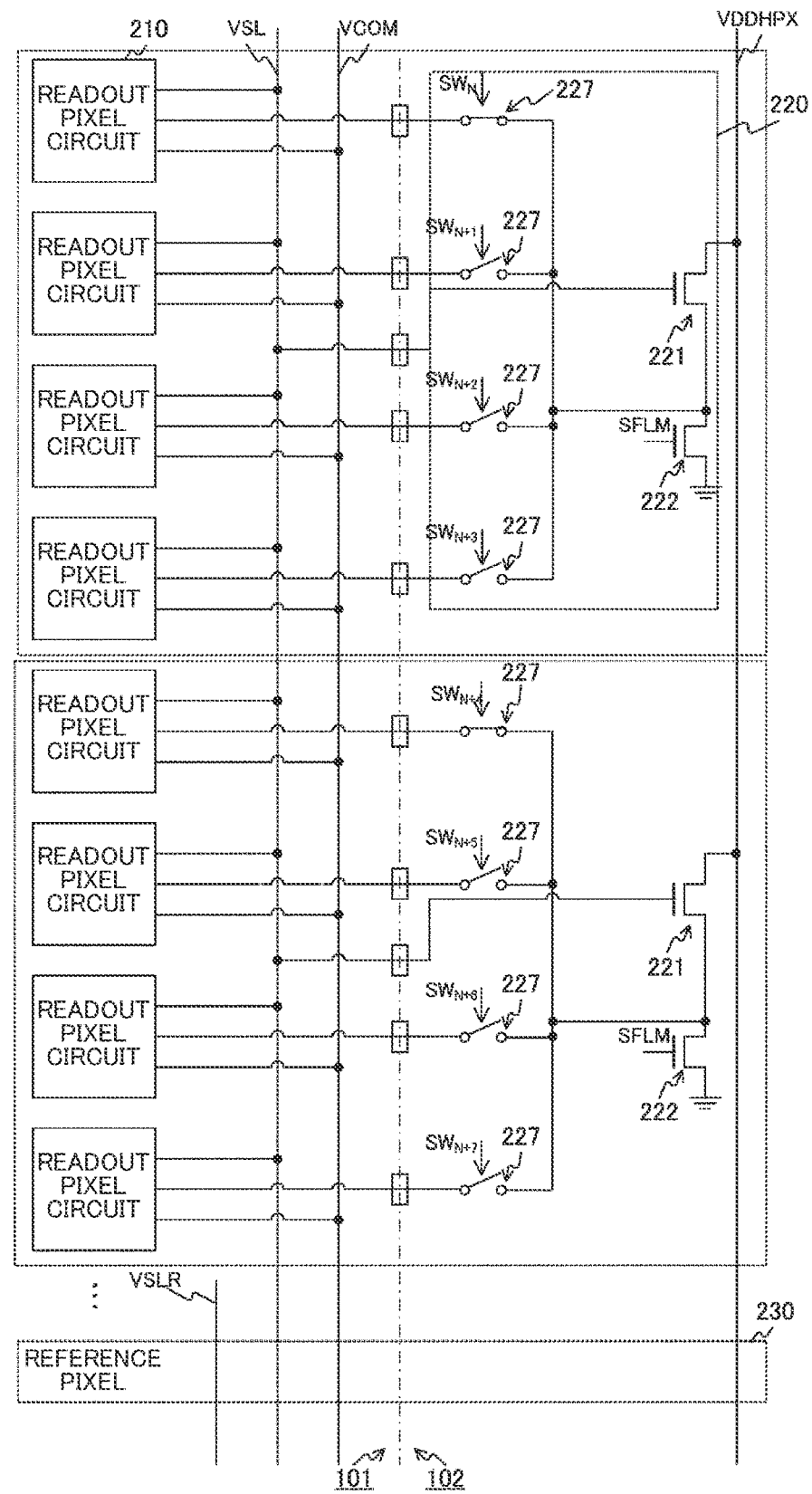
FIG. 49 is a circuit diagram illustrating a configuration example of a readout pixel according to a sixteenth embodiment of the present technology.

FIG. 49 is a circuit diagram illustrating a configuration example of a readout pixel 200 according to the sixteenth embodiment of the present technology. A circuit chip 102 according to this sixteenth embodiment differs from that according to the fifteenth embodiment in that a switch 227 is further arranged for each pixel in the potential difference generation circuit 220.

The switch 227 switches the path between the corresponding readout pixel circuit 210 and the source of the shared source follower transistor 221 according to a control signal SW from the vertical drive unit 110.

The vertical drive unit 110 controls K switches 227 for each common area, and randomly switches the connection destination of the source of the corresponding source follower transistor 221 to at least one or some of the K readout pixel circuits 210 (any one of 1 to K). As a result, variations in conversion efficiency between adjacent K pixels can be suppressed.

As described above, according to the sixteenth embodiment of the present technology, the connection destination of the source of the shared source follower transistor 221 is switched by the switches 227, so that variations in conversion efficiency can be further suppressed.

17. Seventeenth Embodiment

In the fifteenth embodiment described above, K adjacent readout pixel circuits 210 are connected to one source follower transistor 221. However, with that configuration, since the K readout pixels 200, which are affected by variations in the threshold voltage of the source follower transistor 221, are adjacent to each other, these pixels are easily recognized as a large cluster in the image data. A CMOS image sensor 100 according to this seventeenth embodiment differs from that according to the fifteenth embodiment in that a set of odd-numbered rows and a set of even-numbered rows are connected to different source follower transistors 221, respectively.

Figure 50:
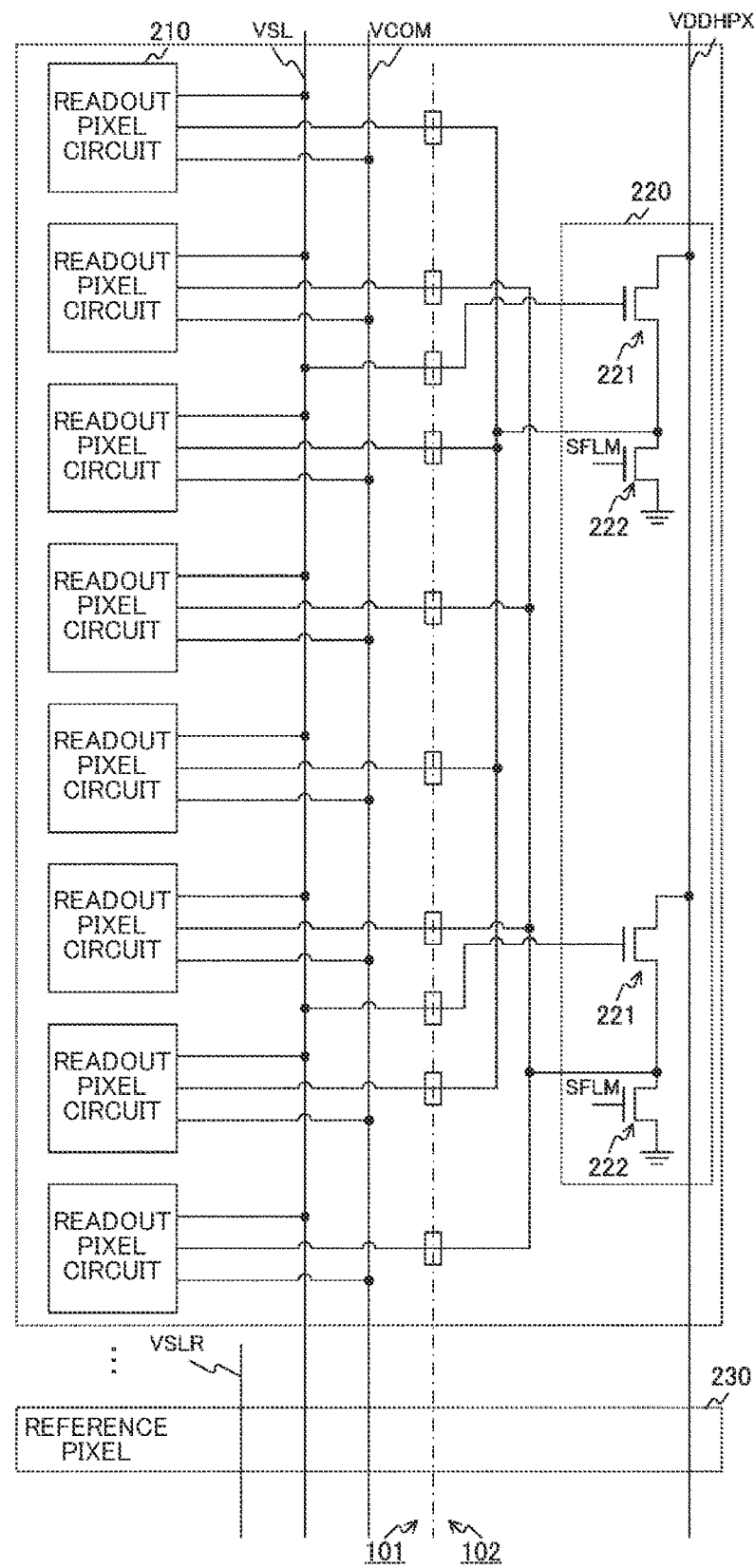
FIG. 50 is a circuit diagram illustrating a configuration example of a readout pixel according to a seventeenth embodiment of the present technology.

FIG. 50 is a circuit diagram illustrating a configuration example of a readout pixel 200 according to the seventeenth embodiment of the present technology. A common area according to this seventeenth embodiment differs from that according to the fifteenth embodiment in that two sets of the source follower transistor 221 and the load MOS transistor 222 are arranged in the potential difference generation circuit 220.

One of the two source follower transistors 221 is commonly connected to odd-numbered rows within the common area, and the other is commonly connected to even-numbered rows. One of the two load MOS transistors 222 is commonly connected to odd-numbered rows within the common area, and the other is commonly connected to even-numbered rows. In other words, within the common area, the source follower transistor 221 shared among odd-numbered rows and the source follower transistor 221 shared among even-numbered rows are different. The two source follower transistors 221 are examples of first and second source follower transistors described in the claims.

By different source follower transistors 221 shared among odd-numbered rows and among even-numbered rows, variations in conversion efficiency can be suppressed as compared to in the fifteenth embodiment in which the same source follower transistor 221 is shared among odd-numbered rows and even-numbered rows.

As described above, according to the seventeenth embodiment of the present technology, different source follower transistors 221 are shared among odd-numbered rows and among even-numbered rows, so that variations in conversion efficiency can be further suppressed.

18. Eighteenth Embodiment

In the ninth embodiment described above, the circuits are distributed to be arranged on the pixel chip 101 and the circuit chip 102. However, with that configuration, it is difficult to reduce the circuit scale for each chip. A CMOS image sensor 100 according to this eighteenth embodiment differs from that according to the ninth embodiment in that three semiconductor chips are laminated one on another.

Figure 51:
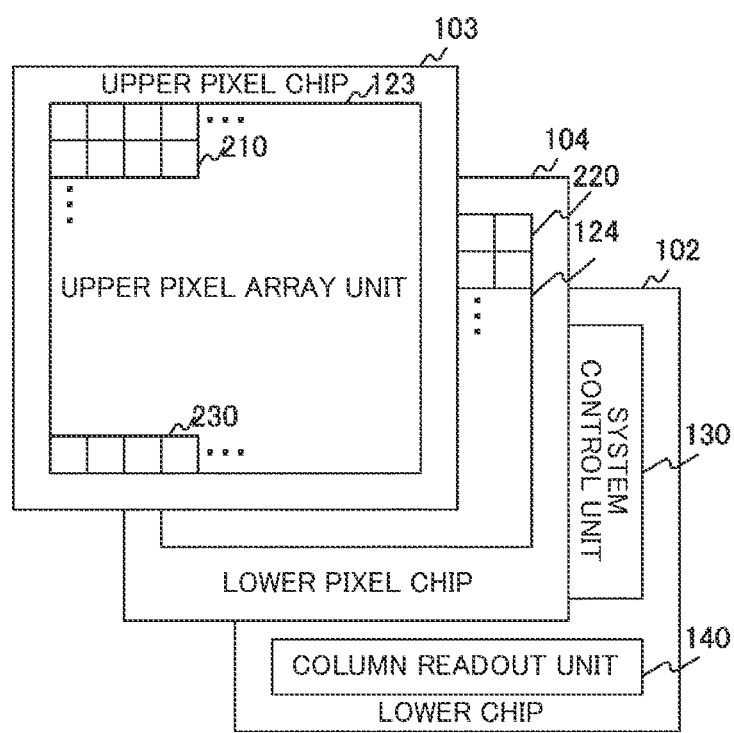
FIG. 51 illustrates an example of a laminated structure of a CMOS image sensor according to an eighteenth embodiment of the present technology.

FIG. 51 illustrates an example of a laminated structure of a CMOS image sensor 100 according to the eighteenth embodiment of the present technology. The CMOS image sensor 100 according to the eighteenth embodiment includes an upper pixel chip 103, a lower pixel chip 104, and a circuit chip 102, which are laminated one on another.

An upper pixel array unit 123 is arranged on the upper pixel chip 103. A lower pixel array unit 124 is arranged on the lower pixel chip 104. A vertical drive unit 110, a system control unit 130, a column readout unit 140, a column signal processing unit 150, a horizontal drive unit 160, and a signal processing unit 170 are arranged on the circuit chip 102.

As illustrated by way of example in the drawing, by distributing the circuits to be arranged on the three chips, the circuit scale for each chip can be reduced as compared to in the ninth embodiment in which the circuits are arranged on two chips.

Each of the tenth to seventeenth embodiments, which are for a laminated structure, can be applied to the eighteenth embodiment.

As described above, according to the eighteenth embodiment of the present technology, the circuits are distributed to be arranged on the three laminated chips, so that the circuit scale for each chip can be reduced.

19. Example of Application to Moving Body

The technology according to the present disclosure (the present technology) can be applied to various products. For example, the technology according to the present disclosure may be realized as a device equipped in any type of moving body such as an automobile, an electric vehicle, a hybrid electric vehicle, a motorcycle, a bicycle, a personal mobility device, an airplane, a drone, a ship, and a robot.

Figure 52:
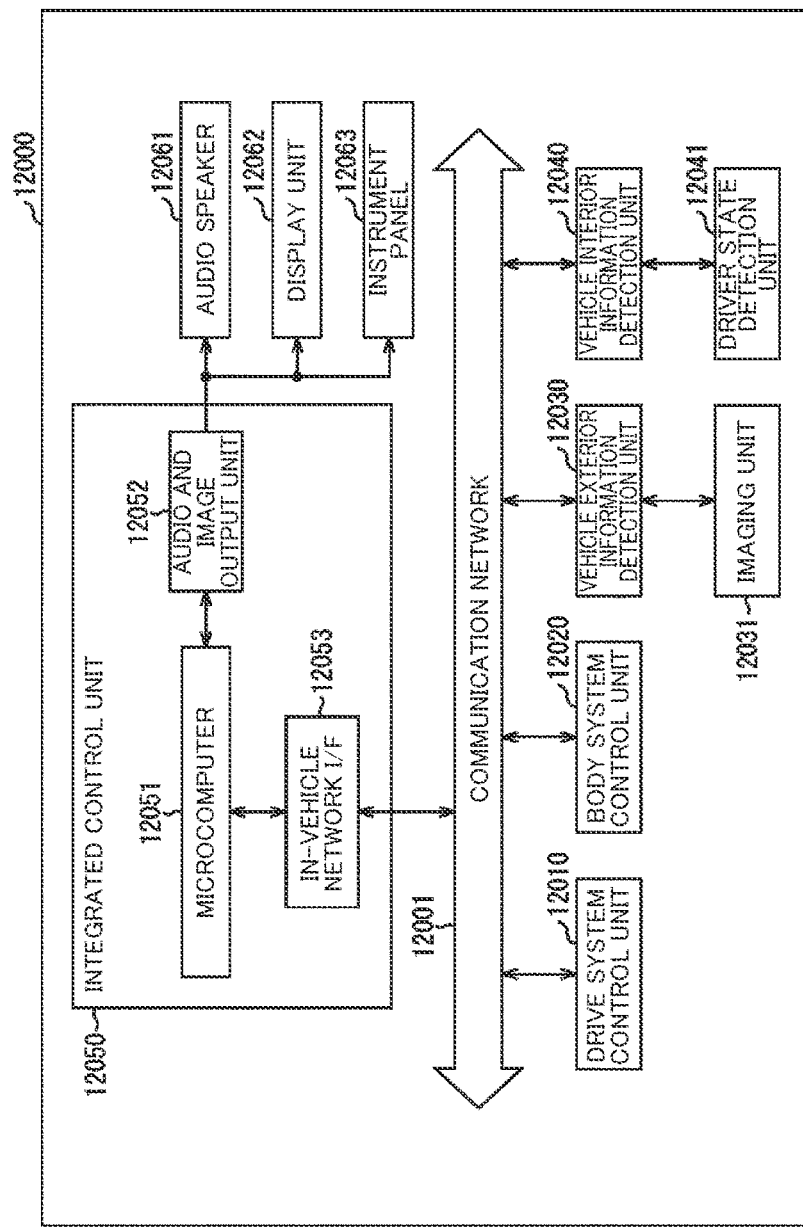
FIG. 52 is a block diagram illustrating a schematic configuration example of a vehicle control system.

FIG. 52 is a block diagram illustrating a schematic configuration example of a vehicle control system, which is an example of a moving body control system to which the technology according to the present disclosure can be applied.

The vehicle control system 12000 includes a plurality of electronic control units connected thereto via a communication network 12001. In the example illustrated in FIG. 52, the vehicle control system 12000 includes a drive system control unit 12010, a body system control unit 12020, a vehicle exterior information detection unit 12030, a vehicle interior information detection unit 12040, and an integrated control unit 12050. In addition, as a functional configuration of the integrated control unit 12050, a microcomputer 12051, an audio and image output unit 12052, and an in-vehicle network interface (I/F) 12053 are illustrated.

The drive system control unit 12010 controls operations of devices related to a drive system of a vehicle in accordance with various programs. For example, the drive system control unit 12010 functions as a control device for a driving force generation device for generating the driving force of the vehicle such as an internal combustion engine or a drive motor, a driving force transmission mechanism for transmitting the driving force to the wheels, a steering mechanism for adjusting the steering angle of the vehicle, a braking device for generating the braking force of the vehicle, or the like.

The body system control unit 12020 controls operations of various devices mounted in the vehicle body according to various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The vehicle exterior information detection unit 12030 detects information on the outside of the vehicle equipped with the vehicle control system 12000. For example, an imaging unit 12031 is connected to the vehicle exterior information detection unit 12030. The vehicle exterior information detection unit 12030 causes the imaging unit 12031 to capture an image outside the vehicle and receives the captured image. The vehicle exterior information detection unit 12030 may perform object detection processing or distance detection processing for people, cars, obstacles, signs, and letters on the road on the basis of the received image.

The imaging unit 12031 is an optical sensor that receives light and outputs an electrical signal according to the amount of received light. The imaging unit 12031 can also output the electrical signal as an image or distance measurement information. In addition, the light received by the imaging unit 12031 may be visible light or invisible light such as infrared light.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generation device, the steering mechanism, or the braking device on the basis of information inside and outside the vehicle acquired by the vehicle exterior information detection unit 12030 or the vehicle interior information detection unit 12040, and output a control command to the drive system control unit 12010. For example, the microcomputer 12051 can perform cooperative control for the purpose of realizing functions of an advanced driver assistance system (ADAS) including collision avoidance or impact mitigation of a vehicle, following traveling based on inter-vehicle distance, vehicle speed maintenance driving, vehicle collision warning, vehicle lane deviation warning, or the like.

Further, the microcomputer 12051 can perform cooperative control for the purpose of automated driving or the like in which autonomous travel is performed without depending on operations of the driver, by controlling the driving force generation device, the steering mechanism, or the braking device and the like on the basis of information about the surroundings of the vehicle, the information being acquired by the vehicle exterior information detection unit 12030 or the vehicle interior information detection unit 12040.

The microcomputer 12051 can also output a control command to the body system control unit 12020 based on the information outside the vehicle acquired by the vehicle exterior information detection unit 12030. For example, the microcomputer 12051 can perform cooperative control for the purpose of preventing glare, such as switching from a high beam to a low beam, by controlling the headlamp according to the position of a preceding vehicle or an oncoming vehicle detected by the vehicle exterior information detection unit 12030.

The audio and image output unit 12052 transmits an output signal of at least one of audio and an image to an output device capable of visually or audibly notifying an occupant or the outside of the vehicle of information. In the example of FIG. 52, an audio speaker 12061, a display unit 12062, and an instrument panel 12063 are illustrated as examples of the output device. The display unit 12062 may include at least one of an on-board display and a head-up display, for example.

Figure 53:
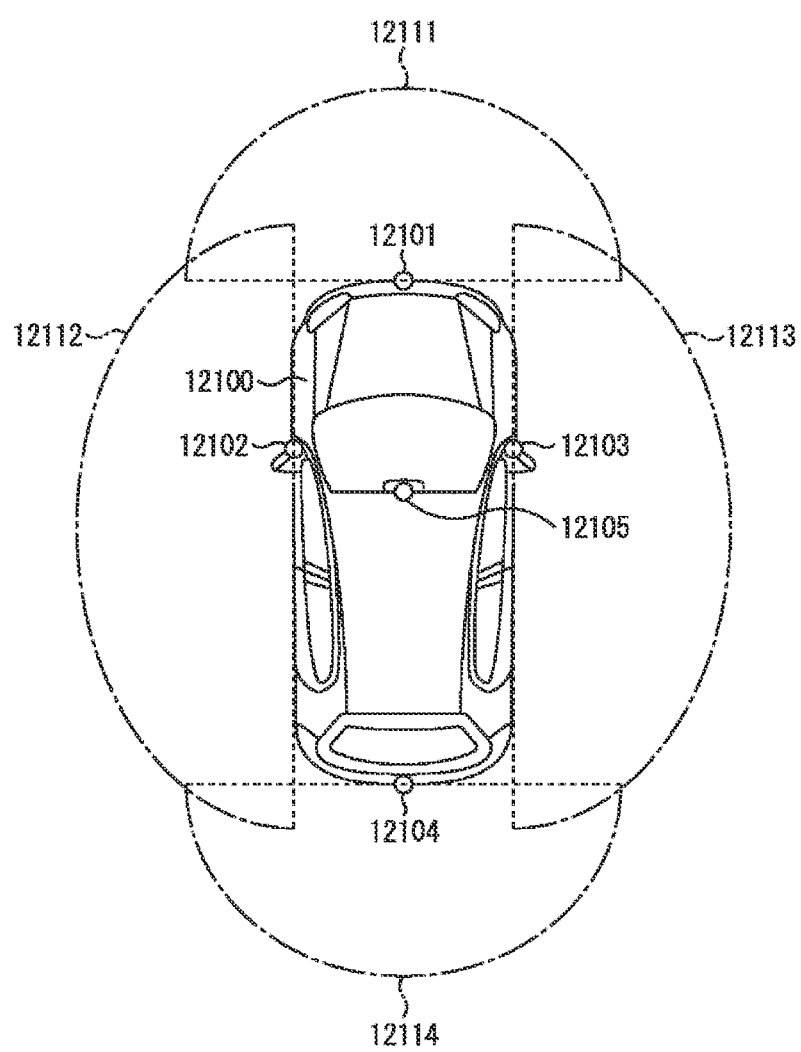
FIG. 53 is an explanatory diagram illustrating an example of installation positions of imaging units.

FIG. 53 is a diagram illustrating an example of the installation positions of the imaging units 12031.

In FIG. 53, imaging units 12101, 12102, 12103, 12104, and 12105 are provided as the imaging units 12031.

The imaging units 12101, 12102, 12103, 12104, and 12105 are provided, for example, at positions such as a front nose, side mirrors, a rear bumper, a back door, and an upper part of a windshield in the occupant compartment of the vehicle 12100. The imaging unit 12101 provided on the front nose and the imaging unit 12105 provided on the upper part of the windshield in the occupant compartment mainly acquire images in front of the vehicle 12100. The imaging units 12102 and 12103 provided on the side mirrors mainly acquire images on the sides of the vehicle 12100. The imaging unit 12104 provided on the rear bumper or the back door mainly captures images behind the vehicle 12100. The imaging unit 12105 provided in the upper portion of the windshield in the vehicle interior is mainly used for detection of preceding vehicles, pedestrians, obstacles, traffic signals, traffic signs, lanes, and the like.

FIG. 53 illustrates an example of imaging ranges of the imaging units 12101 to 12104. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, by superimposing image data captured by the imaging units 12101 to 12104, it is possible to obtain a bird's-eye view image viewed from the upper side of the vehicle 12100.

At least one of the imaging units 12101 to 12104 may have a function for obtaining distance information. For example, at least one of the imaging units 12101 to 12104 may be a stereo camera constituted by a plurality of imaging elements or may be an imaging element that has pixels for phase difference detection.

For example, the microcomputer 12051 can extract, particularly, a closest three-dimensional object on a path along which the vehicle 12100 is traveling, which is a three-dimensional object traveling at a predetermined speed (e.g., 0 km/h or higher) in the substantially same direction as the vehicle 12100, as a preceding vehicle by acquiring a distance to each of three-dimensional objects in the imaging ranges 12111 to 12114 and temporal change in the distance (a relative speed with respect to the vehicle 12100) on the basis of the distance information obtained from the imaging units 12101 to 12104. Further, the microcomputer 12051 can set an inter-vehicle distance which should be secured in front of the vehicle in advance with respect to the preceding vehicle and can perform automated brake control (also including following stop control) or automated acceleration control (also including following start control). In this way, it is possible to perform cooperative control for the purpose of automated driving or the like in which a vehicle autonomously travels without depending on operations of the driver.

For example, the microcomputer 12051 can classify and extract three-dimensional data regarding three-dimensional objects into other three-dimensional objects such as a two-wheeled vehicle, an ordinary vehicle, a large-size vehicle, a pedestrian, and an electric pole on the basis of distance information obtained from the imaging units 12101 to 12104 and can use the other three-dimensional objects to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display unit 12062, forced deceleration or avoidance steering is performed through the drive system control unit 12010, and thus it is possible to perform driving support for collision avoidance.

At least one of the imaging units 12101 to 12104 may be an infrared camera that detects infrared light. For example, the microcomputer 12051 can recognize a pedestrian by determining whether there is a pedestrian in the captured images of the imaging units 12101 to 12104. Such recognition of the pedestrian is performed using, for example, a procedure for extracting feature points in the captured images of the imaging units 12101 to 12104 serving as infrared cameras, and a procedure for performing pattern matching processing on a series of feature points indicating a contour of an object to determine whether the object is a pedestrian. When the microcomputer 12051 determines that there is a pedestrian in the captured images of the imaging units 12101 to 12104 and the pedestrian is recognized, the audio and image output unit 12052 controls the display unit 12062 so that a square contour line for emphasis is superimposed and displayed with the recognized pedestrian. In addition, the audio and image output unit 12052 may control the display unit 12062 such that icons and the like indicating pedestrians are displayed at desired positions.

An example of the vehicle control system to which the technology according to the present disclosure can be applied has been described above. The technology according to the present disclosure can be applied, for example, to each imaging unit 12031 among the components described above. Specifically, the CMOS image sensor 100 of FIG. 1 can be applied to the imaging unit 12031. By applying the technology according to the present disclosure to the imaging unit 12031, flare can be suppressed and a clearer captured image can be obtained, which makes it possible to reduce driver fatigue.

It should be noted that the above-described embodiments show examples for embodying the present technology, and matters in the embodiments and matters specifying the invention in the claims have a corresponding relationship with each other. Similarly, the matters specifying the invention in the claims and the matters in the embodiments of the present technology having the same name have a corresponding relationship with each other. However, the present technology is not limited to the embodiments and can be embodied by applying various modifications to the embodiments without departing from the spirit and scope of the present technology.

The effects described in the present specification are merely examples and are not intended as limiting, and other effects may be obtained.

The present technology can also be configured as follows.

(1) A solid-state imaging element including:

a plurality of reference pixels each provided with a reference-side amplifier transistor that supplies a reference current according to a predetermined reference potential;

a plurality of readout pixel circuits each provided with a readout-side amplifier transistor that supplies from a drain to a source a signal current according to a difference between a potential of a gate and the reference potential; and a potential difference generation unit in which a plurality of source follower transistors are arranged for each of columns of the readout pixel circuits, each source follower transistor controlling a potential difference between the gate and the drain to a predetermined value when the potential of the gate and the reference potential are initialized.

(2) The solid-state imaging element according to (1), wherein
the readout pixel circuit and the source follower transistor are provided in each of the plurality of readout pixels, and
the plurality of readout pixel circuits, the plurality of reference pixels, and the potential difference generation unit are arranged on a same semiconductor chip.

3) The solid-state imaging element according to (2), wherein each of the plurality of readout pixels further includes a load MOS transistor that is connected in series with and between the source follower transistor and a predetermined ground potential.

(4) The solid-state imaging element according to (2), wherein each of the plurality of readout pixels further includes
a load MOS transistor, and
a current cutoff transistor that opens and closes a path between the source follower transistor and the load MOS transistor.

(5) The solid-state imaging element according to (2), further including a vertical drive unit that changes a control voltage when the readout pixel circuit is initialized,
wherein each of the plurality of readout pixels further includes a load MOS transistor that is connected in series with and between the source follower transistor and the control voltage.

(6) The solid-state imaging element according to (2), wherein
the readout pixel circuit further includes a selection transistor that outputs the signal current according to a predetermined selection signal, and
a gate of the source follower transistor is connected to a connection node between the readout-side amplifier transistor and the selection transistor.

(7) The solid-state imaging element according to (2), wherein
the plurality of readout pixels include a first readout pixel and a second readout pixel,
the first readout pixel includes a first source follower transistor, a first load MOS transistor, and a first switch,
the second readout pixel includes a second source follower transistor, a second load MOS transistor, and a second switch,
the first load MOS transistor and the second load MOS transistor are connected in parallel between a predetermined node and a predetermined ground potential,
the first switch opens and closes a path between the first source follower transistor and the predetermined node, and
the second switch opens and closes a path between the second source follower transistor and the predetermined node.

(8) The solid-state imaging element according to (2), wherein
the potential difference generation unit further includes for each column a load MOS transistor that is connected to a reset input line, and
each of the plurality of readout pixels further includes the source follower transistor, and
a switch that opens and closes a path between the source follower transistor and the reset input line.

(9) The solid-state imaging element according to claim 8, further including for each column a column switch that opens and closes a path between the reset input line and a predetermined power supply line.

(10) The solid-state imaging element according to (1), wherein
the potential difference generation unit further includes a plurality of load MOS transistors,
the plurality of readout pixel circuits and the plurality of reference pixels are arranged on a predetermined pixel chip, and
the potential difference generation unit is arranged on a predetermined circuit chip.

(11) The solid-state imaging element according to (10), wherein
the source follower transistor and the load MOS transistor are arranged for each readout pixel circuit, and
a gate of the source follower transistor is connected to a vertical signal line.

(12) The solid-state imaging element according to (10), wherein
the source follower transistor and the load MOS transistor are arranged for each readout pixel circuit, and
the readout pixel circuit further includes a first switch that opens and closes a path between a vertical signal line and a gate of the source follower transistor.

(13) The solid-state imaging element according to (10), wherein
the source follower transistor and the load MOS transistor are arranged for each readout pixel circuit,
the readout pixel circuit further includes a selection transistor that outputs the signal current according to a predetermined selection signal, and
a gate of the source follower transistor is connected to a connection node between the readout-side amplifier transistor and the selection transistor.

(14) The solid-state imaging element according to (10), wherein
the source follower transistor and the load MOS transistor are arranged for each readout pixel circuit, and
the readout pixel circuit further includes
a first switch that opens and closes a path between a vertical signal line and a gate of the source follower transistor, and
a reset transistor that initializes a floating diffusion layer, and
the potential difference generation unit further includes
a second switch that opens and closes a path between the reset transistor and a predetermined power supply voltage,
a third switch that opens and closes a path between the reset transistor and a connection node between the source follower transistor and the load MOS transistor, and
a fourth switch that opens and closes a path between the gate of the source follower transistor and a predetermined ground potential.

(15) The solid-state imaging element according to (10), wherein the source follower transistor and the load MOS transistor are arranged for each readout pixel circuit, and on the circuit chip,
a demultiplexer that connects one of gates of a predetermined number of source follower transistors corresponding to the column to a vertical signal line, and a multiplexer that connects a source of the source follower transistor whose gate is connected to the demultiplexer to one of the plurality of readout pixel circuits are further arranged.

(16) The solid-state imaging element according to (10), wherein
the source follower transistor and the load MOS transistor are arranged for each readout pixel circuit, and on the circuit chip,
a first selector that connects a predetermined number of vertical signal lines to respective gates of a predetermined number of the source follower transistors arranged in a horizontal direction, and
a second selector that connects respective sources of the predetermined number of source follower transistors arranged in the horizontal direction to a predetermined number of the readout pixel circuits arranged in the horizontal direction
are further arranged.

(17) The solid-state imaging element according to (10), wherein
each of the columns is divided into a plurality of common areas,
the source follower transistor and the load MOS transistor are arranged in each common area, and
the source follower transistor is commonly connected to a predetermined number of the readout pixel circuits within the common area.

(18) The solid-state imaging element according to (10), wherein
each of the columns is divided into a plurality of common areas,
the source follower transistor and the load MOS transistor are arranged in each common area, and
on the circuit chip, a predetermined number of switches that connect a source of the source follower transistor and at least one or some of a predetermined number of the readout pixel circuits within the common area are further arranged.

(19) The solid-state imaging element according to (10), wherein
each of the columns is divided into a plurality of common areas,
the plurality of source follower transistors include a first source follower transistor and a second source follower transistor in each common area,
the readout pixel circuits in odd-numbered rows within the common area share the first source follower transistor, and
the readout pixel circuits in even-numbered rows within the common area share the second source follower transistor.

(20) The solid-state imaging element according to (1), further including a column readout unit that generates a pixel signal according to the signal current,
wherein the potential difference generation unit further includes a plurality of load MOS transistors,
the plurality of readout pixel circuits and the plurality of reference pixels are arranged on a first pixel chip,
the potential difference generation unit is arranged on a second chip, and
the column readout unit is arranged on a predetermined circuit chip.

REFERENCE SIGNS LIST

100 CMOS image sensor
101 Pixel chip
102 Circuit chip
103 Upper pixel chip
104 Lower pixel chip
110 Vertical drive unit
120 Pixel array unit
121 Readout pixel region
122 Reference pixel region
123 Upper pixel array unit
124 Lower pixel array unit
130 System control unit
140 Column readout unit
150 Column signal processing unit
160 Horizontal drive unit
170 Signal processing unit
200 Readout pixel
210 Readout pixel circuit
211, 231, 261 to 263 Photoelectric conversion element
212, 232, 264 to 266 Transfer transistor
213, 215, 233, 235 Reset transistor
214, 234 Floating diffusion layer
216, 236 Amplifier transistor
217, 237 Selection transistor
218, 224, 226 to 228, 241 to 246 Switch
220 Potential difference generation circuit
221, 238 Source follower transistor
222, 239 Load MOS transistor
223 Current cutoff transistor
225 Column switch
230 Reference pixel
240 Column readout circuit
247 to 250 pMOS transistor
251, 252 nMOS transistor
260 FD common block
271 Demultiplexer
272 Multiplexer
273 Selection signal generation circuit
274, 275 Selector
12031 Imaging unit

The invention claimed is:
1. A solid-state imaging element, comprising:
a plurality of reference pixels, wherein
each of the plurality of reference pixels is provided with a respective reference-side amplifier transistor, and
the respective reference-side amplifier transistor is configured to supply a reference current based on specific reference potential;
a plurality of readout pixel circuits, wherein
each of the plurality of readout pixel circuits is provided with a respective readout-side amplifier transistor, and
the respective readout-side amplifier transistor is configured to supply, from a drain to a source, a signal current based on a difference between a potential of a gate and the specific reference potential; and
a potential difference generation unit in which a plurality of source follower transistors is arranged for each of a plurality of columns of each of the plurality of readout pixel circuits, wherein
each of the plurality of source follower transistors is configured to control a potential difference between the gate and the drain to a specific value when the potential of the gate and the specific reference potential are initialized.

2. The solid-state imaging element according to claim 1, wherein
the plurality of readout pixel circuits and the plurality of source follower transistors are provided in each of a plurality of readout pixels, and the plurality of readout pixel circuits, the plurality of reference pixels, and the potential difference generation unit are on a same semiconductor chip.

3. The solid-state imaging element according to claim 2, wherein each of the plurality of readout pixels further includes a respective load MOS transistor that is connected in series with and between a respective source follower transistor of the plurality of source follower transistors and a specific ground potential.

4. The solid-state imaging element according to claim 2, wherein each of the plurality of readout pixels further includes
a respective load MOS transistor, and
a respective current cutoff transistor configured to open and close a path between a respective source follower transistor of the plurality of source follower transistors and the respective load MOS transistor.

5. The solid-state imaging element according to claim 2, further comprising a vertical drive unit configured to change a control voltage when the plurality of readout pixel circuits is initialized, wherein
each of the plurality of readout pixels further includes a respective load MOS transistor that is connected in series with and between a respective source follower transistor of the plurality of source follower transistors and the control voltage.

6. The solid-state imaging element according to claim 2, wherein
each of the plurality of readout pixel circuits further includes a respective selection transistor,
the respective selection transistor is configured to output the signal current based on a specific selection signal, and
a gate of each of the plurality of source follower transistors is connected to a respective connection node between the respective readout-side amplifier transistor and the respective selection transistor.

7. The solid-state imaging element according to claim 2, wherein
the plurality of readout pixels includes a first readout pixel and a second readout pixel,
the first readout pixel includes a first source follower transistor of the plurality of source follower transistors, a first load MOS transistor, and a first switch,
the second readout pixel includes a second source follower transistor of the plurality of source follower transistors, a second load MOS transistor, and a second switch,
the first load MOS transistor and the second load MOS transistor are connected in parallel between a specific node and a specific ground potential,
the first switch is configured to open and close a path between the first source follower transistor and the predetermined specific node, and
the second switch is configured to open and close a path between the second source follower transistor and the predetermined specific node.

8. The solid-state imaging element according to claim 2, wherein
the potential difference generation unit further includes for, the each of the plurality of columns, a respective load MOS transistor that is connected to a reset input line, and
each of the plurality of readout pixels further includes
a respective source follower transistor of the plurality of source follower transistors, and a respective switch configured to open and close a path between the respective source follower transistor and the reset input line.

9. The solid-state imaging element according to claim 8, further comprising, for the each of the plurality of columns, a respective column switch configured to open and close a path between the reset input line and a specific power supply line.

10. The solid-state imaging element according to claim 1, wherein
the potential difference generation unit further includes a plurality of load MOS transistors,
the plurality of readout pixel circuits and the plurality of reference pixels are arranged on a specific pixel chip, and
the potential difference generation unit is arranged on a specific circuit chip.

11. The solid-state imaging element according to claim 10, wherein
a respective source follower transistor of the plurality of source follower transistors and a respective load MOS transistor of the plurality of load MOS transistors are arranged for each of the plurality of readout pixel circuits, and
a gate of the respective source follower transistor is connected to a vertical signal line.

12. The solid-state imaging element according to claim 10, wherein
a respective source follower transistor of the plurality of source follower transistors and a respective load MOS transistor of the plurality of load MOS transistors are arranged for the each of the plurality of readout pixel circuits, and
the each of the plurality of readout pixel circuits further includes a first switch configured to open and close a path between a vertical signal line and a gate of the respective source follower transistor.

13. The solid-state imaging element according to claim 10, wherein
a respective source follower transistor of the plurality of source follower transistors and a respective load MOS transistor of the plurality of load MOS transistors are arranged for the each of the plurality of readout pixel circuits,
the each of the plurality of readout pixel circuits further includes a selection transistor configured to output the signal current-according to based on a specific selection signal, and
a gate of the respective source follower transistor is connected to a respective connection node between the respective readout-side amplifier transistor and the respective selection transistor.

14. The solid-state imaging element according to claim 10, wherein
a respective source follower transistor of the plurality of source follower transistors and a respective load MOS transistor of the plurality of load MOS transistors are arranged for the each of the plurality of readout pixel circuits, and
the each of the plurality of readout pixel circuits further includes
a first switch configured to open and close a path between a vertical signal line and a gate of the respective source follower transistor, and
a reset transistor configured to initialize a floating diffusion layer, and
the potential difference generation unit further includes a second switch configured to open and close a path between the reset transistor and a specific power supply voltage, a third switch configured to open and close a path between the reset transistor and a connection node between the respective source follower transistor and the respective load MOS transistor, and a fourth switch configured to open and close a path between the gate of the respective source follower transistor and a specific ground potential.

15. The solid-state imaging element according to claim 10, wherein
a respective source follower transistor of the plurality of source follower transistors and a respective load MOS transistor of the plurality of load MOS transistors are arranged for the each of the plurality of readout pixel circuits, and
on a circuit chip,
a demultiplexer that connects one of gates of a specific number of the plurality of source follower transistors corresponding to the each of the plurality of columns to a vertical signal line, and
a multiplexer that connects a source of the specific number of the plurality of source follower transistors whose gate is connected to the demultiplexer to one of the plurality of readout pixel circuits are further arranged.

16. The solid-state imaging element according to claim 10, wherein
a respective source follower transistor of the plurality of source follower transistors and a respective load MOS transistor of the plurality of load MOS transistors are arranged for the each of the plurality of readout pixel circuits, and
on a circuit chip,
a first selector that connects a predetermined number of vertical signal lines to respective gates of a specific number of the plurality of source follower transistors arranged in a horizontal direction, and
a second selector that connects respective sources of the specific number of the plurality of source follower transistors arranged in the horizontal direction to a specific number of the readout pixel circuits arranged in the horizontal direction are further arranged.

17. The solid-state imaging element according to claim 10, wherein
the each of the plurality of columns is divided into a plurality of common areas,
a respective source follower transistor of the plurality of source follower transistors and a respective load MOS transistor of the plurality of load MOS transistors are arranged in each of the plurality of common areas, and
the respective source follower transistor is commonly connected to a specific number of the readout pixel circuits within the each of the plurality of common areas.

18. The solid-state imaging element according to claim 10, wherein
the each of the plurality of columns is divided into a plurality of common areas,
a respective source follower transistor of the plurality of source follower transistors and a respective load MOS transistor of the plurality of load MOS transistors are arranged in each of the plurality of common areas, and
on a circuit chip, a specific number of switches that connect a source of the respective source follower transistor and at least one or some of a specific number of the readout pixel circuits within the each of the plurality of common areas are further arranged.

19. The solid-state imaging element according to claim 10, wherein
the each of the plurality of columns is divided into a plurality of common areas,
the plurality of source follower transistors includes a first source follower transistor and a second source follower transistor in each of the plurality of common areas,
a first set of the plurality of readout pixel circuits in odd-numbered rows within the each of the plurality of common areas share the first source follower transistor, and
a second set of the plurality of readout pixel circuits in even-numbered rows within the each of the plurality of common areas share the second source follower transistor.

20. The solid-state imaging element according to claim 1, further comprising a column readout unit that generates a pixel signal based on the signal current, wherein
the potential difference generation unit further includes a plurality of load MOS transistors,
the plurality of readout pixel circuits and the plurality of reference pixels are arranged on a first pixel chip,
the potential difference generation unit is arranged on a second chip, and
the column readout unit is arranged on a predetermined circuit chip.

* * * * *